(12) United States Patent
Honda et al.

(10) Patent No.: US 6,829,135 B2
(45) Date of Patent: Dec. 7, 2004

(54) LAYERED PRODUCT, CAPACITOR, ELECTRONIC COMPONENT AND METHOD AND APPARATUS MANUFACTURING THE SAME

(75) Inventors: Kazuyoshi Honda, Takasuki (JP); Noriyasu Echigo, Kobe (JP); Yoshiaki Kai, Neyagawa (JP); Masaru Odagiri, Hyogo (JP); Nobuki Sunagare, Matsue (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 276 days.

(21) Appl. No.: 09/979,873

(22) PCT Filed: Apr. 9, 2001

(86) PCT No.: PCT/JP01/03060

§ 371 (c)(1),
(2), (4) Date: Nov. 27, 2001

(87) PCT Pub. No.: WO01/80256

PCT Pub. Date: Oct. 25, 2001

(65) Prior Publication Data

US 2002/0158307 A1 Oct. 31, 2002

(30) Foreign Application Priority Data

Apr. 14, 2000 (JP) ........................................ 2000-113368
Apr. 28, 2000 (JP) ........................................ 2000-131579

(51) Int. Cl.⁷ ............................................. H01G 4/228
(52) U.S. Cl. ................. 361/306.1; 361/313; 361/321.2; 29/29.42
(58) Field of Search ........................... 361/301.1, 301.4, 361/302, 303, 304, 306.1, 306.3, 308.1, 313, 321.2, 321.3, 329, 328; 29/25.41, 25.42

(56) References Cited

U.S. PATENT DOCUMENTS 5,933,947 A    8/1999  Minamizawa et al.
6,370,013 B1   4/2002  Iino et al.

FOREIGN PATENT DOCUMENTS

| JP | 4-242908 | 8/1992 |
| JP | 6-176965 | 6/1994 |
| JP | 7-297077 | 11/1995 |
| JP | 8-264367 | 10/1996 |
| JP | 10-237623 | 9/1998 |
| JP | 10-270282 | 10/1998 |
| JP | 11-67581 | 3/1999 |
| JP | 2000-12367 | 1/2000 |
| JP | 2001-339164 | 12/2001 |

*Primary Examiner*—Anthony Dinkins
(74) *Attorney, Agent, or Firm*—Merchant & Gould P.C.

(57) ABSTRACT

Resin thin films (12) and metal thin films (11a, 11b) are layered in alternation. The metal thin films are set back from the peripheral edges of the resin thin films (12). Via holes (13a, 13b) penetrating the layered product in the layering direction are formed and filled with conductive material (14a, 14b). The conductive material (14a, 14b) electrically connects the metal thin films (11a, 11b) among one another. The metal thin films are not exposed at the periphery, so that corrosion of the metal thin films is not likely to occur. Furthermore, cutting of the metal thin films during the manufacturing process is avoided.

72 Claims, 23 Drawing Sheets

LAYERED PRODUCT, CAPACITOR, ELECTRONIC COMPONENT AND METHOD AND APPARATUS MANUFACTURING THE SAME

TECHNICAL FIELD

The present invention relates to a layered product of resin thin films and metal thin films, as well as a capacitor and an electronic component including such a layered product. Furthermore, the present invention relates to a suitable method and apparatus for manufacturing the same.

BACKGROUND ART

A method for manufacturing a layered product by taking a step of layering a resin thin film and a step of layering a metal thin film as one unit and repeating this unit of steps with respect to a rotating carrier, as well as a method for obtaining an electronic component such as a capacitor from the resulting layered product, are known for example from the Publication of Unexamined Japanese Patent Application (Tokkai) JP H10-237623A.

Referring to the accompanying drawings, the following is an explanation of an example of a method for manufacturing such a layered product of resin thin films and metal thin films.

FIG. 22 is a cross-sectional view schematically illustrating an example of a manufacturing apparatus for practicing a conventional method for manufacturing a layered product.

In FIG. 22, numeral 915 denotes a vacuum container, numeral 916 denotes a vacuum pump for sustaining a predetermined vacuum level inside the vacuum container 915. Numeral 911 denotes a cylindrical can roller arranged inside the vacuum container 915 and rotating in the direction of the arrow in FIG. 22. Numeral 912 denotes a resin thin film formation device. Numeral 913 denotes a patterning material application devices, and numeral 914 denotes a metal thin film formation device. Numeral 917 denotes a patterning material removing device. Numeral 918 denotes a resin curing device, and numeral 919 denotes a surface processing device. Numerals 920a and 920b denote partition walls for partitioning the metal thin film formation region from the other regions. Numeral 922 denotes an aperture provided in the partition walls 920a and 920b, and numeral 923 denotes a shielding plate for preventing the metal thin film from being formed outside the necessary times.

The resin thin film formation device 912 heats and gasifies or atomizes resin material for forming a resin thin film, and ejects the resin material toward the outer peripheral surface of the can roller 911. Because the can roller 911 is cooled to a predetermined temperature, the resin material cools and is deposited as a film on the outer peripheral surface of the can roller 911.

If necessary, the deposited thin film is cured to a desired curing degree by irradiating an electron beam or UV light or the like with the resin curing device 918.

Then, the formed resin thin film is plasma processed with a surface processing device 919 to activate the resin thin film surface, if necessary.

The patterning material application device 913 patterns metal thin film into a predetermined shape by forming margins (also referred to as "non-metallic bands" in the following in the metal thin films by so-called oil patterning. When a metal thin film is formed, for example by vapor deposition after forming a patterning material thinly on the resin thin film, the metal thin film is not formed on the patterning material, thus forming margins. The metal thin film formed in this manner is thus formed with the patterning portions missing, so that a metal thin film having the desired pattern can be formed. The pattern material is gasified inside the patterning material application device 913, and ejected from micro-holes formed at a predetermined position in opposition to the outer peripheral A surface of the can roller 911. A plurality of micro-holes are usually arranged at a predetermined spacing substantially in parallel to the rotation axis of the can roller 911. The plurality of bands of patterning material is applied thinly on the surface before forming the metal thin film.

Then, a metal thin film is formed, for example by vapor deposition, with the metal thin film formation device 914.

After that, excess patterning material is removed with the patterning material removing device 917.

When the shielding plate 923 of this manufacturing apparatus 900 is shifted to the side to open the aperture 922, a layered product is manufactured in which resin thin films formed with the resin thin film formation device 912 are layered in alternation with metal thin films formed with the metal thin film device 914 on the outer peripheral surface of the rotating can roller 911. Furthermore, when the shielding plate 923 of this manufacturing apparatus 900 closes the aperture 922, a layered product is manufactured in which resin thin films are formed continuously on the outer peripheral surface of the rotating can roller 911 with the resin thin film formation device 912. In addition, metal thin films with differing margin positions can be formed by shifting the patterning material application device 913 (for example, back and forth) in a direction parallel to the rotation axis of the can roller 911, in synchronization with the rotation of the can roller 911.

In this manner, a cylindrical multi-layer layered product of metal thin films and resin thin films is formed on the outer peripheral surface of the can roller 911, which then can be retrieved from the can roller 911 by cutting it in a radial direction, and pressing it flat to obtain a laminate base element 930, as shown for example in FIG. 23. In FIG. 23, numeral 931 denotes the resin thin films, numeral 932 denotes the metal thin films, numeral 933 denotes the margins (that is, the regions where no metal thin film is formed), and arrow 938 denotes the travel direction of the outer peripheral surface of the can roller 911. The laminate base element 930 in FIG. 23 is manufactured by layering a layer 936a, a layer 935a, a layer 934, a layer 935b, and a layer 936b in that order on a can roller 911. Here, the layers 936a and 936b are formed by shutting the shielding plate 923 and continuously layering resin thin film only, and the layers 934, 935a and 935b are formed by opening the shielding plate 923 and layering metal thin films 931 and resin thin films 932 in alternation. Furthermore, the layer 934 is layered while modifying the position at which patterning material is adhered once per rotation of the can roller 911.

A plurality of chip capacitors 940 as shown in FIG. 24 can be obtained by cutting the laminate base element 930 for example along the cutting planes 939a and 939b, and forming external electrodes on the cutting planes 939a. In FIG. 24, the numerals 941a and 941b denote external electrodes that are electrically connected to the metal thin films 931.

In the capacitor obtained with this method, the thickness of the resin thin films serving as the dielectric layer can be made extremely thin, so that a small capacitor with a large capacitance is obtained.

However, the following problems occur when manufacturing electronic components, such as capacitors, with the above-described method.

First of all, when the laminate base element 930 is cut at the cutting planes 939a and 939b, it is necessary to cut through the metal thin films 931 as well. The cutting is performed by shearing with a blade, for example, and burrs or metal chips of the metal thin films 931 are produced at the cutting planes. Because the resin thin films and metal thin films obtained with this method are extremely thin, the burrs or cutting chips of the metal thin films 931 may cause short circuits between the metal thin films on the upper and lower side of a resin thin film. This may lead to a decrease in the withstand voltage or the insulation resistance of the resulting capacitor.

Furthermore, to cut the metal thin films, a cutting force is necessary that is much larger than that for cutting the resin thin films. Consequently, when the cutting conditions are not appropriate, the layered product may be deformed near the cutting planes or the metal thin films may be drawn out and damaged inside the layered product, due to the cutting of the metal thin films. If the layered product is used as an electronic component, then deformations of the external shape of the layered product may decrease the mounting properties for mounting on a circuit board. Moreover, damage to the metal thin films inside the layered product worsens the properties of the electronic component and lowers the yield.

Furthermore, the cutting of the metal thin films means that metal thin films will be exposed at the cutting planes. Exposing the metal thin films at the cutting planes leads to corrosion due to oxidation or rusting. When the metal thin films functioning as electrodes are corroded, the reliability of the resulting electronic component is severely reduced. In order to prevent this, it is necessary to protect the electronic component at the cutting plane with a resin coating, for example, which increases the number of processes and thus adds to the costs.

Also, when the metal thin films are exposed at the cutting planes, solder may adhere to the exposed metal thin films when mounting the electronic component on a circuit board, thus causing short circuits. In order to prevent this, special care has to be taken during the mounting, thus putting restrictions on the mounting.

To form external electrodes electrically connecting the metal thin films, it is in any case necessary to cut and expose the metal thin films. However, it is desirable that the metal thin films are not cut at those cutting planes where no external electrodes are to be formed at a later time, and it is desirable that the metal thin films are not exposed at the cutting planes.

Furthermore, in the capacitor in FIG. 24, one chip constitutes one capacitor element. Consequently, when it is necessary to install a plurality of capacitors on a circuit board, the same number of capacitors are necessary, which hampers the miniaturization of the mounting area and increases the number of processing steps. Furthermore, to accelerate the driving of semiconductor chips, it is advantageous to shorten the connection circuit paths from the semiconductor chip to the peripheral components, but if many capacitors are mounted, the circuit paths invariably become long, thus hampering the acceleration of the signal processing.

DISCLOSURE OF THE INVENTION

It is an object of the present invention to solve one or more of those problems of the related art.

First Aspect of the Invention

An object of the first aspect of the present invention is to present a layered product and a capacitor in which the cutting of the metal thin films is avoided whenever possible, and the metal thin films are not exposed at the cutting planes whenever possible, as well as a method and an apparatus for manufacturing the same. Another object of the first aspect of the present invention is to present an array capacitor, including a plurality of capacitors in one element, which can be combined with other elements, as well as a method and an apparatus for manufacturing the same.

In order to attain these objects, the first aspect of the present invention has the following configuration.

A first layered product in a first aspect of the present invention is a layered product of a plurality of resin thin films and a plurality of metal thin films, wherein edges of the metal thin films are not exposed on the outside of the layered product, wherein at least one layer of the resin thin films is provided with a via hole in the layering direction, wherein the via hole electrically connects upper and lower metal thin films, and wherein the via hole can provide an electrical lead to the outside for at least one layer of the metal thin films.

With this first layered product, the edges of the metal thin films are not exposed to the outside of the layered product, so that corrosion of the metal thin films is unlikely to occur. Furthermore, the metal thin films are not cut during the manufacturing process, so that problems occurring during the cutting of the metal thin films, such as burrs or cutting chips of the metal thin films, damage to the metal thin films, or deformation of the layered product, can be suppressed. Also, a layered product that can be used as an electronic component can be provided, because the via hole can provide an electrical lead to the outside for at least one layer of the metal thin films.

A second layered product in the first aspect of the present invention is a layered product of a plurality of resin thin films and a plurality of metal thin films, wherein at least one layer of the resin thin films is provided with a cutout portion in a portion of its periphery, wherein the cutout portion electrically connects upper and lower metal thin films, and wherein the cutout portion can provide an electrical lead to the outside for at least one layer of the metal thin films.

This second layered product can provide a layered product that can be used as an electronic component, because the cutout portion can serve as an electrical lead to the outside for at least one layer of the metal thin films.

In the second layered product, it is preferable that the resin thin films are substantially rectangular, and the metal thin films are set back from all sides of the resin thin films except the sides where the cutout portions of the resin thin films are formed. With this preferable to configuration, the edges of the metal thin films are set back from the edges of the resin thin films, so that only little of the metal thin films is exposed to the outside of the layered product. Consequently, corrosion of the metal thin films is unlikely to occur. Furthermore, only little of the metal thin films is cut during the manufacturing process, so that problems occurring during the cutting of the metal thin films, such as burrs or cutting chips of the metal thin films, damage to the metal thin films, or deformation of the layered product, can be suppressed.

A first capacitor in the first aspect of the present invention includes a layered product of a plurality of resin thin films and a plurality of metal thin films, wherein edges of the metal thin films are not exposed to the outside of the layered product, wherein at least one layer of the resin thin films is provided with a via hole in the layering direction, wherein the via hole electrically connects the metal thin films such that every other of the metal thin films is on the same potential, and wherein the via hole can provide an electrical lead to the outside for the metal thin films put on the same potential.

In this first capacitor, the edges of the metal thin films are not exposed to the outside of the layered product, so that corrosion of the metal thin films is unlikely to occur. Furthermore, the metal thin films are not cut during the manufacturing process, so that problems occurring during the cutting of the metal thin films, such as burrs or cutting chips of the metal thin films, damage to the metal thin films, or deformation of the layered product, can be suppressed. Also, every other metal thin film is connected and can be electrically connected to the outside, so that taking the resin thin films as a dielectric layer, it can function as a capacitor. Furthermore, the via hole formed in the resin thin films can provide an electrical lead, so that mounting is possible with a small mounting area and a high mounting density.

A second capacitor in the first aspect of the present invention includes a layered product of a plurality of resin thin films and a plurality of metal thin films, wherein at least one layer of the resin thin films is provided with a cutout portion in a portion of its periphery, wherein the cutout portion electrically connects the metal thin films such that every other of the metal thin films is on the same potential, and wherein the cutout portion can provide an electrical lead to the outside for the metal thin films put on the same potential.

With this second capacitor, every other metal thin film is connected and can be electrically connected to the outside, so that taking the resin thin films as a dielectric layer, it can function as a capacitor. Furthermore, the cutout portion formed in the resin thin films can provide an electrical lead, so that mounting is possible with a small mounting area and a high mounting density.

In this second capacitor, it is preferable that the resin thin films are substantially rectangular, and the metal thin films are set back from all sides of the resin thin films except the sides where the cutout portions of the resin thin films are formed. With this preferable configuration, the edges of the metal thin films are set back from the edges of the resin thin films, so that only little of the metal thin films is exposed to the outside of the layered product. Consequently, corrosion of the metal thin films is unlikely to occur. Furthermore, only little of the metal thin films is cut during the manufacturing process, so that problems occurring during the cutting of the metal thin films, such as burrs or cutting chips of the metal thin films, damage to the metal thin films, or deformation of the layered product, can be suppressed.

According to the first aspect of the present invention, a first method for manufacturing a layered product comprising resin thin films and metal thin films layered in alternation includes a step of forming the resin thin films and the metal thin films in alternation by forming the metal thin films within a formation region of the resin thin films, such that the formation area of the metal thin films is smaller than the formation area of the resin thin films, and modifying the formation position of the metal thin films for each metal thin film layer, a step of forming a via hole penetrating the resin thin films and the metal thin films, and a step of filling conductive material into the via hole to electrically connect at least some of the metal thin films with the conductive material.

Furthermore, according to the first aspect of the present invention, in a second method for manufacturing a layered product comprising resin thin films and metal thin films layered in alternation by, taking as one unit a step of forming a resin thin film, a step of forming a metal thin film, and a step of forming a via hole penetrating the resin thin film and the metal thin film at a predetermined position, and repeating this unit of steps with respect to a carrier, the metal thin films are formed within a formation region of the resin thin films, such that the formation area of the metal thin films is smaller than the formation area of the resin thin films, the formation position of the metal thin films is modified for each metal thin film layer, the via hole is formed continuously in a layering direction, and this continuous via hole is filled with conductive material, electrically connecting at least some of the metal thin films with the conductive material.

Furthermore, according to the first aspect of the present invention, in a third method for manufacturing a layered product comprising resin thin films and metal thin films layered in alternation by, taking as one unit a step of forming a resin thin film, a step of forming a via hole in that resin thin film, and a step of forming a metal thin film on top of the resin thin film, and repeating this unit of steps with respect to a carrier, the metal thin films are formed within a formation region of the resin thin films, such that the formation area of the metal thin films is smaller than the formation area of the resin thin films, the formation position of the metal thin films is modified for each metal thin film layer, and the via hole is formed in the formation region of the metal thin films, so that a plurality of metal thin films are electrically connected in a layering direction by the via hole.

With these first to third manufacturing methods, the layered product of the first aspect of the present invention can be manufactured efficiently.

A first method for manufacturing a capacitor according to the first aspect of the present invention includes a step of forming resin thin films and metal thin films in alternation by forming the metal thin films within a formation region of the resin thin films, such that the formation area of the metal thin films is smaller than the formation area of the resin thin films, and modifying the formation position of the metal thin films for each metal thin film layer, a step of forming a via hole penetrating the resin thin films and the metal thin films, and a step of filling conductive material into the via hole to electrically connect every other of the metal thin films.

In a second method for manufacturing a capacitor according to the first aspect of the present invention by taking as one unit a step of forming a resin thin film, a step of forming a metal thin film, and a step of forming a via hole penetrating the resin thin film and the metal thin film at a predetermined position, and repeating this unit of steps with respect to a carrier, the metal thin films are formed within a formation region of the resin thin films, such that the formation area of the metal thin films is smaller than the formation area of the resin thin films, the formation position of the metal thin films is modified for each metal thin film layer, the via hole is formed continuously in a layering direction, and this continuous via hole is filled with conductive material, electrically connecting every other of the metal thin films.

In a third method for manufacturing a capacitor according to the first aspect of the present invention by taking as one unit a step of forming a resin thin film, a step of forming a via hole in that resin thin film, and a step of forming a metal thin film on top of the resin thin film, and repeating this unit of steps with respect to a carrier, the metal thin films are formed within a formation region of the resin thin films, such that the formation area of the metal thin films is smaller than the formation area of the resin thin films, the formation position of the metal thin films is modified for each metal thin, film layer, and the via hole is formed in the region where the metal thin films are formed, so that the via hole electrically connects every other of the metal thin films.

With these first to third manufacturing methods, the capacitor of the first aspect of the present invention can be manufactured efficiently.

A first apparatus for manufacturing the layered product of the first aspect of the present invention includes a rotating carrier, a metal thin film formation device and a resin thin film formation device arranged in opposition to the carrier, a vacuum container accommodating the rotating carrier, the metal thin film formation device and the resin thin film formation device, and a laser patterning device for machining metal thin films, arranged downstream from the metal thin film formation device and upstream from the resin thin film formation device. For the purposes of the present application, upstream and downstream are relative to the rotating movement of the carrier.

With this first manufacturing apparatus, it is easy to form metal thin films with the desired margins. Thus, using this manufacturing apparatus, the layered product of the first aspect of the present invention can be manufactured efficiently.

A second apparatus for manufacturing the layered product of the first aspect of the present invention includes a rotating carrier, a metal thin film formation device and a resin thin film formation device arranged in opposition to the carrier, a vacuum container accommodating the rotating carrier, the metal thin film formation device and the resin thin film formation device, a laser machining device for forming holes in a layering direction, and an oil application device for applying oil on a resin thin film, arranged downstream from the resin thin film formation device and upstream from the metal thin film formation device.

This second manufacturing apparatus uses a laser machining device for forming holes in a layering direction, so that it is possible to make via holes (and second via holes) penetrating the resin thin films (and metal thin films). Furthermore, with the oil application device, it is possible to obtain metal thin films having the desired margins. Consequently, using this manufacturing apparatus, the layered product of the first aspect of the present invention can be manufactured efficiently.

A third apparatus for manufacturing the layered product of the first aspect of the present invention includes a rotating carrier, a metal thin film formation device and a resin thin film formation device arranged in opposition to the carrier, a vacuum container accommodating the rotating carrier, the metal thin film formation device and the resin thin film formation device, and an oil application device for applying oil on a resin thin film, arranged downstream from the resin thin film formation device and upstream from the metal thin film formation device, wherein the oil application device comprises at least one pair of nozzles having a certain arrangement of micro-holes.

With this third manufacturing apparatus, it is easy to obtain metal thin films having the desired margins with the oil application device. Especially since the oil application device includes at least one pair of nozzles, it is easy to obtain metal thin films formed with grid-shaped margins, by shifting the nozzles independently. Consequently, using this manufacturing apparatus, the layered product of the first aspect of the present invention can be manufactured efficiently.

A fourth apparatus for manufacturing the layered product of the first aspect of the present invention includes a rotating carrier, a metal thin film formation device and a resin thin film formation device arranged in opposition to the carrier, a vacuum container accommodating the rotating carrier, the metal thin film formation device and the resin thin film formation device, a laser machining device for forming holes in a layering direction, an oil application device for applying oil on a resin thin film, arranged downstream from the resin thin film formation device and upstream from the metal thin film formation device, and a laser patterning device for machining metal thin films, arranged downstream from the metal thin film formation device and upstream from the resin thin film formation device.

This fourth manufacturing apparatus uses a laser machining device for forming holes, so that it is possible to make via holes (and second via holes) penetrating the resin thin films (and metal thin films). Furthermore, with the oil application device and the laser patterning device, it is possible to obtain metal thin films having the desired margins. Consequently, using this manufacturing apparatus, the layered product of the first aspect of the present invention can be manufactured efficiently.

Second Aspect of the Invention

An object of the second aspect of the present invention is to present a method for manufacturing a layered product in which the cutting of the metal thin films is avoided whenever possible. Another object of the second aspect of the present invention is to present a method for manufacturing an electronic component, in which the metal thin films are cut only at the cutting planes on which external electrodes are formed. A further object of the second aspect of the present invention is to present an electronic component, in which the metal thin films are not exposed at cutting planes on which no external electrodes are formed.

In order to attain these objects, the second aspect of the present invention has the following configuration.

In accordance with the second aspect of the present invention, a method for manufacturing a layered product having resin thin films and metal thin films on a carrier includes a step of forming a resin thin film and a step of forming a metal thin film by deposition of metal material in a vacuum process, the steps being performed on a rotating carrier, wherein the metal thin films are partitioned into a substantially rectangular shape by first non-metallic bands formed in a travel direction of the carrier and second non-metallic bands formed in a direction substantially perpendicular to the travel direction of the carrier.

By cutting in the layering direction along the non-metallic bands, it is possible to reduce the possibility of cutting the metal thin films. Consequently, it is possible to prevent short circuits among the metal thin films resulting from burrs or cutting chips of the metal thin films that can occur during the cutting of the metal thin films. Furthermore, it is possible to prevent deformations of the layered product and damage to the metal thin films from occurring due to the cutting resistance of the metal thin films. Moreover, the metal thin films can be prevented from being exposed at the cutting planes, so that corrosion of the metal thin films is prevented, and the limitations on the mounting as an electronic component can reduced.

In accordance with the second aspect of the present invention, a method for manufacturing an electronic component includes performing on a rotating carrier a step of forming a resin thin film and a step of forming a metal thin film by deposition of metal material in a vacuum process, to manufacture a layered product including resin thin films and metal thin films on a carrier, cutting the layered product in a layering direction, and forming an external electrode, wherein the metal thin films formed on the carrier are partitioned into a substantially rectangular shape by first non-metallic bands formed in a travel direction of the carrier and second non-metallic bands formed in a direction substantially perpendicular to the travel direction of the carrier, and wherein at least a portion of said cutting is performed along at least a portion of the non-metallic bands.

By cutting in the layering direction along the non-metallic bands, it is possible to reduce the possibility of cutting the metal thin films. Consequently, it is possible to prevent short circuits among the metal thin films resulting from burrs or cutting chips of the metal thin films that can occur during the cutting of the metal thin films. Furthermore, it is possible to prevent deformations of the layered product and damage to the metal thin films from occurring due to the cutting resistance of the metal thin films. Moreover, the metal thin films can be prevented from being exposed at the cutting planes, so that corrosion of the metal thin films is prevented, and the limitations on the mounting as an electronic component can reduced.

A first electronic component in accordance with the second aspect of the present invention includes a layered product including at least two layers each of resin thin films and metal thin films, and an electrode formed on a portion of a lateral surface of the layered product, the direction normal to the lateral surface being different from the layering direction, the electrode being electrically connected to the metal thin films, wherein the metal thin films are not exposed at lateral surfaces where the layered product is not provided with electrodes.

A second electronic component in accordance with the second aspect of the present invention includes at least two layers each of resin thin films and metal thin films, and an electrode formed to electrically connect the metal thin films at a portion of the cutting plane, wherein the metal thin films are not exposed at cutting planes not provided with electrodes.

With these first and second electronic components, no metal thin films are exposed at the faces on which electrodes are formed, so that corrosion of the metal thin films can be prevented, and limitations on the mounting can be reduced.

BRIEF DESCRIPTION OF THE DRAWINGS

FIG. 1A is a cross-sectional view taken from the front, FIG. 1B is a side view taken from the right, FIG. 1C is a plan view, FIG. 1D is a cross-sectional view along line D—D in FIG. 1A taken from the arrow direction, and FIG. 1E is a cross-sectional view along line E—E in FIG. 1A taken from the arrow direction.

FIG. 3A is a cross-sectional view taken from the front, FIG. 3B is a side view taken from the right, FIG. 3C is a bottom view, FIG. 3D is a cross-sectional view along line D—D in FIG. 3A taken from the arrow direction, and FIG. 3E is a cross-sectional view along line E—E in FIG. 3A taken from the arrow direction.

FIG. 5A is a cross-sectional view taken from the front, FIG. 5B is a side view taken from the right, FIG. 5C is a plan view, FIG. 5D is a cross-sectional view along line D—D in FIG. 5A taken from the arrow direction, and FIG. 5E is a cross-sectional view along line E—E in FIG. 5A taken from the arrow direction.

FIG. 7A is a cross-sectional view taken from the front, FIG. 7B is a side view taken from the right, FIG. 7C is a bottom view, FIG. 7D is a cross-sectional view along line D—D in FIG. 7A taken from the arrow direction, and FIG. 7E is a cross-sectional view along line E—E in FIG. 7A taken from the arrow direction.

FIG. 9A is a front view taken from the side of the can roller, and FIG. 9B is a cross-sectional view along line B—B in FIG. 9A.

FIG. 16A is a front view, FIG. 16B is a plan view, FIG. 16C is a cross-sectional view taken in the arrow direction along line I—I in FIG. 16A, and FIG. 16D is a cross-sectional view taken in the arrow direction along line II—II in FIG. 16A.

BEST MODE FOR CARRYING OUT THE INVENTION

First Aspect of the Invention

The following is a detailed description of the first aspect of the present invention, with reference to the accompanying drawings.

A. Layered Product and Capacitor

The following is a description of embodiments of a layered product and a capacitor in accordance with the first aspect of the present invention.

Embodiment A-1

Figure 1C:
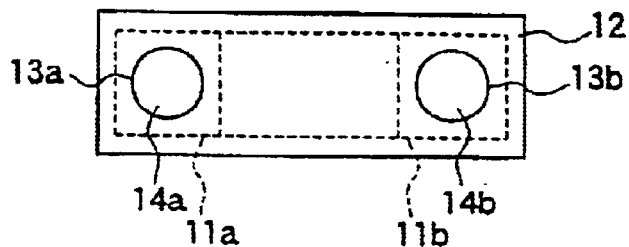
FIGS. 1A to 1E show the general configuration of a chip capacitor using a layered product in accordance with Embodiment A-1 of the present invention.
Figure 1D:
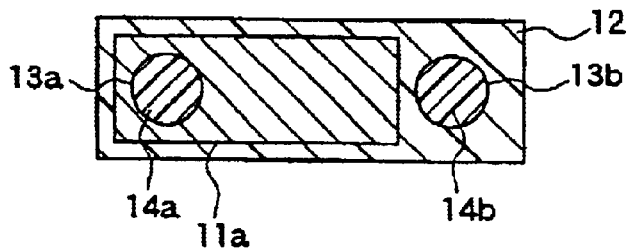
Figure 1E:
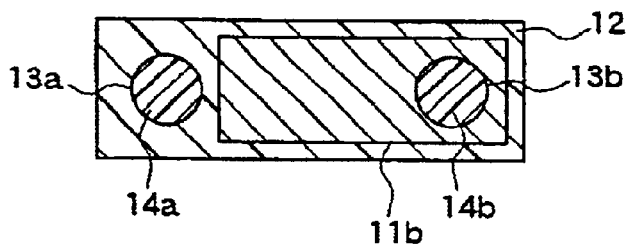
Figure 1A:
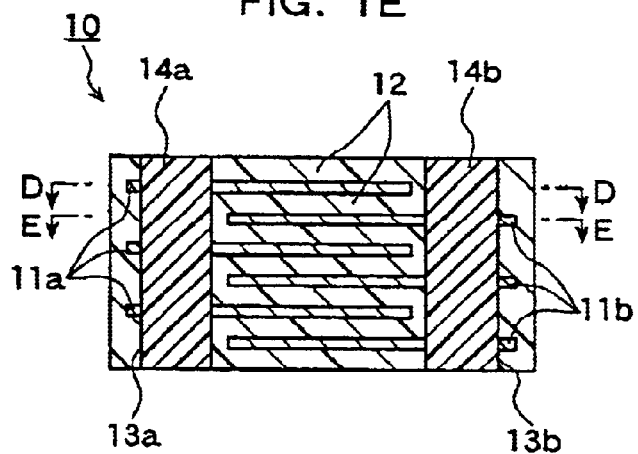
Figure 1B:
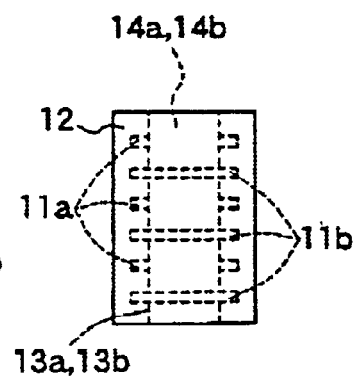

FIGS. 1A to 1E show the general configuration of a chip capacitor using a layered product in accordance with Embodiment A-1 of the present invention. FIG. 1A is a cross-sectional view taken from the front, FIG. 1B is a side view taken from the right, FIG. 1C is a plan view, FIG. 1D is a cross-sectional view along line D—D in FIG. 1A taken from the arrow direction, and FIG. 1E is a cross-sectional view along line E—E in FIG. 1A taken from the arrow direction. The drawings schematically illustrate the layering configuration, but the dimensions and number of layers in the actual layered product may vary widely from those shown in the drawings.

In the layered product 10 of this embodiment, metal thin films 11a and 11b are layered in alternation at different formation positions, and a resin thin film 12 is layered between the metal thin films 11a and the metal thin films 11b. The formation regions of the metal thin films 11a and 11b are smaller than the formation regions of the resin thin films 12, and the edges of the metal thin films 11a and 11b are not exposed at the outer peripheral surface of the layered product 10. Two via holes 13a and 13b penetrating the layered product 10 in a layering direction are formed at a predetermined distance from one another. Their relation to the metal thin films is such that one via hole 13a penetrates only the metal thin films 11a, and the other via hole 13b penetrates only the metal thin films 11b. The two via holes 13a and 13b are filled with conductive material 14a and 14b. The conductive material 14a is electrically connected to the metal thin films 11a but insulated from the metal thin films 11b, whereas the conductive material 14b is electrically connected to the metal thin films 11b but insulated from the metal thin films 11a.

Thus, the conductive material 14a and 14b exposed on the upper and lower surfaces of the layered product 10 can serve as electrode leads (lead electrodes), and by placing them at different potentials a capacitor is attained, in which the metal thin films 11a and 11b serve as electrodes and the resin thin films 12 serve as dielectric layers.

It is also possible to form electrode terminals (protrusion (bump) electrodes) made, for example, of gold, silver, aluminum, copper, solder, conductive paste or conductive polymer on the conductive material 14a and 14b exposed on the outer surface.

Figure 2:
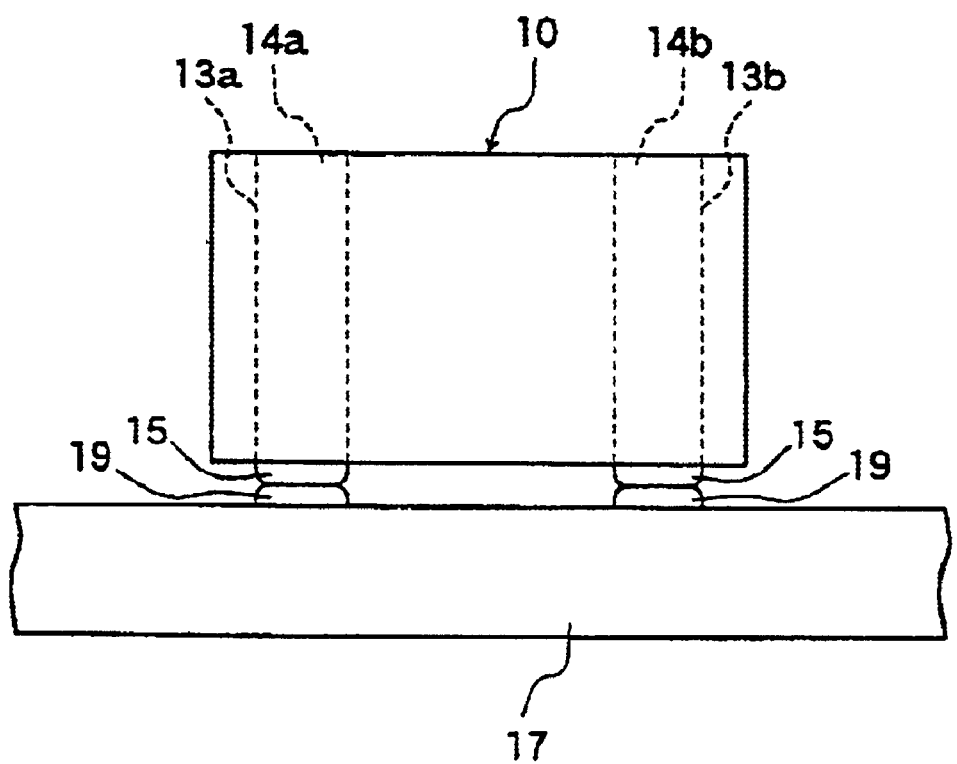
FIG. 2 is a schematic side view of an embodiment in which the capacitor of Embodiment A-1 has been mounted on a circuit board.
Figure 24:
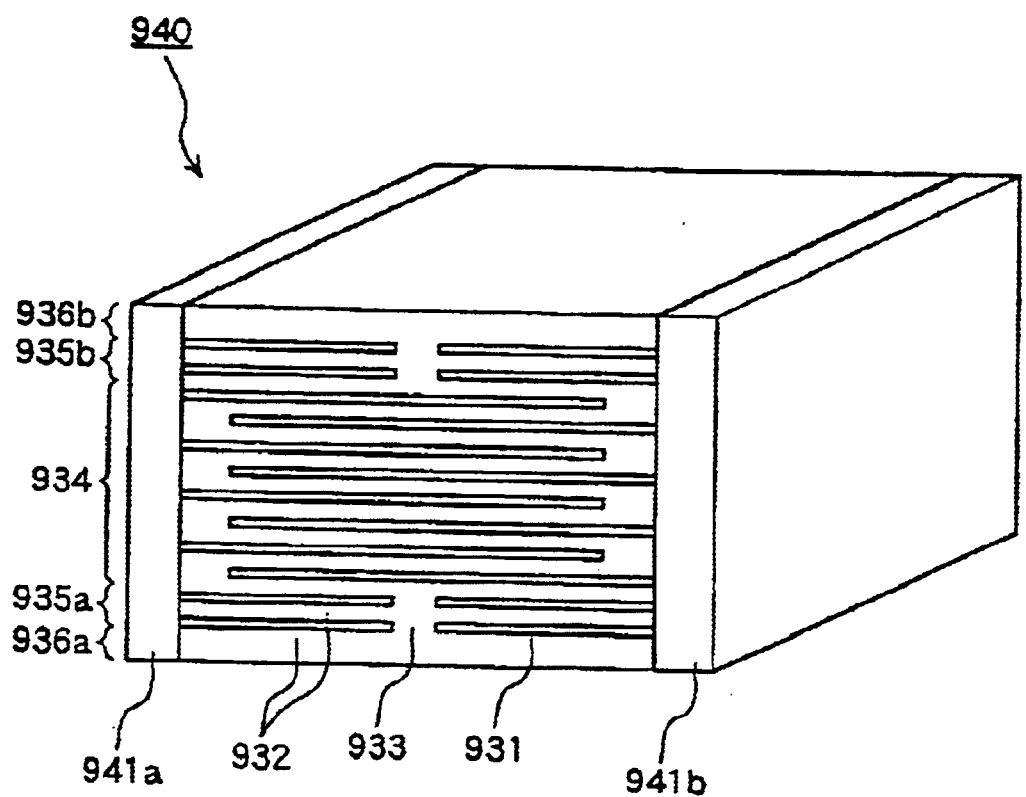
FIG. 24 is a perspective view showing the general configuration of conventional chip capacitor.

FIG. 2 is a schematic side view of an embodiment in which the capacitor 10 shown in FIGS. 1A to 1E has been mounted on a circuit board 17. Electrode terminals 15 formed on the conductive material 14a and 14b filled into the via holes 13a and 13b are connected to electrode terminals 19 on the circuit board 17. In the conventional chip capacitor 940 shown in FIG. 24, a mounting area that is larger than the projection area of the upper side of the chip capacitor 940 is necessary, because the electrodes 941a and 941b are formed on the lateral surfaces. By contrast, in the capacitor of this embodiment, the lead electrodes are formed on the lower surface, so that the necessary mounting area can be approximately the same as the projection area of the upper side of the capacitor 10. Consequently, mounting with higher density becomes possible.

In FIG. 2, electrode terminals 15 are formed on the conductive material 14a and 14b, and the electrode terminals 15 are connected to electrode terminals 19 on the circuit board 17, but it is also possible to connect the conductive material 14a and 14b directly with the electrode terminals 19 on the circuit board 17 without providing the electrode terminals 15.

In FIGS. 1A to 1E, the conductive material 14a and 14b is filled into the via holes 13a and 13b penetrating the capacitor 10 in the layering direction, so that electrode leads can be provided from either of the upper and lower surfaces, but it is also possible to provide the holes 13a and 13b as blind via holes formed on only one of the upper and lower surfaces and not going through all the way, and fill them with conductive material, so that a capacitor is obtained in which the lead electrodes are formed only on one surface.

The FIGS. 1A to 1E illustrate an example of a layered product serving as a capacitor, but possible applications for the layered product include not only capacitors, but also coils, noise filters, or layered circuit boards. In those cases, it is possible to modify the layering configuration and the connection between the metal thin films and the lead electrodes in accordance with the application.

Embodiment A-2

Figure 3D:
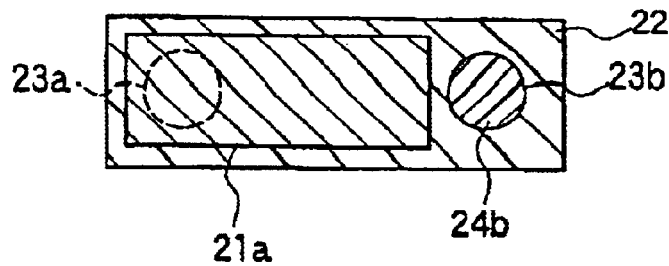
FIGS. 3A to 3E show the general configuration of a chip capacitor using a layered product in accordance with Embodiment A-2 of the present invention.
Figure 3E:
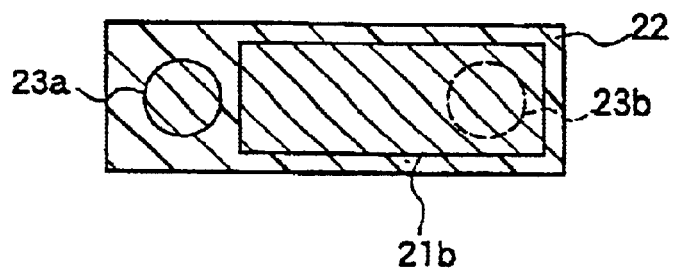
Figure 3A:
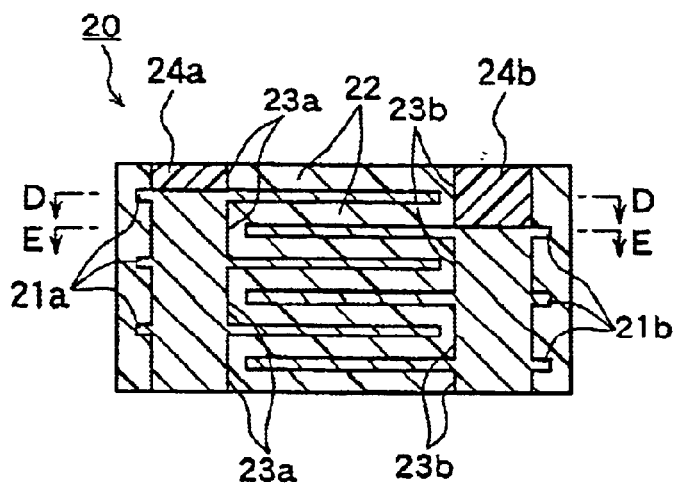
Figure 3B:
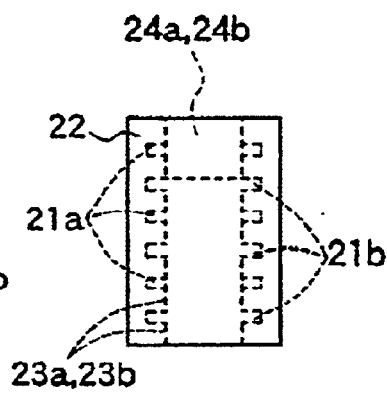
Figure 3C:
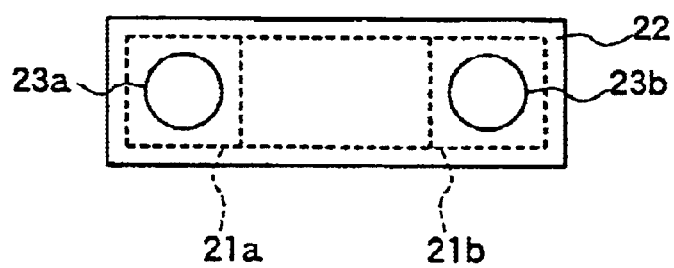

FIGS. 3A to 3E show the general configuration of a chip capacitor using a layered product in accordance with Embodiment A-2 of the present invention. FIG. 3A is a cross-sectional view taken from the front, FIG. 3B is a side view taken from the right, FIG. 3C is a bottom view, FIG. 3D is a cross-sectional view along line D—D in FIG. 3A taken from the arrow direction, and FIG. 3E is a cross-sectional view along line E—E in FIG. 3A taken from the arrow direction. The drawings schematically illustrate the layering configuration, but the dimensions and number of layers in the actual layered product may vary widely from those shown in the drawings.

In the layered product 20 of this embodiment, metal thin films 21a and 21b are layered in alternation at different formation positions, and a resin thin film 22 is layered between the metal thin films 21a and the metal thin films 21b. The formation regions of the metal thin films 21a and 21b are smaller than the formation regions of the resin thin films 22, and the edges of the metal thin films 21a and 21b are not exposed to the outer peripheral surface of the layered product 20. Two via holes 23a and 23b penetrating the resin thin films 22 in the layering direction are formed at a predetermined distance from one another. The via hole 23a is formed within the formation region of the metal thin films 21a but outside the formation region of the metal thin films 21b, and the material of the metal thin films 21a filled into the via hole 23a electrically connects the various layers of metal thin films 21a. Similarly, the via hole 23b is formed within the formation region of the metal thin films 21b but outside the formation region of the metal thin films 21a, and the material of the metal thin films 21b filled into the via hole 23b electrically connects the various layers of metal thin films 21b. Thus, the metal thin films 21a and the metal thin films 21b are electrically insulated from one another. The same material as the material of the metal thin films 21a and 21b is filled into the via holes 23a and 23b below the uppermost of the metal thin films 21a and 21b. The via holes 23a and 23b above the uppermost metal thin films 21a and 21b are filled with conductive materials 24a and 24b, if necessary.

Thus, the material of the metal thin films 21a and 21b in the via holes 23a and 23b at the lower surface of the layered product, and the conductive material 24a and 24b in the via holes 23a and 23b at the upper surface of the layered product can serve as electrode leads (lead electrodes), and by placing them at different potentials, a capacitor is attained, in which the metal thin films 21a and 21b serve as electrodes and the resin thin films 22 serve as the dielectric layers.

It is also possible to form electrode terminals (protrusion (bump) electrodes) made, for example, of gold, silver, aluminum, copper, solder, conductive paste or conductive polymer on the metal thin film material and/or the conductive material 24a and 24b in the via holes 23a and 23b exposed on the outer surface.

As in Embodiment A-1, the capacitor of this embodiment can be mounted as shown in FIG. 2, thus making mounting at high densities possible.

In FIGS. 3A to 3E, the via holes 23a and 23b penetrate the capacitor 20 in the layering direction, so that electrode leads can be provided from either of the upper and lower surfaces, but it is also possible to form the holes 23a and 23b such that they do not penetrate the upper surface (that is, not provide via holes in the upper resin layer above the uppermost metal thin films 21a and 21b), so that a capacitor is obtained in which the lead electrodes are formed only on the lower surface.

The FIGS. 3A to 3E illustrate an example of a layered product serving as a capacitor, but possible applications for the layered product include not only capacitors, but also coils, noise filters, or layered circuit boards. In those cases, it is possible to modify the layering configuration and the connection between the metal thin films and the lead electrodes in accordance with the application.

Embodiment A-3

Figure 4A:
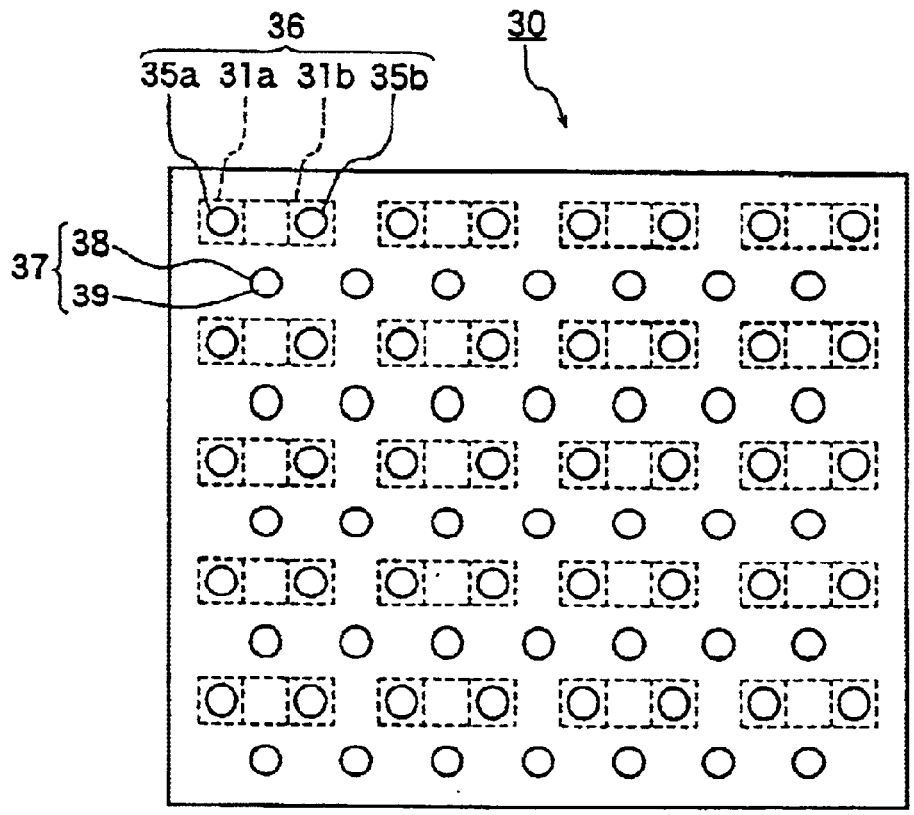
FIG. 4A is a plan view showing the general configuration of a capacitor (array capacitor) in accordance with Embodiment A-3 of the present invention.
Figure 4B:
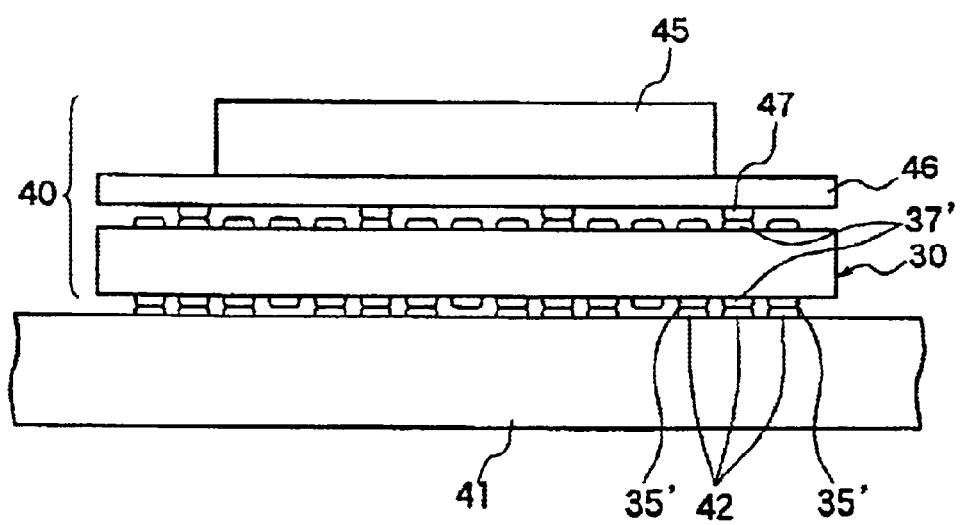
FIG. 4B is a side view showing an example in which the capacitor of 4A is mounted on a circuit board.

FIG. 4A is a plan view showing the general configuration of a capacitor (array capacitor) in accordance with Embodiment A-3 of the present invention, and FIG. 4B is a side view showing an example in which the capacitor of 4A is mounted on a circuit board.

As shown in FIG. 4A, the array capacitor 30 is made by arranging capacitor elements 36, which function independently as capacitors, horizontally and vertically in a grid-like fashion. The capacitor elements 36 have the same configuration as the capacitors described in the Embodiments A-1 or A-2. That is to say, the capacitor elements 36 are made of resin thin films and metal thin films 31a and 31b, layered in alternation. The metal thin films 31a and 31b are connected to a pair of lead electrodes 35a and 35b.

Via electrodes 37 are formed as necessary in the regions where the capacitor elements 36 are not formed. The via electrodes 37 are made by filling conductive material 39 into via holes (second via holes) 38 penetrating the array capacitor 30 in thickness direction. The via electrodes 37 are insulated from the metal thin films 31a and 31b of the capacitor elements 36.

It is also possible to form electrode terminals (protrusion (bump) electrodes) made, for example, of gold, silver, aluminum, copper, solder, conductive paste or conductive polymer on the lead electrodes 35a and 35b and the via electrodes 37.

FIG. 4B shows a mounting example. An array capacitor 30 and a carrier 46 equipped with a semiconductor chip 45 are placed on top of one another on a circuit board 41. Some of the electrode terminals 42 provided on the circuit board 41 are connected to electrode terminals 35' formed on the lead electrodes of the capacitor elements 36 of the array capacitor 30. Moreover, other electrode terminals 42 of the circuit board 41 are connected to electrode terminals 37' formed on the via electrodes 37 of the array capacitor 30, and through the via electrodes 37 with the electrode terminals 47 of the carrier 46, and are thus connected to the semiconductor chip 45.

By providing the array capacitor with a plurality of separate capacitor elements 36 formed on the same surface, the mounting area can be made smaller than when the capacitors are provided as separate independent capacitors. Also, the mounting process becomes simpler. Also, since the electrodes (metal thin films) that are part of the individual capacitor elements are independent even when a plurality of capacitor elements are integrated into one element, there is almost no interference between the capacitor elements, and stray capacitances hardly occur.

Furthermore, when the array capacitor is provided with the via electrodes 37, it is possible to mount other electronic components (such as the semiconductor chip 45 in the foregoing example) on the array capacitor, so that the electronic component is electrically connected to the substrate 41 over the via electrodes 37. As a result, the mounting area can be made smaller, and the capacitor can be arranged near the mounted electronic component, which makes high-frequency driving of the electronic component possible.

Moreover, it is also possible to accommodate the array capacitor 30, the carrier 46, and the semiconductor chip 45 mounted on top of the carrier 46 in one package that is part of a semiconductor integrated circuit 40. With such a semiconductor integrated circuit 40, it is possible to treat this semiconductor component performing a certain function as one unit, and make the mounting steps simpler than when mounting the semiconductor components separately.

It is also possible to use the array capacitor 30 as a part of an insulating substrate provided with via holes, in a multi-layer wiring board, in which a plurality of insulating substrates is layered with predetermined wiring pattern layers, and in which the wiring pattern layers are connected by via holes formed in the thickness direction of the insulating substrates. With this configuration, it is possible to accommodate a capacitor element inside the multi-layer circuit board, and the mounting area can be made much smaller and the mounting process can be made simpler than when the capacitor is mounted on the substrate surface.

Embodiment A-4

Figure 5C:
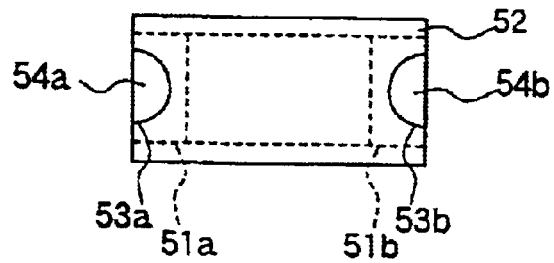
FIGS. 5A to 5E show the general configuration of a chip capacitor using a layered product in accordance with Embodiment A-4 of the present invention.
Figure 5D:
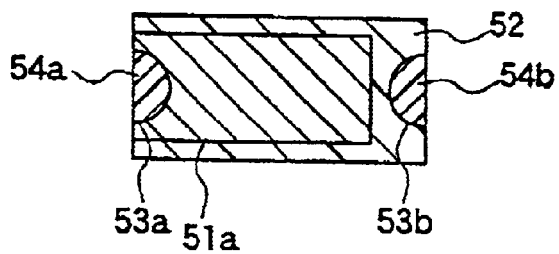
Figure 5E:
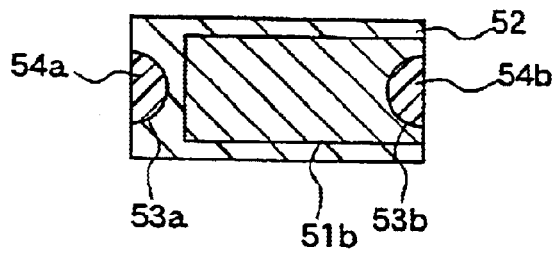
Figure 5A:
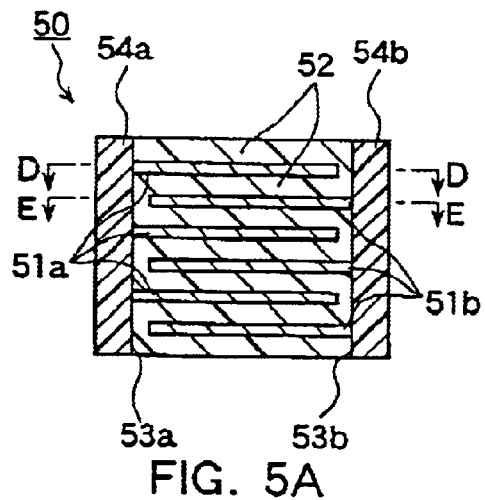
Figure 5B:
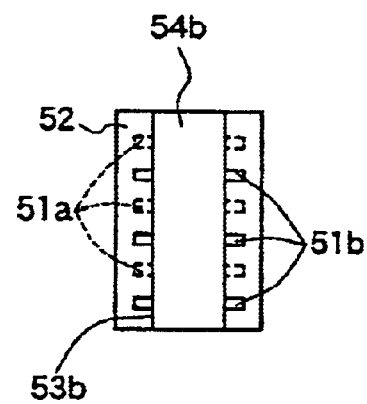

FIGS. 5A to 5E show the general configuration of a chip capacitor using a layered product in accordance with Embodiment A-4 of the present invention. FIG. 5A is a cross-sectional view taken from the front, FIG. 5B is a side view taken from the right, FIG. 5C is a plan view, FIG. 5D is a cross-sectional view along line D—D in FIG. 5A taken from the arrow direction, and FIG. 5E is a cross-sectional view along line E—E in FIG. 5A taken from the arrow direction. The drawings schematically illustrate the layering configuration, but the dimensions and number of layers in the actual layered product may vary widely from those shown in the drawings.

In the layered product 50 of this embodiment, metal thin films 51a and 51b are layered in alternation at different formation positions, and resin thin films 52 are layered between the metal thin films 51a and the metal thin films 51b. Cutout portions 53a and 53b, that are formed to be continuous in the layering direction, are provided at two locations on the peripheral surface of the layered product 50, at a predetermined distance from one another. In FIGS. 5A to 5E, the cutout portions 53a and 53b are formed as substantially semi-circular cylindrical shapes on two opposing lateral surfaces. The one cutout portion 53a cuts away only at the metal thin films 51a, whereas the other cutout portion 53b cuts away only at the metal thin films 51b. The two cutout portions 53a and 53b are filled with conductive material 54a and 54b. The conductive material 54a electrically connects the metal thin films 51a and is insulated from the metal thin films 51b, whereas the conductive material 54b electrically connects the metal thin films 51b and is insulated from the metal thin films 51a. The metal thin films 51a and 51b are formed in regions that are smaller than the formation regions of the resin thin films 52, such that the metal thin films 51a and 51b are not exposed on the other two lateral surfaces, but only on the surfaces where the cutout portions 53a and 53b are formed.

Thus, it is possible to take the two lateral surfaces where the cutout portions 53a and 53b of the layered product 50 are formed as well as the conductive material 54a and 54b exposed on the upper and lower surfaces as electrode lead portions (lead electrodes), and by placing them at different potentials, a capacitor is attained in which the metal thin films 51a and 51b serve as electrodes and the resin thin films 52 serve as the dielectric layers.

The capacitor of this embodiment can be made even smaller at the same capacitance than the capacitor in Embodiment A-1.

It is also possible to form electrode terminals (protrusion (bump) electrodes) made, for example, of gold, silver, aluminum, copper, solder, conductive paste or conductive polymer on the conductive material 54a and 54b exposed on the outer and lateral surfaces.

Figure 6A:
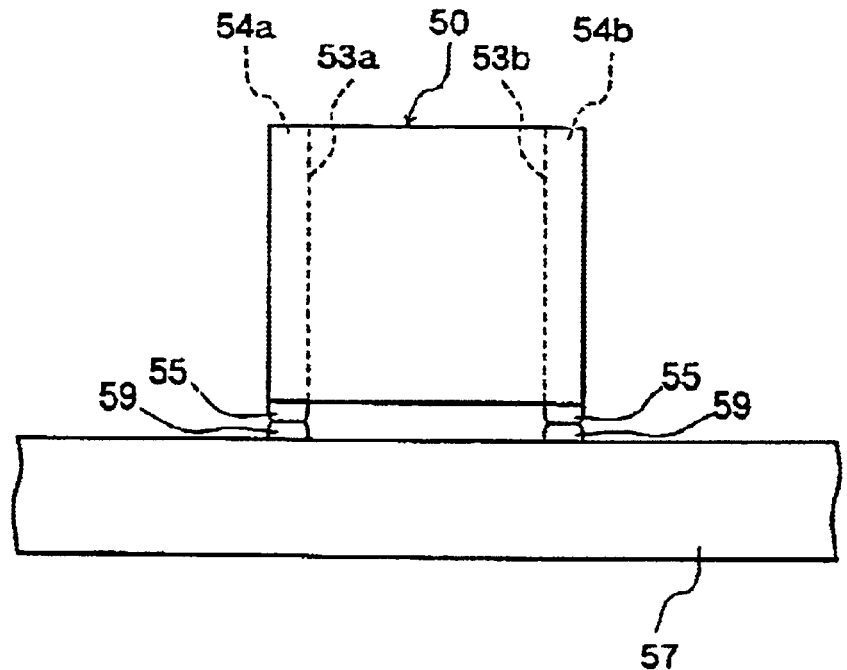
FIGS. 6A and 6B show schematic side views of the situation when the capacitor of Embodiment Am of the present invention is mounted onto a circuit board.
Figure 6B:
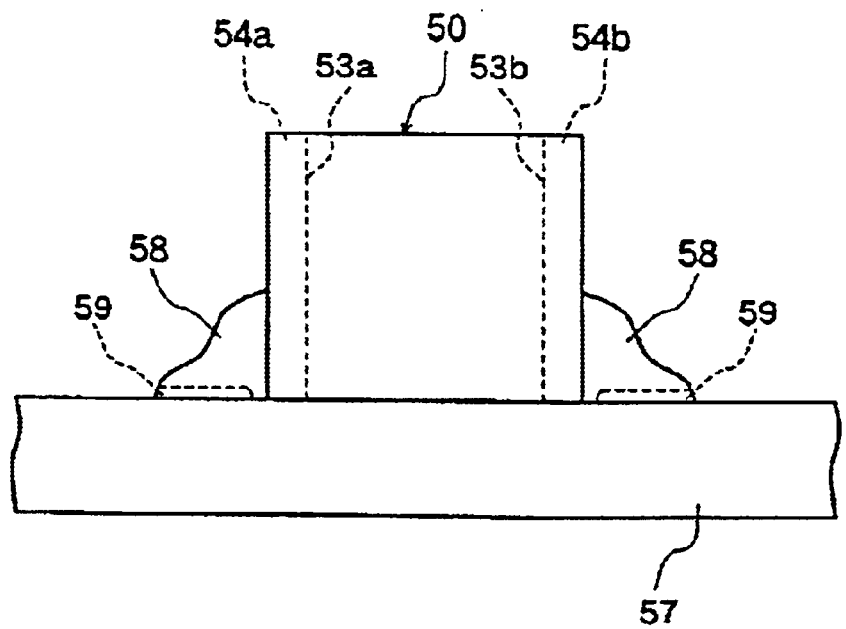

FIGS. 6A and 6B show a schematic side view of the case when the capacitor 50 shown in FIGS. 5A to 5E is mounted onto a circuit board 57.

FIG. 6A illustrates the case that the electrode terminals 55 formed on the conductive material 54a and 54b filled into the cutout portions 53a and 53b are connected to the electrode terminals 59 on the circuit board 57. When the capacitor of the present embodiment is mounted as shown in FIG. 6A, the mounting area can be made smaller than with the conventional chip capacitor 940 shown in FIG. 24, and the mounting area can be made even smaller than with the capacitor of Embodiment A-1, making mounting with high density possible.

FIG. 6B shows the case when no electrode terminal 55 is formed, and the capacitor 50 is placed directly onto the circuit board 57, and the conductive material 54a and 54b exposed on the lateral surfaces is connected to the electrode terminals 59 placed near the capacitor 50 with a conductive material 58, such as solder. Employing this mounting method makes it possible to reduce the mounting height. Furthermore, if the conductive material 58 adheres poorly to the capacitor 50 during the mounting, this can be corrected easily, because the conductive material 58 is adhered to the side of the capacitor 50.

In FIG. 6A, electrode terminals 55 are formed on the conductive material 54a and 54b, and the electrode terminals 55 are connected to electrode terminals 59 on the circuit board 57, but it is also possible to connect the conductive material 54a and 54b directly with the electrode terminals 59 on the circuit board 57 without providing the electrode terminals 55.

In FIGS. 5A to 5E, the conductive material 54a and 54b is filled into the cutout portions 53a and 53b penetrating the capacitor 50 in the layering direction, so that electrode leads can be provided from either of the upper and lower surfaces as well as from the two lateral surfaces, but it is also possible to provide the cutout portions 53a and 53b as blind cutouts (not going all the way through) formed on only one of the upper and lower surfaces, and fill them with conductive material, so that a capacitor is obtained in which the lead electrodes are formed only on one surface.

FIGS. 5A to 5E illustrate an example of a layered product serving as a capacitor, but possible applications for the layered product include not only capacitors, but also coils, noise filters, or layered circuit boards. In those cases, it is possible to modify the layering configuration and the connection between the metal thin films and the lead electrodes in accordance with the application.

Furthermore, the positions at which the cutout portions 53a and 53b are formed are not limited to the examples shown in FIGS. 5A to 5E. For example, it is also possible to form them not at two opposing lateral surfaces, but at two of the four corners.

Embodiment A-5

Figure 7D:
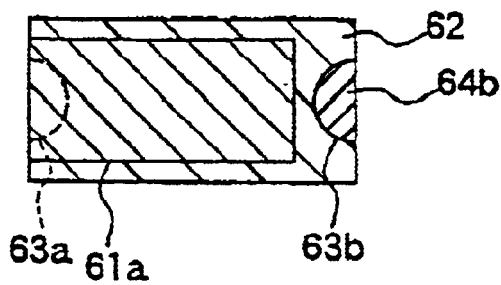
FIGS. 7A to 7E show the general configuration of a chip capacitor using a layered product in accordance with Embodiment A-5 of the present invention.
Figure 7E:
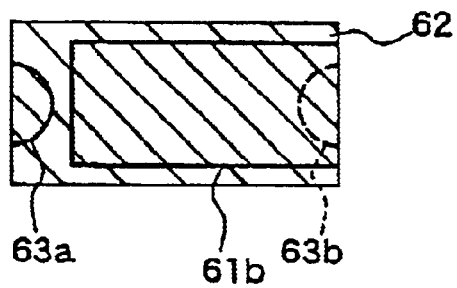
Figure 7A:
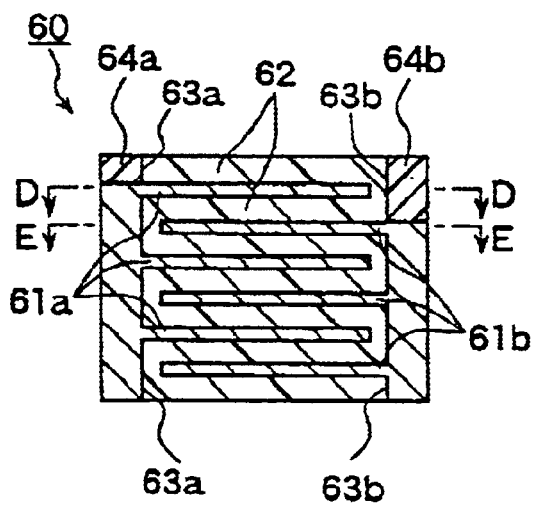
Figure 7B:
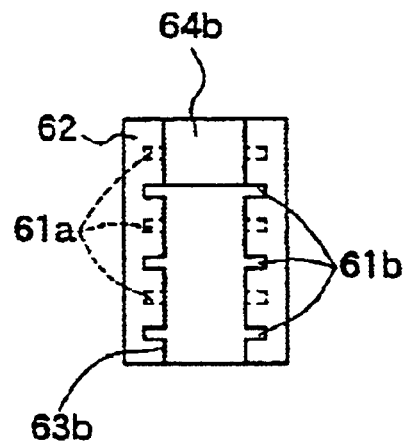
Figure 7C:
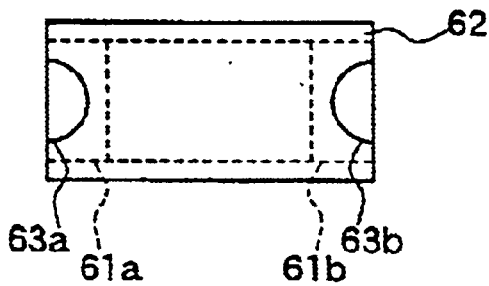

FIGS. 7A to 7E show the general configuration of a chip capacitor using a layered product in accordance with Embodiment A-5 of the present invention. FIG. 7A is a cross-sectional view taken from the front, FIG. 7B is a side view taken from the right, FIG. 7C is a bottom view, FIG. 7D is a cross-sectional view along line D—D in FIG. 7A taken from the arrow direction, and FIG. 7E is a cross-sectional view along line E—E in FIG. 7A taken from the arrow direction. The drawings schematically illustrate the layering configuration, but the dimensions and number of layers in the actual layered product may vary widely from those shown in the drawings.

In the layered product 60 of this embodiment, metal thin films 61a and 61b are layered in alternation at different formation positions, and resin thin films 62 are layered between the metal thin films 61a and the metal thin films 61b. Cutout portions 63a and 63b, which are formed to be continuous in the layering direction, are provided at two locations on the peripheral surface of the resin thin films 62, at a predetermined distance from one another. In FIGS. 7A to 7E, the cutout portions 63a and 63b are formed as substantially semicircular cylindrical shapes on two opposing sides. The cutout portion 63a is arranged within the formation region of the metal thin films 61a, but outside the formation region of the metal thin films 61b, and the material of the metal thin films 61a filled into the cutout portion 63a electrically connects the layers of metal thin films 61a vertically. Similarly, the cutout portion 63b is formed within the formation region of the metal thin films 61b but outside the formation region of the metal thin films 61a, and the material of the metal thin films 61b filled into the cutout portion 63b electrically connects the layers of metal thin films 61b vertically. Thus, the metal thin films 61a and the metal thin films 61b are electrically insulated from one another. The same material as for the material of the metal thin films 61a and 61b is filled into the cutout portions 63a and 63b below the uppermost metal thin films 61a and 61b. The cutout portions 63a and 63b above the uppermost metal thin films 61a and 61b are filled with conductive material 64a and 64b, if necessary. The metal thin films 61a and 61b are formed in regions that are smaller than the formation regions of the resin thin films 62, such that the metal thin films 61a and 61b are not exposed on the other two lateral surfaces, but only on the lateral surfaces where the cutout portions 63a and 63b are formed.

Thus, it is possible to take the two lateral surfaces where the cutout portions 63a and 63b of the layered product are formed as well as the metal thin film material or the conductive material 64a and 64b exposed on the upper and lower surfaces as electrode lead portions (lead electrodes), and by placing them at different potentials, a capacitor can be attained in which the metal thin films 61a and 61b serve as electrodes and the resin thin films 62 serve as the dielectric layers.

It is also possible to form electrode terminals (protrusion (bump) electrodes) made, for example, of gold, silver, aluminum, copper, solder, conductive paste or conductive polymer on the metal thin film material and/or the conductive material 64a and 64b in the cutout portions 63a and 63b exposed on the outer surface.

It is also possible to mount the capacitor of this embodiment like in Embodiment A-4, as shown in FIGS. 6A and 6B, thus attaining the same effect.

In FIGS. 7A to 7E, the cutout portions 63a and 63b also are formed above the metal thin films 61a and 61b of the uppermost layer, and filled with conductive material 64a and 64b, so that an electrode leading from the upper surface is possible, but it is also possible not to form the cutout portions above the metal thin films 61a and 61b of the uppermost layer.

The FIGS. 7A to 7E illustrate an example of a layered product serving as a capacitor, but possible applications for the layered product include not only capacitors, but also coils, noise filters, or layered circuit boards. In those cases, it is possible to modify the layering configuration and the connection between the metal thin films and the lead electrodes in accordance with the application.

Furthermore, the formation positions of the cutout portions 63a and 63b are not limited to the example shown in FIGS. 7A to 7E. For example, it is also possible to form them not at two opposing lateral surfaces, but at two of the four corners.

B. Method and Apparatus for Manufacturing Layered Product and Capacitor

The following is a description of a method and an apparatus for manufacturing the layered products and capacitors described in Section A.

The basic steps for manufacturing a layered product and a capacitor in accordance with a first aspect of the present invention are ① a step of layering resin thin films and metal thin films in alternation on a support medium (alternate layering step) and ② a step of cutting the resulting layered product (laminate base element) at a predetermined position in the layering direction (cutting/separation step).

The metal thin films layered in the alternate layering step are patterned into predetermined shapes. The patterning of the metal thin films can be achieved by i) oil patterning, in which oil is applied in a predetermined shape before layering the metal thin films, ii) laser patterning, in which laser light is irradiated on the layered metal thin films to eliminate metal thin film material, or iii) a combination of the two.

The formation of the via holes 13a and 13b described in Embodiment A-1 (FIGS. 1A to 1E) and their filling with conductive material 14a and 14b, the formation of the cutout portions 53a and 53b described in Embodiment A-4 (FIGS. 5A to 5E) and their filling with conductive material 54a and 54b, as well as the formation of the via electrodes 37 described in Embodiment A-3 (FIGS. 4A and 4B) can be performed after the alternate layering step and before the cutting/separating step. The holes can be formed in the layering direction, for example, with laser light, and then can be filled with conductive material. Alternatively, it is also possible to irradiate, for example, laser light to eliminate the resin thin film and the metal thin film at a predetermined position, every time a resin thin film and/or metal thin film is layered in the alternate layering step, thereby forming a continuous hole in the layering direction, which can be filled with conductive material after the alternate layering step.

The formation of the via holes 23a and 23b penetrating the resin thin films 21a and 21b described in Embodiment A-2 (FIGS. 3A to 3E) and the formation of the cutout portions 63a and 63b formed in the resin thin films 61a and 61b described in Embodiment A-5 (FIGS. 7A to 7E) can be performed during the alternate layering step. For this formation, it is possible to connect the metal thin films vertically through the via holes by forming the via holes in the resin thin film by eliminating the newly formed resin thin film at predetermined positions with laser light, for example, after the resin thin film has been layered and before the layering of metal thin film, and then layering the next metal thin film layer.

For the manufacturing method and the manufacturing apparatus in accordance with this first aspect of the present invention, a variety of embodiments are possible, selecting and combining the above-described methods. The following is an explanation of several representative embodiments.

Embodiment B-1

Figure 8:
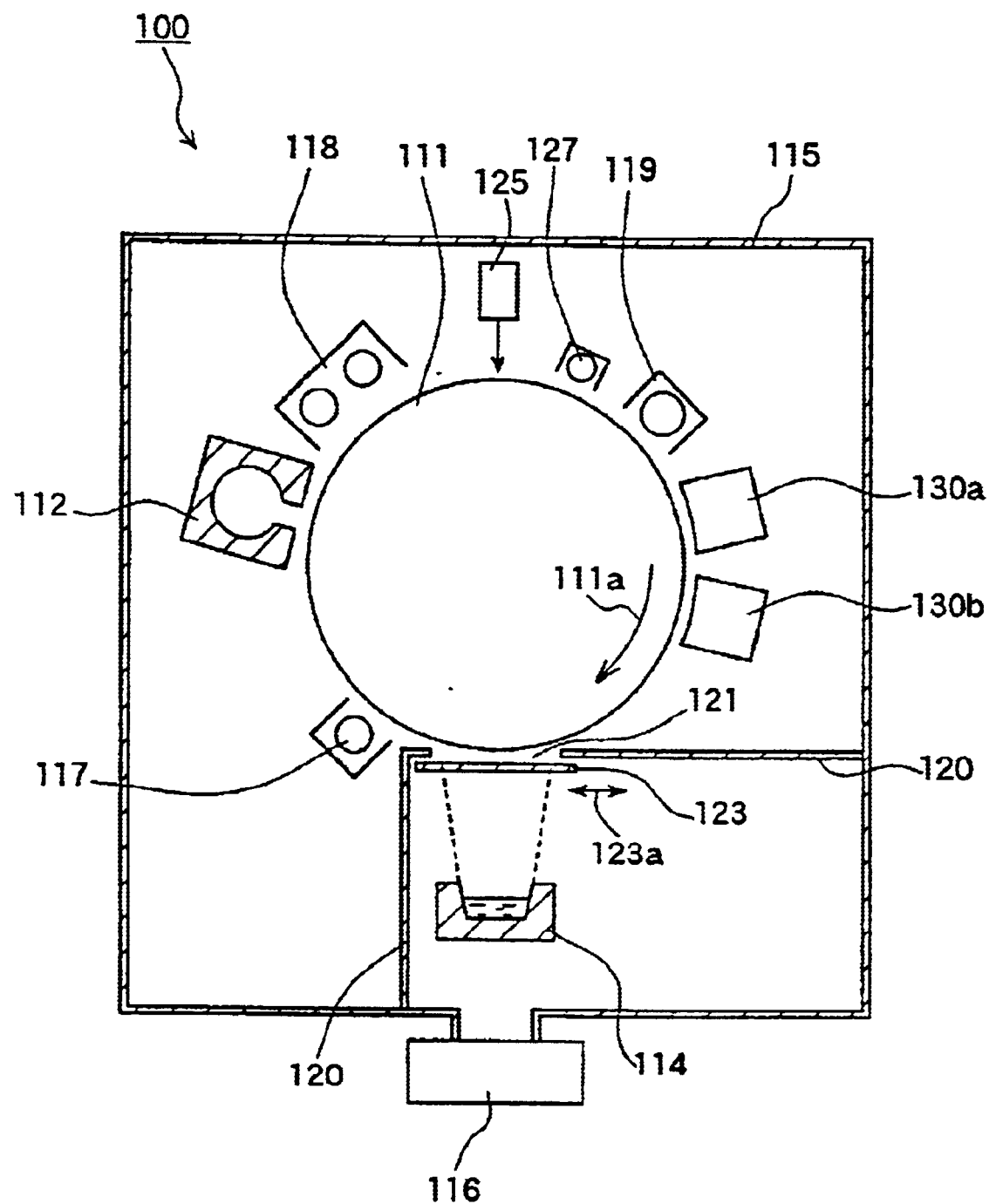
FIG. 8 is a schematic cross-sectional view showing an example of a manufacturing apparatus for practicing the method for manufacturing a layered product in accordance with Embodiment B-1 of the present invention.

FIG. 8 is a schematic cross-sectional view showing an example of a manufacturing apparatus for practicing the method for manufacturing a layered product in accordance with Embodiment B-1 of the present invention. In this embodiment, the patterning of the metal thin films is carried out by oil patterning, and the via holes or cutout portions are formed with a laser machining device after the alternate layering step is finished.

In FIG. 8, numeral 100 denotes a manufacturing apparatus in accordance with the present embodiment, numeral 115 denotes a vacuum container, numeral 116 denotes a vacuum pump for sustaining a predetermined vacuum level inside the vacuum container 115, numeral 111 denotes a cylindrical can roller arranged inside the vacuum container 115 and rotating in direction of the arrow 111a in FIG. 8, numeral 112 denotes a resin thin film formation device, numerals 130a and 130b denote patterning material application devices (nozzles), numeral 114 denotes a metal thin film formation device (metal material supply source), numeral 117 denotes a patterning material removing device, numeral 118 denotes a resin curing device, numeral 119 denotes a surface processing device, numeral 120 denotes a partition wall for partitioning the metal thin film formation region from the other regions, numeral 121 denotes an aperture provided in the partition wall 120, numeral 123 denotes a shielding plate for opening and closing the aperture 121 by shifting in a shifting direction 123a so as to prevent the metal thin film from being formed outside the necessary times, numeral 125 denotes a laser machining device, and numeral 127 denotes a plasma irradiation device.

By rotating the can roller 111, it is possible to form a layered product, in which resin thin films formed by the resin thin film formation device 112 and metal thin films formed by the metal thin film formation device 114 are formed in alternation on the outer peripheral surface of the can roller 111.

Using the pair of patterning material application devices 130*a* and 130*b* to apply patterning oil in a predetermined shape on the surface of the resin thin film before the formation of the metal thin films, it is possible to form metal thin films that are patterned in the desired shape.

Figures 9A, 9B:
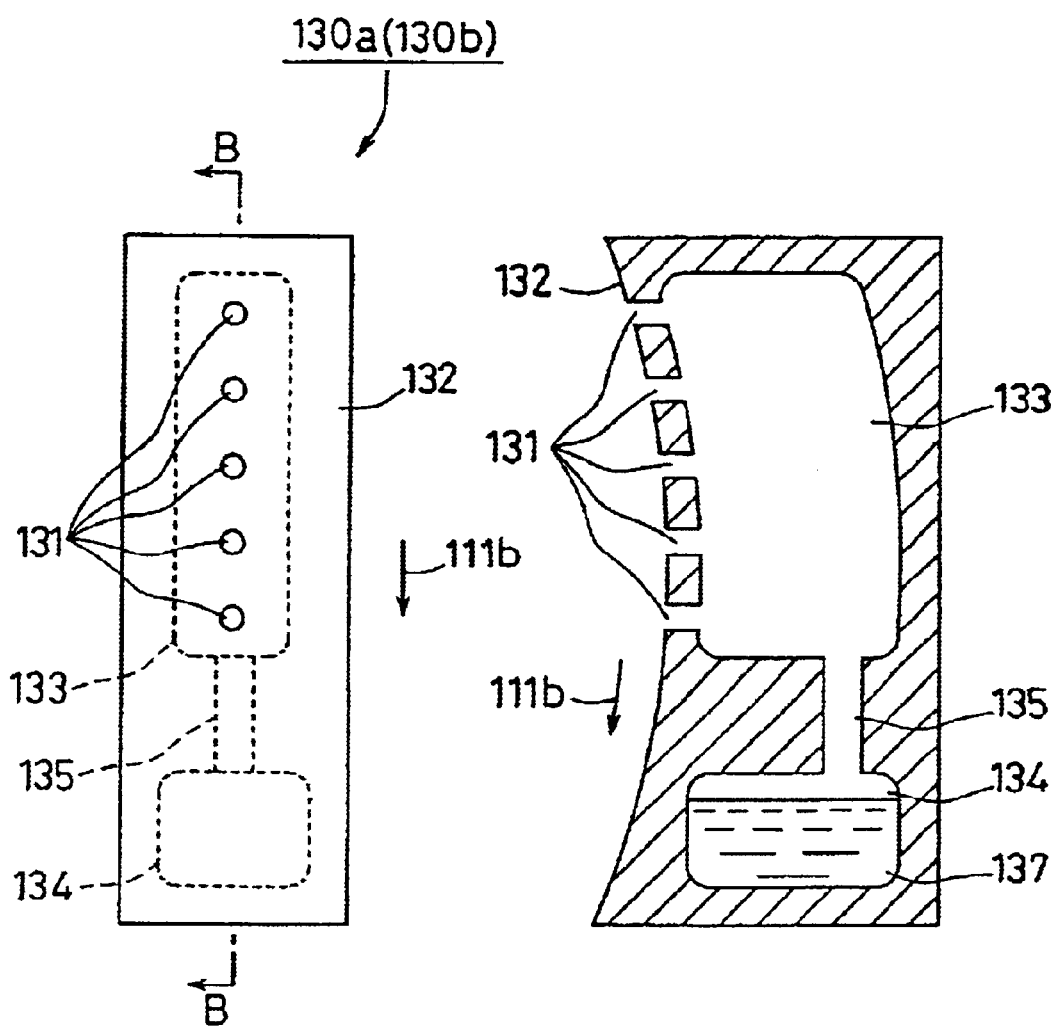
FIGS. 9A and 9B show the configuration of the patterning material application devices.

The patterning material application device 130*a* has the same basic configuration as the patterning material application device 130*b*. FIGS. 9A and 9B diagrammatically show the configuration of the patterning material application devices (nozzles) 130*a* and 130*b*. FIG. 9A is a front view taken from the side of the can roller 111, and FIG. 9B is a cross-sectional view along line B—B in FIG. 9A. In FIG. 9A, the arrow 111*b* indicates the travel direction of the outer peripheral surface of the can roller 111.

The patterning material application devices 130*a* and 130*b* include a storage reservoir 134 containing liquid patterning material (oil) 137, and a cavity 133 containing gasified patterning material. The storage reservoir 134 and the cavity 133 are connected by a connection duct 135. A plurality of micro-holes 131 (five in the FIGS. 9A and 9B) connected to the cavity 133 are formed on the opposing surface 132 facing the can roller 111. The plurality of micro-holes 131 are arranged substantially in parallel to the travel direction 111*b* of the can roller 111, at equidistant spacing. The patterning material application devices 130*a* and 130*b* are heated to a temperature above the gasification temperature of the patterning material (oil) 137, the patterning material 137 in the storage reservoir 134 is vaporized, moved to the cavity 133, and emitted toward the outer peripheral surface of the can roller 111 from the micro-holes 131. The emitted kg patterning material liquefies on the outer peripheral surface of the can roller 111, forming a liquid film of patterning material.

In the manufacturing apparatus of the embodiment shown in FIG. 8, the pair of patterning material devices 130*a* and 130*b* are shifted back and forth in a direction that is substantially parallel to the rotation axis of the can roller 111 (that is, substantially at right angles to the travel direction 111*b* of the outer peripheral surface of the can roller 111). Then, a plurality of stripes of patterning material are formed on the outer peripheral surface of the can roller 111 with the patterning material application device 130*a*, intersecting with a plurality of stripes of patterning material formed on the outer peripheral surface of the can roller 111 with the patterning material application device 130*b*.

Figure 10:
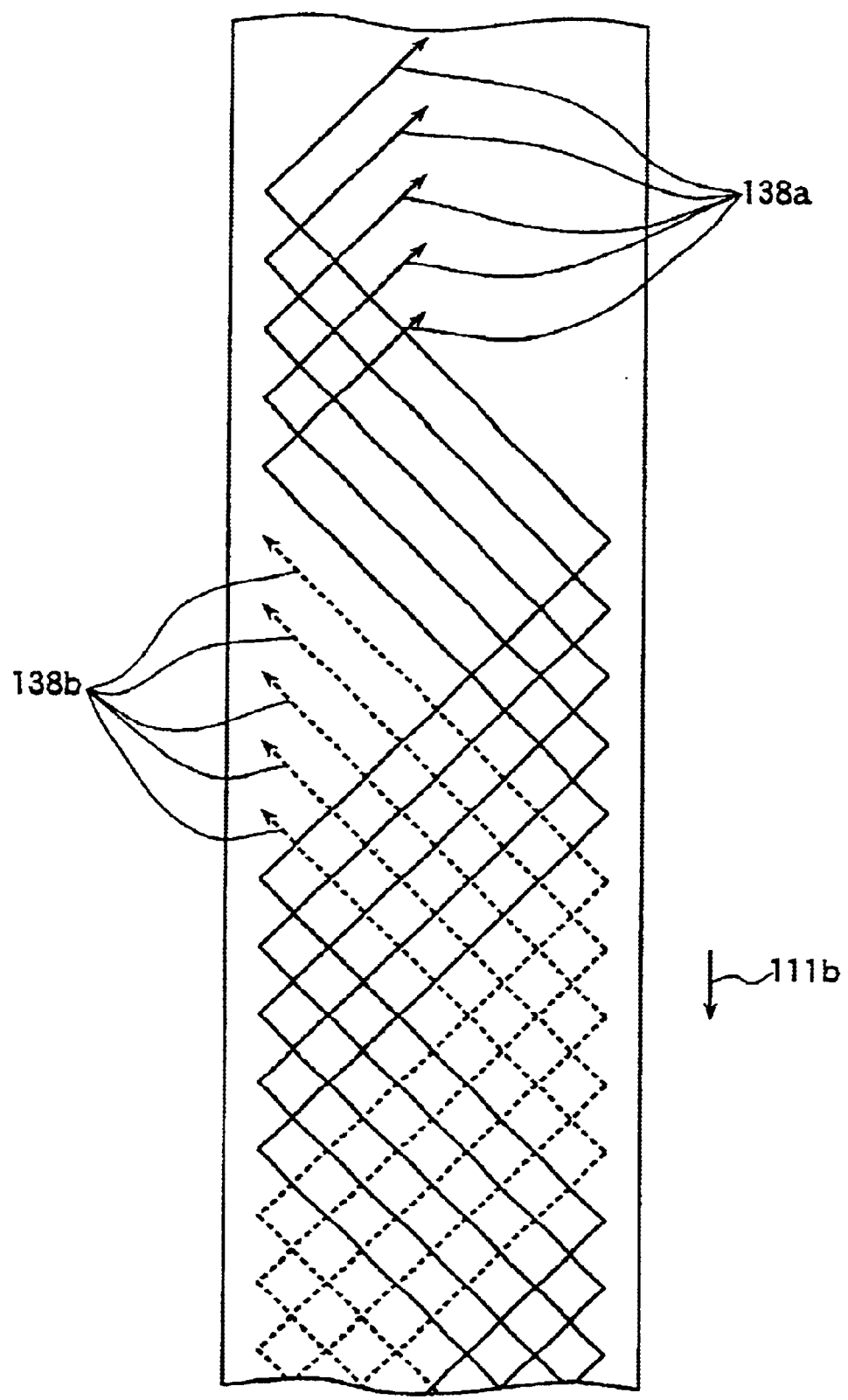
FIG. 10 shows a development drawing of an example of the stripe pattern of patterning material formed by the pair of patterning material application devices on the outer peripheral surface of the can roller 111.

FIG. 10 shows a development drawing of an example of the stripe pattern of patterning material formed by the patterning material application devices 130*a* and 130*b* on the outer peripheral surface of the can roller 111. The arrow 111*b* indicates the travel direction of the outer peripheral surface of the can roller 111. The solid line 138*a* represents the five stripes of patterning material formed on the outer peripheral surface of the can roller 111 with the patterning material application device 130*a*, and the dotted line 138*a* represents the five stripes of patterning material formed on the outer peripheral surface of the can roller 111 with the patterning material application device 130*b*. As shown in FIG. 10, by moving the pair of patterning material application devices 130*a* and 130*b* back and forth while synchronizing them at a predetermined speed in a direction substantially parallel to the rotation axis direction of the can roller 111, it is possible to form a grid-shaped application pattern of patterning material on the outer peripheral surface of the can roller 111. In particular when the patterning material application devices 130*a* and 130*b* are moved at substantially the same speed as the outer peripheral surface of the can roller 111, the stripes formed by the patterning material application devices 130*a* and 130*b* form an angle of approximately 45° with the travel direction 111*b*. As a result, a grid-shaped application pattern can be attained, in which the stripes 138*a* and 138*b* intersect approximately at right angles.

Then, forming the metal thin films with the metal thin film formation apparatus 114, it is possible to form rectangular metal thin films patterned in a grid shape, because no metal thin film is formed in the portions to which the patterning material has been applied.

Moreover, the patterning material application devices 130*a* and 130*b* are shifted such that the formation position of the grid-shaped pattern after the can roller 111 has rotated for one turn does not coincide with the formation position of the previous grid-shaped pattern, preferably such that the next grid-shaped pattern is formed at a position that is shifted by a predetermined amount in parallel to the stripes 138*a* and 138*b*. In addition, the patterning material application devices 130*a* and 130*b* are shifted such that the formation position of the grid-shaped pattern after one further rotation does not coincide with the previous formation position, but with the formation position prior to that. Thus, it is possible to layer in alternation two types of metal thin films, whose grid-shaped margin pattern is shifted by a predetermined amount, separated by a resin thin film. Furthermore, the pattern positions are shifted such that predetermined portions of the metal thin films oppose one another. These opposed portions serve as the capacitance formation regions of the capacitor.

The laser machining device 125 irradiates laser light onto the outer peripheral surface of the can roller 111. The laser machining device 125 includes a scanning device (not shown in the drawings), and can irradiate laser light in a direction that is substantially perpendicular to the outer peripheral surface of the can roller 111, at the desired position with respect to the rotation axis direction and/or the scanning direction of the outer peripheral surface of the can roller 111. In this embodiment, after forming a layered product of alternating layers of resin thin films and metal thin films on the outer peripheral surface of the can roller 111, the can roller 111 is rotated, and laser light is irradiated at a predetermined position in synchronization with this rotation. The laser light from the laser machining device 125 can heat and melt (and partially evaporate) both the resin thin films and the metal thin films, and thus remove them. Consequently, it is possible to form via holes penetrating the layered product in the layering direction. As a laser light source that can machine both the resin thin films and the metal thin films, it is possible to use, for example, a $CO_2$ laser, a YAG laser, an excimer laser, or a green laser, depending, for example, on the resin thin film material, the metal thin film material, and their thicknesses.

The plasma irradiation device 127 is arranged downstream from the laser machining device 125, facing the outer peripheral surface of the can roller 111. For the plasma, it is possible to use, for example, an oxygen plasma, an argon plasma or a nitrogen plasma, but an oxygen plasma is preferable, because of the speed with which the surfaces machined with the laser can be cleaned.

The following is a description of the alternate layering step using the device shown in FIG. 8.

The inside of the vacuum container 115 is evacuated to, for example, about $2 \times 10^{-2}$ Pa with the vacuum pump 116.

The outer peripheral surface of the can roller 111 is cooled to preferably −20° C. to 40° C., and more preferably to −10° C. to 10° C. The rotation speed can be set freely, but preferable is a rotation speed of about 15 to 100 rpm, and a circumferential speed of 10 to 300 m/min.

The resin thin film formation device 112 heats and gasifies or atomizes the resin thin film material and emits it towards the outer peripheral surface of the can roller 111. The resin thin film material cools on the outer peripheral surface of the can roller 111 and forms a liquid film.

There is no particular limitation to the resin thin film material, as long as it can be deposited in this manner to form a thin film, and it can be selected as appropriate, depending on the intended use of the resulting layered product, but it is preferable that the resin thin film material is a reactive monomer resin. For example, a resin having an acrylate resin or a vinyl resin as its main component is preferable. More specifically, a multifunctional (meth) acrylate monomer, or a multifunctional vinyl ether monomer is preferable. Of these, for example, a cyclopentadiene dimethanoldiacrylate monomer or a cyclohexane dimethanoldivinylether monomer or one of these monomers with substituted hydrocarbon groups is preferable because of the electric properties, thermal resistance and stability. Here, "main component" means that at least 90 wt % of the component is included in the resin thin film material.

The deposited resin thin film material also can be subjected to a curing process and cured to a desired curing degree with the resin curing device 118, if necessary. Examples of curing processes include polymerization and/or cross-linking of the resin thin film material. For the resin curing device, it is possible to use, for example, an electron beam irradiation device, a UV light irradiation device, or a heat curing device. The curing degree can be modified depending on the desired properties of the layered product to be manufactured, but it is preferable that the curing process is performed until the curing degree is 50 to 95%, more preferably 50 to 75%. To determine the curing degree of the present invention, the ratio of the absorbance of the C=O groups and the C=C groups (1600 cm$^{-1}$) is determined with an infrared spectrophotometer, the ratio of each monomer and the cured product is determined, and the curing degree is defined as 1 minus the reduced absorption ratio.

The surface of the formed resin thin film is processed with the surface processing device 119, if necessary. For example, by performing a discharge process or a UV light irradiation process under an oxygen atmosphere, the surface of the resin thin film can be activated to increase the adhesiveness with the metal thin film.

Then, the pair of patterning material application devices 130a and 130b applies patterning material on the resin thin film in a grid-shaped pattern as shown in FIG. 10. After the patterning material has been applied thinly, a metal thin film is formed for example by vaporization, and margins are formed in which no metal thin film is formed on the patterning material. Thus, it is possible to form a metal thin film having the desired pattern.

It is preferable that the patterning material comprise at least one oil selected from the group consisting of ester oils, glycol oils, fluorocarbon oils, and hydrocarbon oils. It is even more preferable that the patterning material be an ester oil, a glycol oil, or a fluorine oil. It is most preferable that the patterning material be a fluorine oil. When other materials than the above patterning materials are used, the surface of the layered product may be roughened, pinholes may appear in the resin layers or the metal thin film layers, or other problems such as unsteady deposition at the formation borders of the metal thin film layer may occur.

After the patterning material has been applied, a metal thin film is applied with the metal thin film formation device 114. The metal thin film can be formed by such well-known vacuum processes as vapor deposition, sputtering, or ion plating. For the present invention however, vapor deposition, especially electron beam vapor deposition, is preferable because with this method, a film with excellent moisture resistance can be obtained with high productivity. Possible materials for the metal thin film layer include aluminum, copper, zinc, nickel, iron, cobalt, silicon, germanium, their compounds, their oxides, and the oxides of their compounds. Of these, aluminum is preferable, because of its adhesiveness and low cost. The metal thin film layer also can include other components. Furthermore, it is also possible to use not only one kind of metal thin films, but to mix, for example, an Al layer with a Cu layer to enhance their properties and attain a product with even better performance depending on the usage conditions. To interrupt the formation of the metal thin films, the aperture 121 is closed with the shielding plate 123.

Then, excess patterning material is removed with a patterning material removing device 117. Most of the patterning material is evaporated and vanishes when forming the metal thin film, but a portion remains after the deposition of the metal thin film. The remaining patterning material may become the cause of such problems as roughened layering surfaces, pinholes (layering defects) in the resin thin film layers or the metal thin film layers, or unsteady deposition of the metal thin film at the formation borders. There is no particular limitation to the method with which the patterning material is removed, and an appropriate method can be selected in accordance with the patterning material. The patterning material can be removed by heat, for example by irradiation of light or use of an electric heater, or by decomposition, for example by plasma irradiation, ion irradiation or electron irradiation.

When the aperture 121 of this manufacturing apparatus 100 is open, a layered product is manufactured in which resin thin films formed with the resin thin film formation device 112 are layered in alternation with metal thin films formed with the metal thin film formation device 114 on the outer peripheral surface of the rotating can roller 111, or when the aperture 121 is closed, a layered product is manufactured, in which a resin thin film is formed continually with the resin thin film formation device 112 on the outer peripheral surface of the can roller 111.

Furthermore, as mentioned above, by letting the patterning material application devices 130a and 130b move back and forth in synchronization with the rotation of the can roller 111, it is possible to change the position of the grid-shaped margin pattern of the metal thin films, and provide two types of layers of metal thin films in alternation, separated by resin thin films.

After the resin thin films and the metal thin films have been deposited, via holes are formed in the layered product with the laser machining device 125, while the layered product is still on the outer peripheral surface of the can roller 111. More specifically, while rotating the can roller 111, the can roller 111 is scanned with laser light in synchronization with the rotation of the can roller 111, and laser light is irradiated at predetermined positions.

It is preferable that after the formation of via holes, the plasma irradiation device 127 irradiates a plasma on the inner walls of the via holes. By plasma processing the inner walls of the via holes, resin thin film material exposed at the inner walls of the via holes is removed, increasing the exposed amount of the metal thin films. As a result, when subsequently filling conductive material into the via holes, the reliability of the electrical connection between the conductive material and the metal thin films can be increased.

Figure 11:
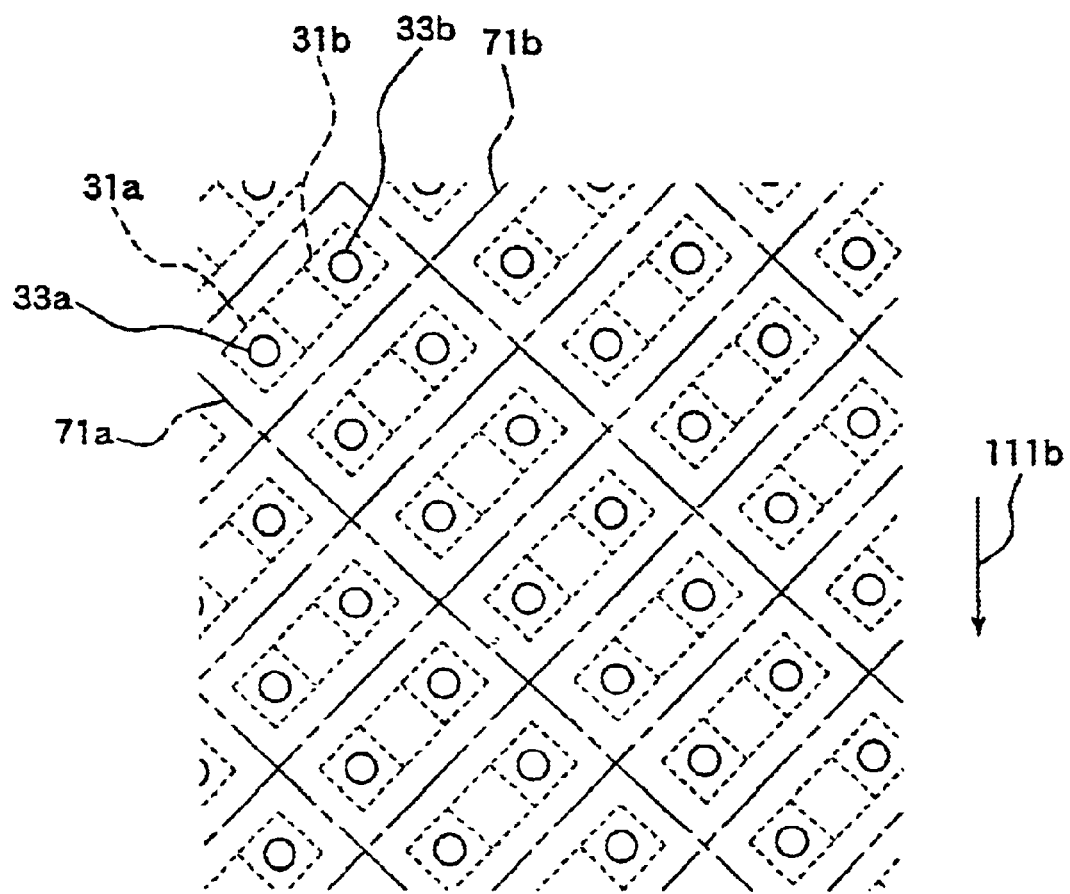
FIG. 11 is a plan view showing the development of a layered product formed on the outer peripheral surface of the can roller in Embodiment B-1.

FIG. 11 is a plan view showing the development of a layered product formed on the outer peripheral surface of the can roller 111. The arrow 111b in FIG. 11 indicates the travel direction of the outer peripheral surface of the can roller 111.

Metal thin films 31a and metal thin films 31b that are patterned substantially in a grid shape are layered in alternation, and separated by resin thin films. The substantially grid-shaped pattern of the margins of the metal thin films 31a is substantially identical with the substantially grid-shaped pattern of the margins of the metal thin films 31b, and the two patterns are shifted with respect to one another, such that the metal thin films 31a overlap to a certain extent with the metal thin films 31b in the layering direction. Used as a capacitor, the overlapping portions of the metal thin films 31a and the metal thin films 31b form the capacitance formation regions.

The via holes 33a are formed at positions, where they penetrate the metal thin films 31a but not the metal thin films 31b in the layering direction. Similarly, the via holes 33b are formed at positions, where they penetrate the metal thin films 31b but not the metal thin films 31a in the layering direction.

After the layered product has been peeled off the can roller 111 and pressed flat, conductive material (such as a conductive resin including metal particles, as known in the art) is filled into the via holes 33a and 33b, thus yielding a laminate base element.

Then, the cutting/separation process is performed, and the layered product is cut in the layering direction along the margin portions, where the metal thin films 31a and 31b are not formed, that is, within the cutting planes 71a and 71b. Thus, the layered product described in Embodiment A-1 (FIGS. 1A to 1E) can be obtained.

Thus, with this embodiment, the cutting planes 71a and 71b do not include the formation regions of the metal thin films 31a and 31b. That is to say, the metal thin films 31a and 31b are not being cut, so no burrs or cutting chips are produced, as may occur when cutting metal thin films. Furthermore, a smaller cutting power is sufficient, because no metal thin films are cut, and deformations of the layered product and damage to the metal thin films are less likely to occur during the cutting. Also, even without providing an outer jacket, corrosion of the metal thin films is not likely, because no metal thin film is exposed at the cutting faces.

Furthermore, since the formation of the via holes 33a and 33b is carried out with the laser machining device 125, no mechanical pressure is exerted on the metal thin films or resin thin films during the machining. Consequently, deformations of the layered product or damages to the metal thin film do not occur.

Needless to say, it is also possible to provide the outer surface of the layered product that has been obtained as described above with an outer jacket or with coloring, if necessary.

In the foregoing explanations, it is also possible to close the aperture 121 to continually deposit resin thin film only and form a protective layer of a predetermined thickness in the first and the last alternate layering step.

By taking, instead of the cutting plane 71a, a plane approximately through the centers of the via holes 33a and the via holes 33b in parallel to the cutting plane 71a as the cutting plane, it is possible to obtain the layered product described in Embodiment A-4 (FIGS. 5A to 5E). In that case, the metal thin films 31a and 31b are being cut at this cutting plane, but the cutting plane includes the cutout portions 53a and 53b as well as the margins, which reduces the actual cutting area through the metal thin films 31a and 31b. Furthermore, the metal thin films 31a and 31b are not cut by the other cutting plane 71b. Consequently, compared to the separation/cutting step in conventional methods for manufacturing capacitors, the cutting area of the metal thin films can be reduced. Thus, it is possible to reduce burrs and cutting chips, which occur during the cutting of metal thin films. Furthermore, the cutting power can be small, and deformations of the layered product and damage to the metal thin films are not likely to occur during the cutting. Also, corrosion of the metal thin films is not likely, because the metal thin films are exposed only at the faces at which the cutout portions 53a and 53b are formed, but not at the other peripheral faces.

The array capacitor (FIG. 4A) described in Embodiment A-3 (in which the capacitors of Embodiment A-1 are taken as the capacitor elements 36) can be obtained as follows: As described above, via holes (second via holes) are formed as necessary also in predetermined positions in the margin regions where no metal thin films 31a and 31b are formed, and these second via holes are also filled with conductive material to form the via electrodes. Then, the margin regions are cut without cutting the metal thin films 31a, 31b and the via electrodes. Also in this case, the metal thin films 31a and 31b are not cut, so that burrs and cutting chips, which may occur during the cutting of metal thin films, are not likely to occur. Furthermore, since the metal thin films are not being cut, the cutting power can be small, and deformations of the layered product and damage to metal thin films are not likely to occur during the cutting. Also, corrosion of the metal thin films is not likely even without providing an outer jacket, because the metal thin films are not exposed at the cutting faces.

Embodiment B-2

This embodiment differs from the foregoing Embodiment B-1 with respect to the following aspects: Whereas in Embodiment B-1, the via holes in the layering product were formed by irradiating laser light with a laser machining device 125 after the alternate layering step, in this Embodiment B-2, the laser light is irradiated during the alternate layering step.

More specifically, the laser machining device 125 irradiates laser light on the resin thin film and the metal thin film that have been layered newly by rotating the can roller 111 once, and the resin thin film and the metal thin film are removed at a predetermined position. By scanning the laser light in synchronization with the rotation of the can roller 111, the positions where the laser light is irradiated can be matched in the layering direction. Thus, it is possible to form holes that are continuous in the layering direction, and as a result, form via holes in the layering direction. In order to form via electrodes, regions of the resin thin films where no metal thin films are formed should be irradiated with laser light, to produce the via holes for the via electrodes (second via holes).

Also in this embodiment, it is preferable that the inner walls of the via holes are plasma processed with the plasma irradiation device 127. The plasma processing can be carried out at any time during the alternate layering step, or it can be carried out after the alternate layering step has been finished.

In this embodiment, blind via holes can be formed easily by stopping the formation of holes with the laser machining device 125 at a predetermined time during the alternate layering process. For example, if a protective layer has been formed by continuously depositing only resin thin films on the upper layer and/or the lower layer of the layered product, then a capacitor in which the lead electrodes are formed only on one of the upper and lower surfaces can be produced by not machining holes in either the upper or the lower protective layer.

Except for the above-described differences however, this embodiment is similar to Embodiment B-1.

Embodiment B-3

This embodiment differs from the foregoing Embodiment B-2 with respect to the following aspects: In Embodiment B-3, a laser machining device 125 is used that can remove the resin thin films, but not the metal thin films. As a laser light source with these properties, it is possible to use a laser with relatively long wavelength, such as a $CO_2$ laser, depending on the materials for the resin thin films and the metal thin films.

During the alternate layering step, the laser machining device 125 irradiates laser light at predetermined positions, after a metal thin film has been formed with the metal thin film formation device 114 and a resin thin film has been formed with the resin thin film formation device 112. The laser light from the laser machining device 125 removes the resin thin film and forms via holes penetrating the resin thin film at the irradiation positions. When there is a metal thin film below the resin thin film, and the laser power is set below a predetermined value, then the laser light does not affect this metal thin film. Then, forming a metal thin film also at the regions of the via holes formed in the resin thin films, the metal thin films above and below this resin thin film can be connected through the via holes.

As in the Embodiments B-1 and B2, the pattern positions of the grid-shaped margins for the metal thin films are changed every time the can roller 111 has completed a full rotation. By setting the positions of the via holes formed in the resin thin films suitably with respect to the position of the grid-shaped pattern of metal thin films changing for each layer, a laminate base element is obtained in which every other metal thin film is connected by the via hole formed in the resin thin films.

This laminate base element is cut along the cutting planes 71a and 71b in FIG. 11, as in the Embodiments B-1 and B-2. Thus, a layered product as described in Embodiment A-2 (FIGS. 3A to 3E) can be obtained. Furthermore, by taking, instead of the cutting plane 71a, a plane approximately through the centers of the via holes 33a and the via holes 33b in parallel to the cutting plane 71a as the cutting plane, it is possible to obtain the layered product described in Embodiment A-5 (FIGS. 7A to 7E).

In this embodiment, in the alternate layering step, metal thin film material is filled into the via holes, because the metal thin films are formed after forming the via holes in the resin thin films. Therefore, the metal thin films are connected in order by the via holes formed in the resin thin films, so that there is no need to fill conductive material into the via holes as in the Embodiments B-1 and B-2. However, if holes are formed in the resin thin film of the upper layer of the laminate base element, and metal thin film is exposed to the bottom of this hole, then it is preferable that conductive material is filled into these holes, to connect this metal thin film. By doing so, it is easy to form electrode leads through the conductive material that has been filled in.

Alternatively, via holes (second via holes) are formed during the alternate layering step by irradiating laser light onto the regions where no metal thin films are formed, and these via holes are connected in the layering direction. Thus, a laminate base element can be obtained, having via holes that do not penetrate the metal thin films. If conductive material is filled into these via holes, as in the Embodiments B-1 and B-2, and the layered product is cut along the margins, then an array capacitor provided with via electrodes as described in Embodiment A-3 can be obtained (embodiment taking the capacitors of the Embodiment A-2 as the capacitor elements 36).

Also in this embodiment, it is preferable that the inner walls of the via holes are plasma processed with the plasma irradiation device 127 during the alternate layering step.

In this embodiment, as in Embodiment B-2, the machining of the holes with the laser machining device 125 can be stopped at a predetermined time during the alternate layering step. For example, if a protective layer has been formed by continuously depositing only resin thin films on the upper layer and/or the lower layer of the layered product, then a capacitor in which the surfaces of the electrode leads are formed only on one of the upper and lower surfaces can be produced by not machining holes in either the upper or the lower protective layer.

Except for the above-described differences however, this embodiment is similar to Embodiment B-2.

Embodiment B-4

This embodiment differs from the foregoing Embodiments B-1 to B-3, in which the patterning of the metal thin films was performed by oil patterning in that the patterning of the metal thin films is performed by laser patterning with laser light.

Figure 12:
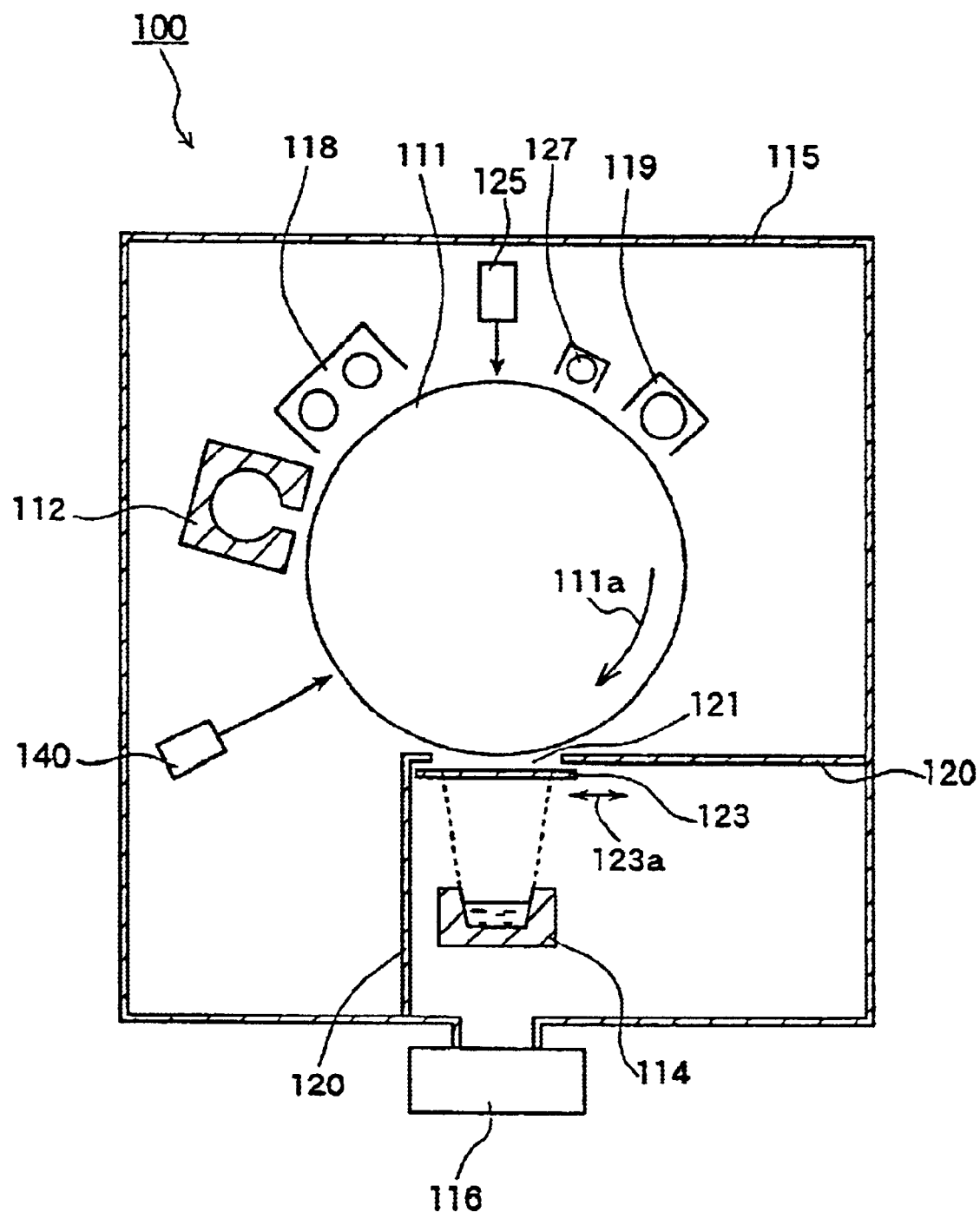
FIG. 12 is a schematic cross-sectional view showing an example of a manufacturing apparatus for practicing the method for manufacturing a layered product in accordance with Embodiment B-4 of the present invention.

FIG. 12 is a schematic cross-sectional view showing an example of a manufacturing apparatus for carrying out the method for manufacturing a layered product in accordance with Embodiment B-4 of the present invention. Structural elements corresponding to those in FIG. 8 are marked by the same numerals, and their further explanation has been omitted.

This embodiment uses a laser patterning device 140 instead of the patterning material application devices 130a and 130b and the patterning material removing device 117 (see FIG. 8) used for patterning the metal thin films in the Embodiments B-1 to B-3. The laser patterning device 140 is arranged downstream from the metal thin film formation device 114 and upstream from the resin thin film formation device 112.

After a metal thin film has been formed, laser light is irradiated with the laser patterning device 140 on the metal thin film surface, thus heating and melting (and partially evaporating) the metal thin film at the irradiated positions, and forming the margins.

Different from the laser light emitted by the laser machining device 125, the laser light emitted by the laser patterning device 140 has to be such that it affects only the metal thin films, and not the resin thin films. As a laser light source with these properties, it is preferable to use a laser with a relatively short wavelength, such as a YAG (Yttrium Aluminum Garnet) laser, a green laser, or an excimer laser, depending on the materials for the resin thin films and the material for the metal thin films. Laser light with long wavelengths is reflected from the metal thin film surface. Also, the output power of the laser light source can be selected in accordance with the type and thickness of the metal thin film to be removed.

The laser light is irradiated in accordance with the desired pattern for the margins. Depending on the pattern of the margins, it is also possible to use a plurality of laser light sources. For example, to provide them with grid-shaped margins, the metal thin films can be patterned as follows: Light from a first laser light source is split with a prism into a plurality of light beams substantially in parallel to the rotation axis of the can roller 111, and irradiated on the outer peripheral surface of the can roller 111, thus forming a plurality of continuous band-shaped margins in the travel direction of the outer peripheral surface of the can roller 111. The light from the second laser light source is scanned with one of the methods known in the art, so as to intersect with the band-shaped margins formed with the first laser light source.

By patterning the metal thin films by laser patterning as in this embodiment, it is easy to pattern the metal thin films in the desired shape. Furthermore, with the oil patterning method of the Embodiments B-1 to B-3, margins are formed that are diagonal with respect to the travel direction of the outer peripheral surface of the can roller 111, but with the laser patterning method of this embodiment, it is possible to form margins that are parallel and perpendicular to the travel direction of the outer peripheral surface of the can roller 111.

On top of the metal thin film that has been patterned into grid shape by the laser patterning device 140 together with the rotation of the can roller 111, a resin thin film is layered with the resin thin film formation device 112, and another metal thin film is formed again on top of that with the metal thin film formation device 114. Then, the metal thin film at the surface layer is again patterned into grid shape with the laser patterning device 140, but the formation position of the grid-shaped pattern is shifted by a predetermined amount with respect to the formation position of the previous grid-shaped pattern. In addition, the formation position of the grid-shaped pattern in the metal thin film that has been layered by rotating the can roller 111 for one more rotation is shifted by a predetermined amount with respect to the formation position of the previous grid-shaped pattern, and coincides with the position of the grid-shaped pattern before that. This makes it possible to layer the metal thin films and resin thin films in alternation, providing two types of metal thin films in which the positions of the grid-shaped patterns are shifted by a predetermined amount relative to one another.

In this manner, a layered product as shown in FIG. 11 can be obtained on the outer surface of the can roller 111. It should be noted, however, that in this embodiment, as mentioned above, the relative orientation of the travel direction 111b of the outer peripheral surface of the can roller 111 and the direction of the grid-shaped pattern are not limited to the one shown in FIG. 11.

In addition to the above, it is possible to obtain any of the layered products (or capacitors) of the Embodiments A-1, A-2, A-4 and A-5 or the array capacitor of Embodiment A-3 as with the Embodiments B-1 to B-3.

Embodiment B-5

Embodiment B-5 differs from the foregoing Embodiments B-1 to B-3, in which the patterning of the metal thin films is performed by oil patterning, and from Embodiment B-4, in which the patterning of the metal thin films is performed by laser patterning, in that the patterning of the metal thin films is performed by a combination of oil patterning and laser patterning.

Figure 13:
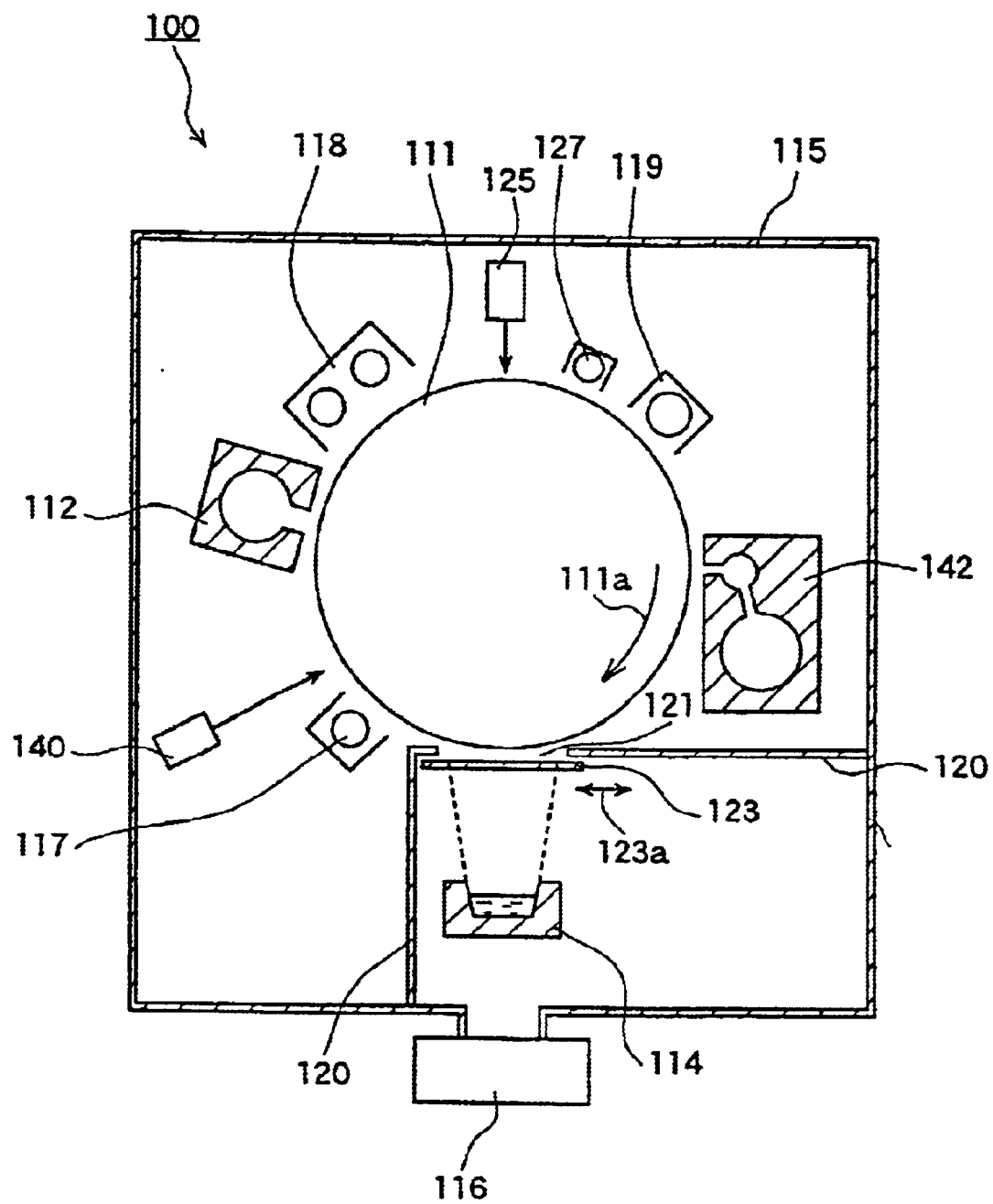
FIG. 13 is a schematic cross-sectional view showing an example of a manufacturing apparatus for practicing the method for manufacturing a layered product in accordance with Embodiment B-5 of the present invention.

FIG. 13 is a schematic cross-sectional view showing an example of a manufacturing apparatus for carrying out the method for manufacturing a layered product in accordance with Embodiment B-5 of the present invention. Structural elements corresponding to those in FIGS. 8 and 12 are marked by the same numerals, and their further explanation has been omitted.

In this embodiment, a pattern material application device 142 is arranged downstream from the resin thin film formation device 112 and upstream from the metal thin film formation device 114. The pattern material application device 142 forms a plurality of band-shaped margins by oil patterning. Furthermore, the laser patterning device 140 is arranged downstream from the metal thin film formation device 114 and upstream from the resin thin film formation device 112. By laser patterning, the laser patterning device 140 forms margins intersecting with the band-shaped margins formed by the patterning material application device 142.

On the patterning material application device 142, a plurality of micro-holes formed in opposition to the outer peripheral surface of the can roller 111 are arranged at a predetermined spacing and in a perpendicular direction to the travel direction of the outer peripheral surface of the can roller 111. The patterning material, which has been gasified inside the patterning material application device 142, is ejected from the micro-holes, and adheres to the resin thin film layered on the can roller 111, thus forming a plurality of band-shaped liquid films arranged in parallel to the travel direction of the outer peripheral surface of the can roller 111.

Then, when a metal thin film is layered with the metal thin film formation device 114, band-shaped margins corresponding to the liquid film portions of patterning material are formed.

Then, using the laser patterning device 140, laser light is irradiated onto the metal thin film while scanning the laser light so that it intersects with the band-shaped margins, thus forming margins. Thus, it is possible to form a metal thin film patterned with the desired grid shape.

Also in this embodiment, the formation position of the grid-shaped pattern of the metal thin film in one layer is shifted by a predetermined amount with respect to the formation position of the grid-shaped pattern of the metal thin film formed below, separated by a resin thin film, but matches the formation position of the grid-shaped pattern of the metal thin film that is formed below that, separated by a resin thin film. That is to say, two types of metal thin films, in which the position of the grid-shaped pattern is shifted by a predetermined amount, are layered in alternation, separated by resin thin films. This can be accomplished as follows: In a first method, when the can roller 111 has completed one rotation, the patterning material application device 142 is shifted by a predetermined amount in the direction of the rotation axis of the can roller 111, and after the next rotation has been completed, it is shifted back to its original position. Alternatively, in a second method, when the can roller 111 has completed one rotation, the position where laser light is irradiated with the laser patterning device 140 is shifted by a predetermined amount in a direction perpendicular to the travel direction, and after the next rotation has been completed, it is shifted back to its original position.

In this manner, it is possible to obtain a layered product as shown in FIG. 11 on the outer surface of the can roller 111. In this embodiment, however, the direction of the vertical or horizontal margins of the grid-shaped pattern of metal thin films coincides with the travel direction 111b of the outer peripheral surface of the can roller 111. By shifting the patterning material application device 142 in a direction parallel to the rotation axis of the can roller 111 or adjusting the scanning parameters of the laser light from the laser patterning device 140, it is possible to let the margins of the grid-shaped pattern of metal thin films intersect at any desired angle with the travel direction 111b of the outer peripheral surface of the can roller 111. The direction of the margin is set considering the scale of the equipment and the scanning speed of the laser.

In addition to the above, it is possible to obtain any of the layered products (or capacitors) of the Embodiments A-1, A-2, A-4 and A-5 or the array capacitor of Embodiment A-3 in the same manner as in the Embodiments B-1 to B-3.

Embodiment B-6

In Embodiment B-6, a carrier of regular polygonal shape is used instead of the cylindrical can roller 111 used for the Embodiments B-1 to B-5, and by rotating it intermittently, the layered product is formed on its outer periphery.

Figure 14:
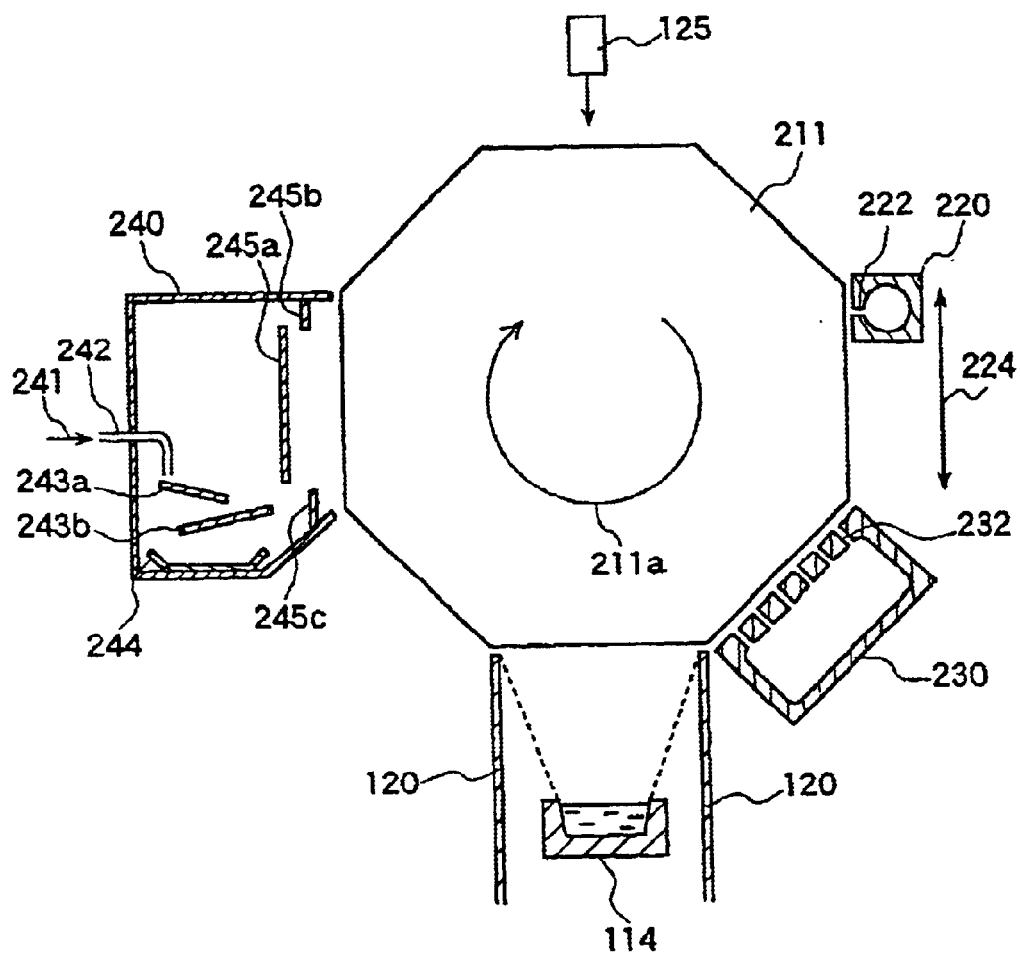
FIG. 14 is a schematic cross-sectional view showing the main components of an example of a manufacturing apparatus for practicing the method for manufacturing a layered product in accordance with Embodiment B-6 of the present invention.

FIG. 14 is a schematic cross-sectional view showing the main components of an example of a manufacturing apparatus for carrying out the method for manufacturing a layered product in accordance with Embodiment B-6 of the present invention. In FIG. 14, structural elements corresponding to those in FIGS. 8, 12 or 13 are marked by the same numerals, and their further explanation has been omitted.

In this embodiment, a layered product is formed on the outer peripheral surface of a carrier 211 shaped like a regular octagon. The carrier 211 is rotated intermittently in the rotation direction 211*a*, by an angle of 45° each time.

The patterning of the metal thin films is carried out by oil patterning with patterning material application devices 220 and 230.

In the first patterning material application device 220, a plurality of micro-holes 222 are formed at a predetermined pitch in the direction perpendicular to the paper plane (secondary direction of the outer peripheral surface of the carrier 211), facing the outer peripheral surface of the carrier 211. When the carrier 211 stops rotating, the patterning material application device 220 is shifted in the shifting direction 224, while patterning material that has been gasified inside the device is emitted through the micro-holes 222. As a result, a plurality of band-shaped liquid films or patterning material are formed on the outer peripheral surface of the carrier 211, in parallel to the travel direction of the outer peripheral surface.

Then, rotating the carrier 211 by 45°, the outer peripheral surface of the carrier 211 to which patterning material has been applied with the first patterning material application device 220 is placed in opposition to the second patterning material application device 230.

In the second patterning material application device 230, a plurality of micro-holes 232 are formed at a predetermined pitch in the travel direction of the outer peripheral surface of the carrier 211, facing the outer peripheral surface of the carrier 211. When the carrier 211 stops rotating, the patterning material application device 230 is shifted in the direction perpendicular to the paper plane (secondary direction of the outer peripheral surface of the carrier 211), while patterning material that has been gasified inside the device is emitted through the micro-holes 232. As a result, a plurality of band-shaped liquid films or patterning material are formed on the outer peripheral surface of the carrier 211, in the secondary direction of the carrier 211.

The outer peripheral surface of the carrier 211, on which substantially grid-shaped liquid films of patterning materials have been formed with the first and second patterning material application devices 220 and 230 is placed in opposition to the metal thin film formation device 114 by rotating the carrier 211 for a further 45°, to form metal thin films that are approximately patterned into rectangles.

Then, the face on which the metal thin films are formed is placed in opposition to the resin thin film formation device 240. The resin thin film formation device 240 includes oblique heating plates 243*a* and 243*b*. Liquid resin thin film material 241 drips from a supply pipe 242 onto the heating plate 243*a*, and is evaporated while flowing down first the heating plate 243*a* and then the heating plate 243*b*. The resin thin film material that has not evaporated is collected with a tray 244. The evaporated resin thin film material passes between the shielding plate 245*a* and the shielding plate 245*b*, forming a resin thin film adhering to the outer peripheral surface of the carrier 211.

Thus, by rotating the carrier 211 of regular octagonal shape intermittently by 45° each in the rotation direction 211*a*, it is possible to form a layered product with rectangularly patterned metal thin films and resin thin films layered in alternation on the outer peripheral surface of the carrier 211.

Also in this embodiment, a layered product for a capacitor can be obtained, in which two types of metal thin films, in which the position of the grid-shaped pattern of the metal thin films is shifted by a predetermined amount, are layered in alternation, separated by the resin thin films. In order to shift the grid-shaped patterns of the metal thin films, the first patterning material application device 220 or the second patterning material application device 230 can be shifted every time the carrier 211 has completed one rotation by a predetermined amount in a direction perpendicular to the travel direction of the carrier 211.

Although it is not shown in FIG. 14, the apparatus is accommodated in a vacuum device sustaining a predetermined vacuum level. Furthermore, as shown in FIGS. 8, 12 and 13, the patterning material removing device 117, the resin curing device 118, the surface processing device 119, the shielding plate 123, and the plasma irradiation device 127 are arranged in opposition to the outer peripheral surface of the carrier 211.

After the formation of the layered product, via holes penetrating the entire layered product are formed at predetermined positions of the layered product with the laser machining device 125, as in Embodiment B-1, while the layered product is still on the outer peripheral surface of the carrier 211. Alternatively, every time the rotation of the carrier 211 is stopped during the alternate layering step, via holes are formed at predetermined positions of the newly layered resin thin films and metal thin films with the laser machining device 125, as in Embodiment B-2. After the alternate layering step, the layered product is peeled off the carrier 211, and the via holes are filled with conductive material. Then, by cutting the layered product at predetermined positions, layered products as described in Embodiments A-1 (FIGS. 1A to 1E) and A-4 (FIGS. 5A to 5E) or an array capacitor as in Embodiment A-3 (FIG. 4A) (that is, the embodiment taking the capacitor elements 36 as the capacitors of the Embodiment A-1) can be obtained.

Alternatively, every time the rotation of the carrier 211 is stopped during the alternate layering step, via holes are formed at predetermined positions of the newly layered resin thin films with a laser machining device 125 that can remove/machine the resin thin films only, as in Embodiment B-3. Then, by peeling the layered product off the carrier 211 and cutting it at predetermined positions, it is possible to obtain layered products as described in Embodiments A-2 (FIGS. 3A to 3E) and A-5 (FIGS. 7A to 7E). Furthermore, an array capacitor as described in Embodiment A-3 (that is, the embodiment taking the capacitor elements 36 as the capacitors of the Embodiment A-2) can be obtained by forming the second via holes for the via electrodes in the regions where no metal thin films are formed, filling them with conductive material, and cutting the layered product.

In the example of FIG. 14, the patterning of the metal thin films into grid shape was carried out by oil patterning with the first and second patterning material application devices 220 and 230, but the present invention is not limited to this. For example, the metal thin films also can be patterned by laser patterning using a laser patterning device instead of the first and second patterning material application devices 220 and 230, as described in Embodiment B-4. Alternatively, it is also possible to replace one of the first and second patterning material application devices 220 and 230 with a laser patterning device, and pattern the metal thin films using a combination of oil patterning and laser patterning, as in Embodiment B-5.

Furthermore, the carrier 211 is in no way limited to an octagonal prism, and it also can be a hexagonal prism, decagonal prism, or any other suitable shape.

With this embodiment as explained above, the layered product is formed in flat shape on the outer peripheral surfaces of the carrier 211, so that it is possible to omit or simplify the step of pressing the layered product flat after peeling it off the carrier 211, which is performed when a roll-shaped carrier is used. Furthermore, cracks in the layered product or damage to the metal thin films during the pressing step can be avoided, which increases the yield.

Embodiment B-7

Embodiment B-7 uses flat carriers of predetermined size for the carrier. While continually feeding a plurality of these carriers, resin thin films and metal thin films are formed on their lower surface.

More specifically, a conveyance path is formed over which a plurality of carriers are rotated, and a resin thin film formation device and a metal thin film formation device are arranged alongside this conveyance path. When the carriers pass above the resin thin film formation device and the metal thin film formation device, resin thin films and metal thin films are formed on the lower surface of the carriers.

If the patterning of the metal thin films is carried out by oil patterning, then the carriers are passed above a patterning material application device after having passed the resin thin film formation device and before arriving at the metal thin film formation device. If the patterning of the metal thin films is carried out by laser patterning, then the carriers are passed above a laser patterning device after having passed the metal thin film formation device and before arriving at the resin thin film formation device.

Furthermore, to form via holes, it is possible to arrange a laser machining device along the circulation path of the carriers, in accordance with the arrangement in the Embodiments B-1 to B-6, depending on the thin films to be machined.

A patterning material removing device, a resin curing device, a surface processing device, and a plasma processing device can be arranged along the circulation path of the carriers, in accordance with the arrangement in the Embodiments B-1 to B-6.

In this manner, it is possible to obtain a layered product, in which patterned metal thin films and resin thin films are layered in alternation on a carrier. Then, the layered products of the Embodiments A-1, A-2, A-4 and A-5, or the array capacitor of the Embodiment A-3 can be obtained by filling conductive material into the via holes, as necessary, and cutting the layered product.

In accordance with the present invention, the methods for patterning the metal thin films are not limited to the examples given above. For example, when employing oil patterning, it is also possible to use a patterning material application device 540 as described in Embodiment C-2 below.

WORKING EXAMPLES

Working Example I-1

The following is an explanation of a manufacturing example of the layered product and capacitor described in Embodiment A-1 (FIGS. 1A to 1E) using the manufacturing apparatus described in Embodiment B-1 (FIG. 8).

The vacuum container 115 was set to $2 \times 10^{-2}$ Pa with the vacuum pump 116, and the outer peripheral surface of the can roller 111 was cooled to 10° C. The diameter of the can roller 111 was 500 mm, and the traveling speed of its outer peripheral surface was set to 100 m/min.

Dicyclopentadiene dimethanoldiacrylate was used for the resin thin film material. Aluminum was used for the metal thin film material, and formed by vaporizing. A fluorine oil was used for the patterning material.

Before the layering, a fluorine-based releasing agent ("DAIFREE" by Daikin Industries, Ltd.) was sprayed on the outer peripheral surface of the can roller 111, and wiped to a thin layer with a non-woven fabric.

First of all, a protective layer was formed by layering resin thin films only. The aforementioned resin thin film material was gasified and deposited on the outer peripheral surface of the can roller 111 with the resin thin film formation device 112. The thickness per layer was 0.6 $\mu$m. Then, using a UV light curing device as the resin curing device 118, the deposited resin thin film material was polymerized, and cured to a curing degree of 70%. This operation was repeated while rotating the can roller 111, until a protective layer of 15 $\mu$m thickness was formed on the outer peripheral surface of the can roller 111. During that time, the aperture 121 was kept shut with the shielding plate 123.

Then, an element layer serving as the capacitance generation portion of the capacitor was layered. For this, the resin thin film material was used, and the thickness per layer was set to 0.1 $\mu$m. Then, the resin thin film was cured to a curing degree of 70% with the resin curing device 118. After that, the surface was processed with an oxygen plasma, using the surface processing device 119. Next, vapor of patterning material was emitted from the micro-holes of the patterning material application devices 130a and 130b. Shifting the patterning material application devices 130a and 130b back and forth at substantially the same speed as the traveling speed of the outer peripheral surface of the can roller 111, a grid-shaped liquid film pattern of patterning material was formed on the surface of the resin thin film on the outer peripheral surface of the can roller 111. Then, aluminum was vapor deposited with the metal thin film formation device 114. The layering thickness was set to 30 nm. After that, a far-infrared heating and plasma emission process was performed with the patterning material removing device 117, and the remaining patterning material was removed.

The position of the grid-shaped pattern of patterning material was changed after each rotation of the can roller 111, so that two types of metal thin films with different positions of the grid-shaped pattern were formed, separated by resin thin films.

By repeating this process about 300 times while rotating the can roller 111, an element layer with a total thickness of 390 $\mu$m was formed.

Then, the aperture 121 was closed, and another protective layer was formed, as described for the protective layer mentioned above.

After the formation of the protective layer, the resin thin film formation device was stopped, and via holes penetrating the entire layered product were formed at predetermined locations with the laser machining device 125 while rotating the can roller 111. A $CO_2$ laser (with 20W output power) was used for the laser machining device 125. The inside of the formed via holes was subjected to an oxygen plasma by the plasma irradiation device 127.

Then, the layered product was peeled off the can roller 111, pressed flat, and a conductive resin was filled into the via holes, thus obtaining a laminate base element.

Subsequently, the laminate base element was cut at positions where no metal thin films were formed (that is, at the margins), obtaining the layered product shown in FIGS. 1A to 1E.

The external dimensions of the resulting layered products were 0.5 mm length×1.0 mm width×0.42 mm height (in the layering direction), and the diameter of the via holes was 0.2 mm. The area of the opposing metal thin films functioning as a capacitor was 0.4 mm length×0.3 mm width. When electrode terminals were formed on the surface of the conductive resin in the pair of via holes to examine the properties as a capacitor, it was found that the capacitance was 40 nF.

Working Example I-2

A laminate base element was obtained in the same manner as in Working Example I-1, except for changing the amount by which the grid-shaped pattern of the upper and lower metal thin films lining a resin thin film were shifted. Then, modifying the positions of the cutting planes in Embodiment I-1, the layered product described in Embodiment A-4 (FIGS. 5A to 5E) was obtained.

The external dimensions of the resulting layered products were 0.5 mm length×1.0 mm width×0.42 mm height (in the layering direction), and the radius of the semicircular cutout portions was 0.1 mm. The area of the opposing metal thin films functioning as a capacitor was 0.4 mm length×0.65 mm width. When electrode terminals were formed on the surface of the conductive resin in the pair of cutout portions to examine the properties as a capacitor, it was found that the capacitance was 87 nF. Compared to the capacitor of Embodiment I-1, the capacitor of this embodiment had a larger area of opposing metal thin films while having substantially the same dimensions, so that as a result, a larger capacitance could be attained.

In the first aspect of the present invention, the above-described working examples are merely examples, and the present invention is in no way limited by these examples. For example, the number of layers of the layered product can be chosen as appropriate depending on the application for the layered product and its desired specifications (for example, the desired capacitance when used as a capacitor), and the number of layers calculated from the thickness of one layer and the entire thickness in the above-described working examples is merely an example. However, it should be noted that with regard to handling of the resulting layered product, extremely thin layered products tend to break easily. As the inventors found out, layered products with a thickness of at least 100 $\mu$m do not tend to break easily, but the handling of layered products with a thickness of not more than 20 $\mu$m required special care. Consequently, when 1 $\mu$m is taken as an upper limit for the total thickness of one resin thin film and one metal thin film, then a layering number of at least 20 layers of resin thin films results as a practical lower limit for the number of layers of the layered product. It is more preferable that the number of layers of resin thin films is at least 100. Regarding the upper limit of the number of layers, on the other hand, there are less limiting factors than for the lower limit. However, since in high-density mounted circuit boards there are only few electronic components with a thickness of more than 1 mm, which is a component height that is higher than that of semiconductor chips, taking 0.1 $\mu$m as a lower limit for the total thickness of one resin thin film and one metal thin film, a layering number of at most 10000 layers of resin thin films results as a rough upper limit for the number of layers of the layered product.

Second Aspect of the Invention

The method for manufacturing a layered product in accordance with the second aspect of the present invention is characterized in that a layered product including resin thin films and metal thin films that are partitioned into a substantially rectangular shape are formed on a carrier.

The following is an explanation of a specific method for this, with reference to the accompanying drawings.

Embodiment C-1

Figure 15:
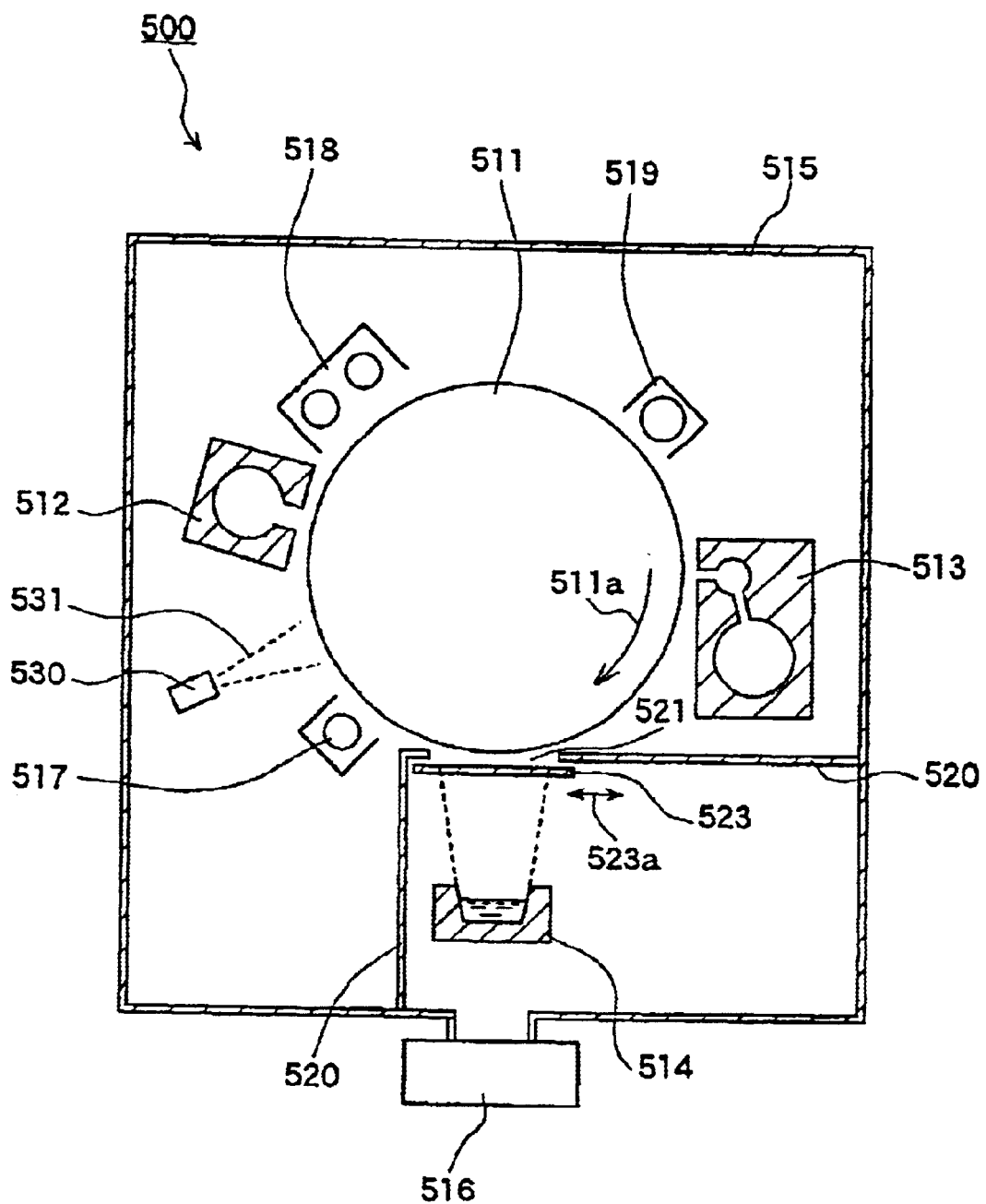
FIG. 15 is a schematic cross-sectional view showing an example of an apparatus for manufacturing a layered product, for practicing the method for manufacturing a layered product in accordance with Embodiment C-1 of the present invention.

FIG. 15 is a schematic cross-sectional view showing an example of an apparatus for manufacturing a layered product, for carrying out the method for manufacturing a layered product in accordance with Embodiment C-1 of the present invention.

In FIG. 15, numeral 500 denotes a manufacturing apparatus in accordance with the present embodiment, numeral 515 denotes a vacuum container, numeral 516 denotes a vacuum pump for sustaining a predetermined vacuum level inside the vacuum container 515, numeral 511 denotes a cylindrical can roller arranged inside the vacuum container 515 and rotating in direction of the arrow 511a in the drawing, numeral 512 denotes a resin thin film formation device, numeral 513 denotes a patterning material application device, numeral 514 denotes a metal thin film formation device (metal material supply source), numeral 517 denotes a patterning material removing device, numeral 518 denotes a resin curing device, numeral 519 denotes a surface processing device, numeral 520 denotes a partition wall for partitioning the metal thin film formation region from the other regions, numeral 521 denotes an aperture provided in the partition wall 520, numeral 523 denotes a shielding plate for opening and closing the aperture 521 by shifting in a shifting direction 523a so as to prevent the metal thin film from being formed outside the necessary times, numeral 530 denotes a laser light irradiation device for irradiating laser light on the outer peripheral surface of the can roller 511, and numeral 531 denotes the laser light emitted by the laser light irradiation device 530.

The formation of the metal thin films partitioned into a rectangular shape is achieved with the patterning material application device 513, the metal thin film formation device 514, and the laser light irradiation device 530.

The patterning material application device 513 spouts the heated and gasified patterning material through the opened micro-holes toward the can roller 511, adhering band-shaped liquid films to the resin thin film surface on the can roller 511. No metal thin film is formed at the locations where patterning material is adhered, resulting in first non-metallic bands (margins). The arrangement (spacing and number) of the micro-holes with respect to the rotation axis of the can roller 511 is chosen in accordance with the arrangement of the non-metallic bands to be formed. The width of the non-metallic bands can be adjusted by changing the size and the discharge amount of the micro-holes. It is possible to form metal thin films with different formation positions of the non-metallic films by shifting the patterning material application device 513 parallel to the rotation axis of the can roller 511 in synchronization with the rotation of the can roller 511.

Other ways to apply patterning material include direct application methods, such as reverse coating or die coating, but preferable are contactless application methods, because they prevent deformation and damage or surface roughening of the resin thin films and the metal thin films below due to application of pressure on the surface of the resin thin film.

It is preferable that the patterning material comprises at least one oil of the group consisting of ester oils, glycol oils, fluorocarbon oils, and hydrocarbon oils. It is even more preferable that the patterning material is an ester oil, a glycol oil, or a fluorine oil. It is most preferable that the patterning material is a fluorine oil. When other materials than the above patterning materials are used, the surface of the layered product may be roughened, pinholes may appear in the resin layers or the metal thin film layers, or other problems such as unsteady deposition at the borders of the metal thin films may occur.

After the patterning material has been applied, a metal thin film is applied with the metal thin film formation device 514. The metal thin film can be formed by such well-known vacuum processes as vapor deposition, sputtering, or ion plating. For the present invention however, vapor deposition, especially electron beam vapor deposition, is preferable, because with this method, films with excellent moisture resistance can be obtained with high productivity. Possible materials for the metal thin film layer include aluminum, copper, zinc, nickel, iron, cobalt, silicon, germanium, their compounds, their oxides, and the oxides of their compounds. Of these, aluminum is preferable, because of its adhesiveness and low cost. The metal thin film layer also can include other components. Furthermore, it is also possible to use not only one kind of metal thin films, but to mix, for example, an Al layer with a Cu layer to enhance their properties and attain a product with even better performance depending on the usage conditions.

The thickness of the metal thin films can be set as appropriate for the application of the resulting layered product, and if the layered product is used for an electronic component, then it is preferable that the thickness of the metal thin films is not larger than 100 nm, more preferably 10 to 50 nm, and even more preferably 20 to 40 nm. As an upper limit, it is preferable that the film resistance is not higher than $20\Omega/\square$, more preferably not higher than $15\Omega/\square$, and even more preferably not higher than $10\Omega/\square$. As a lower limit, it is preferable that the film resistance is at least $1\Omega/\square$, more preferably at least $2\Omega/\square$, and even more preferably at least $3\Omega/\square$.

Since the patterning material application device 513 has applied patterning material that is band-shaped in the travel direction of the outer peripheral surface of the can roller 511, no metallic thin film is formed at the positions to which patterning material has been applied, and band-shaped metal thin films are formed, leaving these patterning material portions open.

The laser light irradiation device 530 irradiates laser light to heat and evaporate the formed metal thin film, thus removing it.

The laser light can be chosen in accordance with the material of the metal thin films to be removed, but it is preferable to use a laser with relatively short wavelength, such as a YAG (Yttrium Aluminum Garnet) laser. Laser light with long wavelengths is reflected from the metal thin film surface and burns the resin thin film when irradiated on the resin thin film.

The laser light is scanned such that its track defines an approximately right angle with the first non-metallic bands that have been formed by the patterning material application device 513 parallel to the travel direction of the outer peripheral surface of the can roller 511. That is to say, since the metal thin films are moving due to the rotation of the can roller 511, the laser is irradiated while scanning it obliquely with respect to the travel direction of the metal thin films. The angle defined by the travel direction of the metal thin films and the scanning direction is chosen in accordance with the traveling speed of the metal thin films on the outermost layer formed on the can roller 511.

The non-metallic bands formed by irradiation of laser light have more reliable insulating properties than the non-metallic bands formed by the application of patterning material, and clearer non-metallic bands are obtained at their borders. Furthermore, since they can be formed contactlessly on the layered product, no external force is exerted on the layered product, and deformation, damage, or surface roughening of the resin thin films and the metal thin films can be prevented.

The width of the non-metallic bands can be modified by adjusting the output power and the scanning method of the laser light source.

In this manner, the metallic thin films are partitioned into an approximately rectangular shape (square or oblong) by first non-metallic bands parallel to the travel direction of the outer peripheral surface of the can roller 511 as formed by the patterning material application device 513, and second non-metallic bands substantially perpendicular to the travel direction of the outer peripheral surface of the can roller 511 as formed by the laser light irradiation device 530.

The following is an explanation of a manufacturing apparatus with a configuration different from FIG. 15.

The vacuum pump 516 maintains a predetermined vacuum level inside the vacuum container 515. A preferable vacuum level inside the vacuum container 515 is about 0.027 Pa ($2\times10^{-4}$ Torr). Furthermore, it is preferable that in the space including the metal thin film formation device 514 which is walled off by the partition wall 520, a pressure is maintained that is slightly lower than that in the remaining space. By doing so, the metal vapor stream or the metal particles from the metal thin film formation device 514 can be prevented from unintentionally leaking from the space including the metal thin film formation device 514.

The outer peripheral surface of the can roller 511 is smooth, preferably mirror finished, and cooled to preferably −20 to 40° C., more preferably to −10 to 10° C. The rotation speed can be set freely, but preferable is a rotation speed of about 15 to 100 rpm, and a circumferential speed of 20 to 30000 m/min.

The resin thin film formation device 512 vaporizes, gasifies or atomizes the resin material forming the resin thin film and emits it towards the surface of the can roller 511. The resin material adheres to the outer peripheral surface of the can roller 511, forming a resin thin film. With this method, it is possible to attain a superior resin thin film that is very thin and uniform and free of such defects as pinholes. There is no particular limitation to the resin thin film material, as long as it can be vaporized, gasified or atomized and then deposited to form a thin film, and it can be selected as appropriate for the application of the resulting layered product, but it is preferable that the resin thin film material is a reactive monomer resin. For example, a resin having an acrylate resin or a vinyl resin as its main component is preferable for applications of electronic components. More specifically, a multifunctional (meth)acrylate monomer, or a multifunctional vinyl ether monomer is preferable. Of these, for example, a cyclopentadiene dimethanoldiacrylate monomer or a cyclohexane dimethanoldivinylether monomer or one of these monomers with substituted hydrocarbon groups are preferable because of their electric properties, thermal resistance and stability. As a means for dispersing the resin material, the resin material can be evaporated or atomized with, for example, a heating means, such as a heater, with ultrasonic waves, or with an atomizer. Evaporating the resin material with a heating means, such as a heater, is especially preferable in view of the thickness and uniformity of the resulting resin thin film, the prevention of defects, and simplification of the equipment.

The deposited resin thin film material also can be subjected to a curing process and cured to a desired curing degree with the resin curing device 518, if necessary. Examples of curing processes include polymerization and/or cross-linking of the resin material. For the resin curing device, it is possible to use, for example, an electron beam irradiation device, a UV light irradiation device, or a heat curing device. The curing degree can be modified depending on the desired properties of the layered product to be manufactured, but it is preferable that the curing process is performed until the curing degree is 50 to 95%, more preferably 50 to 75% when manufacturing a layered product for an electronic component, such as a capacitor. If the curing degree is smaller than in these ranges, then the layered product can be easily deformed, for example by external forces at later steps, and there is the danger that the metal thin films are damaged or short circuits occur. If, on the other hand, the curing degree is larger than in these ranges, then there is the problem that the layered product may crack, for example due to external forces at later steps. To determine the curing degree of the present invention, the ratio of the absorbance of the C=O groups and the C=C groups (1600 cm$^{-1}$) is determined with an infrared spectrophotometer, the ratio of each monomer and the cured product is determined, and the curing degree is defined as 1 minus the reduced absorption ratio.

In the present invention, there is no particular limitation with regard to the thickness of the resin thin films, but it is preferable that the resin thin films are not thicker than 1 μm, more preferably not thicker than 0.7 μm and even more preferably not thicker than 0.4 μm. In order to make the layered product obtained by the method of the present invention suitable for miniaturization and high performance, it is preferable that the resin thin films are thin. For example, if the layered product obtained by the method of the present invention is used as a capacitor, then the capacitance of the capacitor is inversely proportional and thus larger, the thinner the resin thin films serving as the dielectric layers are.

The surface of the formed resin thin film is processed with the surface processing device 519, if necessary. For example, performing a discharge process or a UV light irradiation process under an oxygen atmosphere, the surface of the resin thin film can be activated to increase the adhesiveness with the metal thin film.

On the resin thin film formed in this manner, a metal thin film is formed with one of the above-described methods. After that, it is preferable to remove the remaining patterning material before layering the next resin thin film. The remaining patterning material may become the cause of such problems as a roughened surface of the layered product, pinholes (layering defects) in the resin thin films or the metal thin films, or unsteady deposition of the metal thin film at the formation borders. The removal of the patterning material is carried out with the patterning material removing device 517. There is no particular limitation to the method with which the patterning material is removed, and an appropriate method can be selected in accordance with the patterning material. For example, the patterning material can be removed by heat and/or decomposition. Examples for removing the patterning material by heat include irradiation of light and heating with an electric heater. For the irradiation of light, the necessary equipment can be simpler, and also the performance of the removal is higher. It should be noted that here, "light" also includes far-infrared and UV light. Suitable examples of methods for removing patterning material by decomposition include plasma irradiation, ion irradiation or electron irradiation. For plasma irradiation, it is possible to use an oxygen plasma, an argon plasma, or a nitrogen plasma for example, and of these, an oxygen plasma in particular is preferable.

The patterning material removal apparatus 517 can be arranged upstream with respect to the laser light irradiation device 530 as shown in FIG. 15, but it is also possible to arrange the laser light irradiation device 530 upstream.

When the aperture 521 of this manufacturing apparatus is open, a layered product is manufactured in which resin thin films formed with the resin thin film formation device 512 are layered in alternation with metal thin films formed with the metal thin film formation device 514 on the outer peripheral surface of the rotating can roller 511, or, when the aperture 521 is closed, a layered product is manufactured in which resin thin films are formed continually with the resin thin film formation device 512 on the outer peripheral surface of the rotating can roller 511.

Figure 16C:
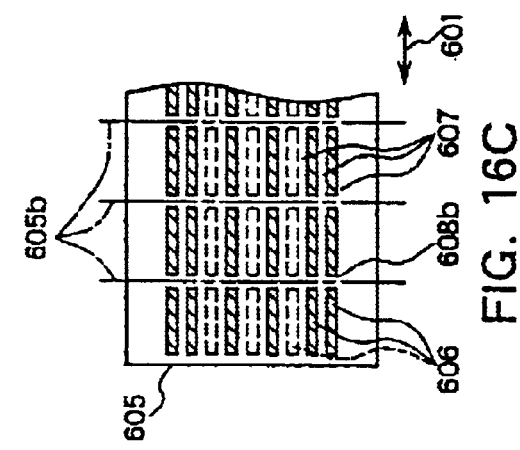
FIGS. 16A to 16D show an example of a laminate base element obtained with Embodiment C-1 of the present invention.
Figure 16D:
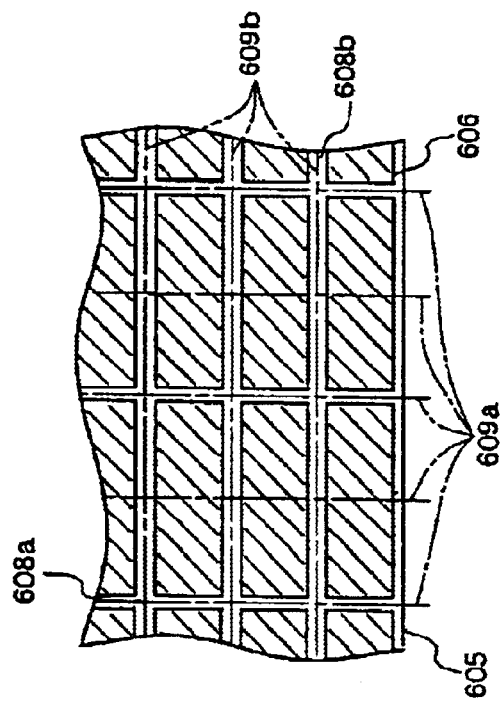
Figure 16B:
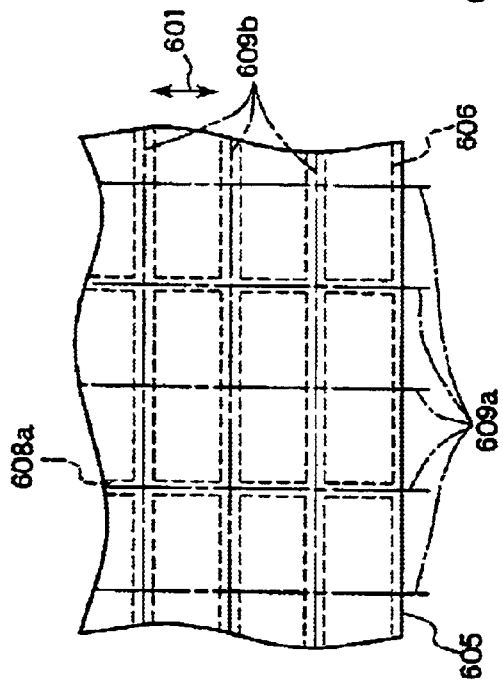
Figure 16A:
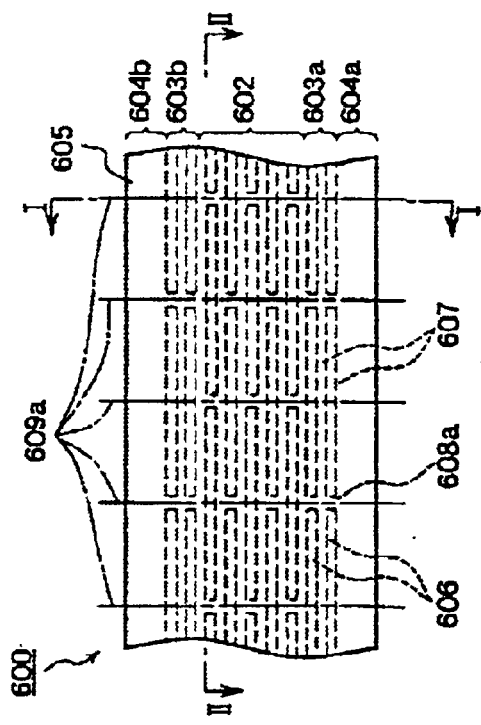
Figure 17:
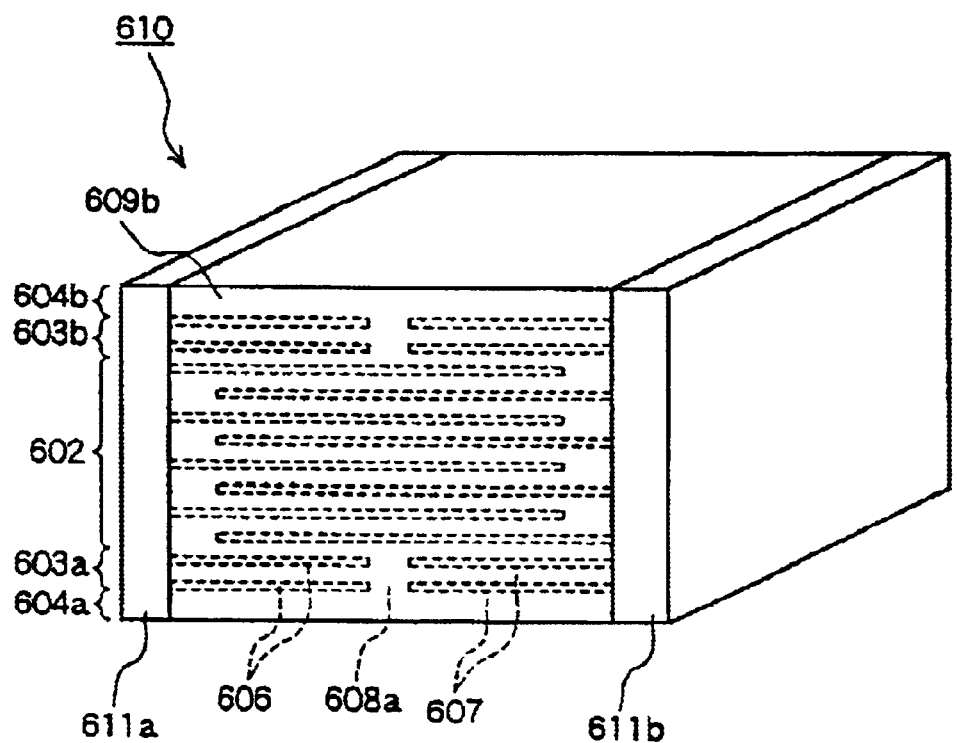
FIG. 17 is a schematic perspective view showing an example of a chip capacitor obtained with Embodiment C-1 of the present invention.

The following is an explanation of a method for manufacturing a chip capacitor 610 as shown in FIG. 17 from a laminate base element 600 as shown in FIGS. 16A to 16D, which has been produced with the above-described apparatus (FIGS. 16A to 16D, and FIG. 17 are described in detail below).

While rotating the can roller 511, a layer 604a, a layer 603a, a layer 602, a layer 603b, and a layer 604b are formed in that order on the can roller 511.

First, the layer 604a is formed. The layer 604a (protective layer) is formed by continuously layering resin thin film only. The protective layer 604a does not contribute to the capacitance of the capacitor, and its function is to prevent the layer 602 (element layer) serving as the capacitance generation portion from suffering damage by thermal load or external forces.

To layer the protective layer 604a, the can roller 511 is rotated and a predetermined number of resin thin films only is formed continuously while the aperture 521 is kept shut with the shielding plate 523.

Then, the layer 603a is formed. The layer 603a (reinforcement layer) is formed by layering resin thin films and metal thin films in alternation. This reinforcement layer 603a has the advantageous function of preventing the layer 602 (element layer) serving as the capacitance generation portions from being damaged by thermal loads or external forces. Furthermore, because it has metal thin films connected to the external electrodes, it also contributes to the adhesive strength of the external electrodes.

In the layering of the reinforcement layer 603a, patterning material is applied in band shapes to the surface of the resin thin films by the patterning material application device 513. Furthermore, the aperture 521 is opened by moving the shielding plate 523, and metal thin films are layered. The metal thin films are partitioned into band shapes by the first non-metallic band resulting from the patterning material that has been applied in a band shape. Then, the laser light from the laser light irradiation device 530 is scanned and irradiated to form the second non-metallic bands. The laser light is scanned such that its scanning track defines an approximately right angle with the first non-metallic bands. By rotating the can roller 511 at a predetermined rotation speed in this situation, a layer 603*a* is formed, in which the metal thin films partitioned into substantially rectangular shape are layered in alternation with resin thin films.

Then, the layer 602 is formed. The layer 602 (element layer) is formed by layering resin thin films and metal thin films in alternation, and serves as the capacitance generation portion of the capacitor.

When layering the element layer 602, the patterning material application device 513 is shifted back or forth for a predetermined amount in the direction of the rotation axis of the roller 511 at each rotation of the can roller 511. By doing so, metal thin films are formed in which the position of the first non-metallic bands in adjacent layers differs. As in the layering of the reinforcement layer 603*a*, the second non-metallic bands are formed with the laser light irradiation device 530.

Then, the reinforcement layer 603*b* is layered. Keeping the patterning material application device 513 at the same position as when forming the reinforcement layer 603*a*, a predetermined number of layers is formed under the same layering conditions as when forming the reinforcement layer 603*a*.

Finally, the protective layer 604*b* is layered. To do so, the aperture 521 is shut by moving the shielding plate 523. Furthermore, the application of patterning material and the irradiation of laser light are stopped. In this situation, the can roller 511 is rotated to continuously layer a predetermined number of resin thin films only.

If, in the foregoing, second non-metallic bands are formed by irradiation of laser light, then it is preferable that the positions in the layering direction of the second non-metallic bands substantially coincide with one another throughout the entire layered product, which can be achieved by synchronizing the scanning of the laser light with the rotation of the can roller 511. With this configuration, no metal thin films are cut or exposed at the cutting planes when cutting the layered product in the layering direction along the second non-metallic bands.

Thus, a cylindrical multi-layer layered product of resin thin films and metal thin films partitioned into substantially rectangular shape is formed on the outer peripheral surface of the can roller 511. Then, the layered product is separated into pieces by cutting in the radial direction, and retrieved from the can roller 511. To do so, the layered product is cut along the second non-metallic bands. At these portions, there are no metal thin films, so that it can be cut easily, and without producing burrs or cutting chips of the metal thin films. Furthermore, the metal thin films are not exposed at the cutting planes.

After being cut into pieces and retrieved from the can roller 511, the layered product is pressed flat, thus obtaining a laminate base element 600, as shown for example in FIGS. 16A to 16D. FIG. 16A is a front view of the laminate base element, taken in the direction of the cutting plane, FIG. 16B is a plan view, FIG. 16C is a cross-sectional view taken in the arrow direction along line I—I in FIG. 16A, and FIG. 16D is a cross-sectional view taken in the arrow direction along line II—II in FIG. 16A. In FIGS. 16A to 16D, the arrow 601 coincides with the travel direction of the outer peripheral surface of the can roller 511. Numeral 605 denotes the cutting plane occurring when separating the cylindrical layered product, numeral 606 denotes the metal thin films, numeral 607 denotes the resin thin films, numeral 608*a* denotes the first non-metallic bands, and numeral 608*b* denotes the second non-metallic bands. FIGS. 16A to 16D are schematic drawings illustrating the layering configuration, and the actual number of layers may vary widely from those shown in the drawings. Furthermore, the thicknesses of the metal thin films 606 and the resin thin films 607, as well as the widths of the first and second non-metallic bands 608*a* and 608*b* are depicted larger than in the actual layered product.

In FIG. 16A, the lower surface of the laminate base element 600 is on the side of the can roller 511, and the protective layer 604*a*, the reinforcement layer 603*a*, the element layer 602, the reinforcement layer 603*b*, and the protective layer 604*b* are layered in that order from bottom to top. In this manner, the layers 604*a* and 604*b* are formed by continuously layering resin thin films only while the aperture 521 is kept shut, and the layers 602, 603*a* and 603*b* are formed by layering metal thin films and resin thin films in alternation while the aperture 521 is open. Furthermore, the layer 602 is layered while modifying the position of the first non-metallic bands 608*a* for each rotation, in synchronization with the rotation of the can roller 911.

As becomes clear from the FIGS. 16A to 16D, the metal thin films 606 of the laminate base element in this embodiment are not exposed at the cutting planes 605. As a result, corrosion due to oxidation or rusting of the metal thin films 606 starting at the cutting planes 605 does not occur, at least until the next step is carried out.

The obtained laminate base element 600 is cut at the cutting planes 609*a*. The cutting planes 609*a* pass approximately through the center of the first non-metallic bands 608*a*. Then, external electrodes are formed on the cutting planes 609*a*, for example by thermal spraying.

Then, the layered product is cut at positions corresponding to the cutting planes 609*b*. The cutting planes 609*b* pass approximately through the center of the second non-metallic bands 608*b*. As there are no metal thin films at the cutting planes 609*b*, the layered product can be cut easily, and without producing burrs or cutting chips of the metal thin films. Furthermore, the metal thin films are not exposed at the cutting planes. Consequently, corrosion due to oxidation or rusting of the metal thin films 606 starting at the cutting planes 609*b* does not occur, at least until the next step is carried out.

Then, an outer coating is applied as necessary, and a plurality of chip capacitors 610 as shown in FIG. 17 is obtained. In FIG. 17, the numerals 611*a* and 611*b* denote external electrodes formed to electrically connect the metal thin films 606.

As shown in FIG. 17, in the chip capacitor 610 obtained with this embodiment, the metal thin films 606 are not exposed at the two opposing lateral surfaces at which the external electrodes 611*a* and 611*b* have not been formed (that is, at the aforementioned cutting planes 609*b*). Consequently, it is possible to solder the external electrodes 611*a* and 611*b* and surface mount them directly to the circuit board, without forming a special insulation layer or the like on the cutting planes 609*b*. Consequently, this simplifies the mounting step and contributes to the overall miniaturization of the circuit board.

Embodiment C-2

Figure 18:
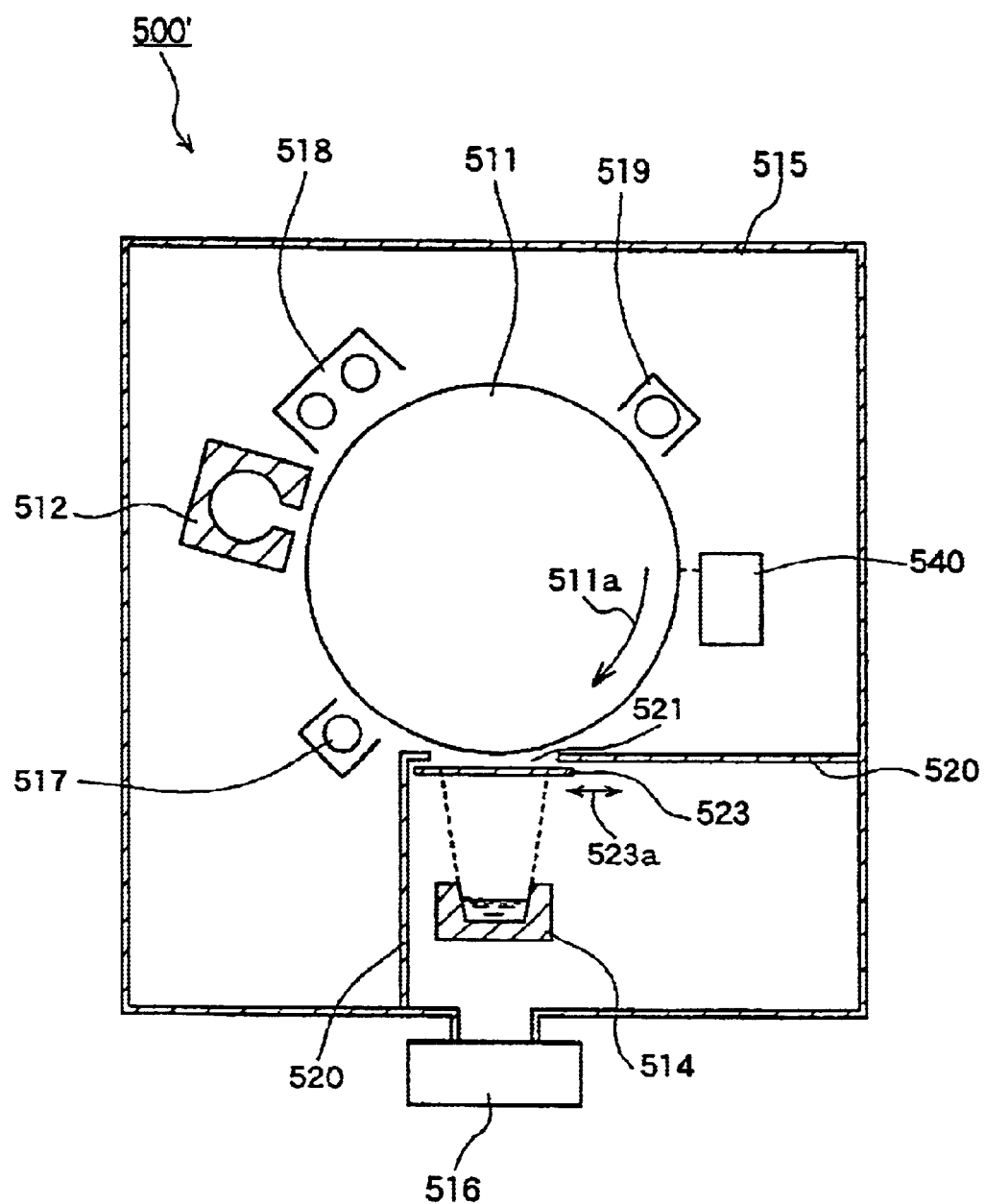
FIG. 18 is a schematic cross-sectional view showing an example of an apparatus for manufacturing a layered product, for practicing the method for manufacturing a layered product in accordance with Embodiment C-2 of the present invention.

FIG. 18 is a schematic cross-sectional view showing an example of an apparatus for manufacturing a layered product, for carrying out the method for manufacturing a layered product in accordance with Embodiment C-2 of the present invention. In FIG. 18, structural elements corresponding to those in FIG. 1 are marked by the same numerals, and their further explanation has been omitted.

The apparatus 500' for manufacturing a layered product of FIG. 18 differs from the manufacturing apparatus 500 of FIG. 15 as described in Embodiment C-1 in that it uses a patterning material application device 540 instead of the patterning material application device 513 of the manufacturing apparatus 500 in FIG. 15, and it does not use the laser light irradiation device 530 of the manufacturing apparatus 500 in FIG. 15.

The patterning material application device 540 of this embodiment spouts drops of liquid patterning material through the micro-holes, whereas the patterning material application device 513 in Embodiment C-1 spouts gasified patterning material through the micro-holes.

Figure 19:
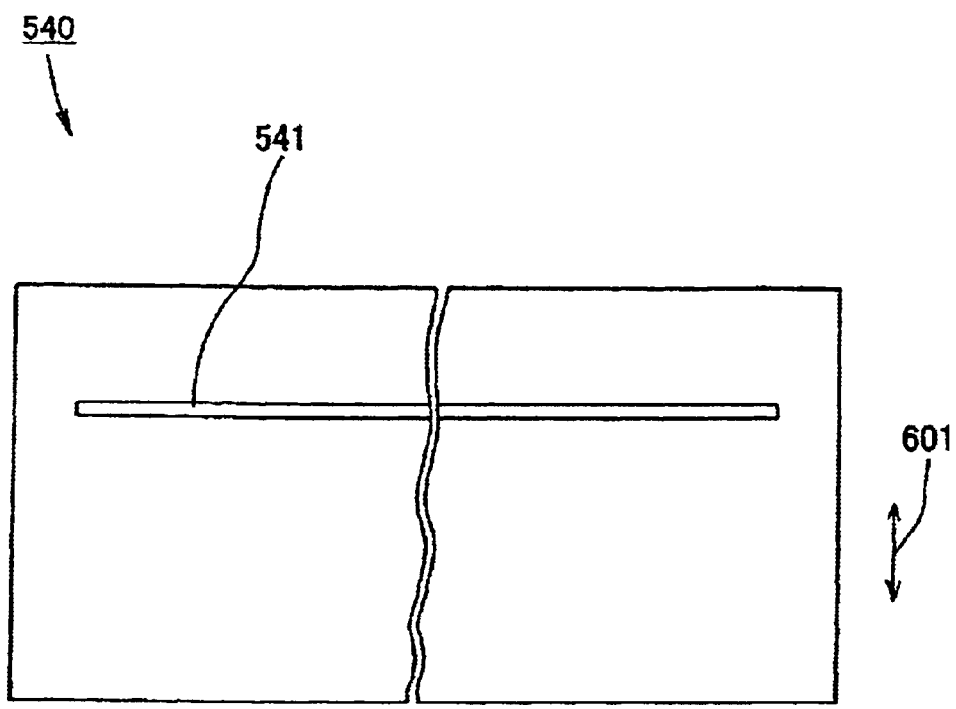
FIG. 19 is a front view of an example of the patterning material application device of the apparatus for manufacturing a layered product in accordance with Embodiment C-2 of the present invention.

FIG. 19 is a front view of the patterning material application device 540, taken from the side of the can roller 511. The patterning material application device 540 is arranged such that the direction indicated by the arrow 601 matches the travel direction of the outer peripheral surface of the can roller 511. On the front face of the patterning material application device 540, a nozzle head 541 is arranged at right angles to the arrow direction 601.

Figure 20:
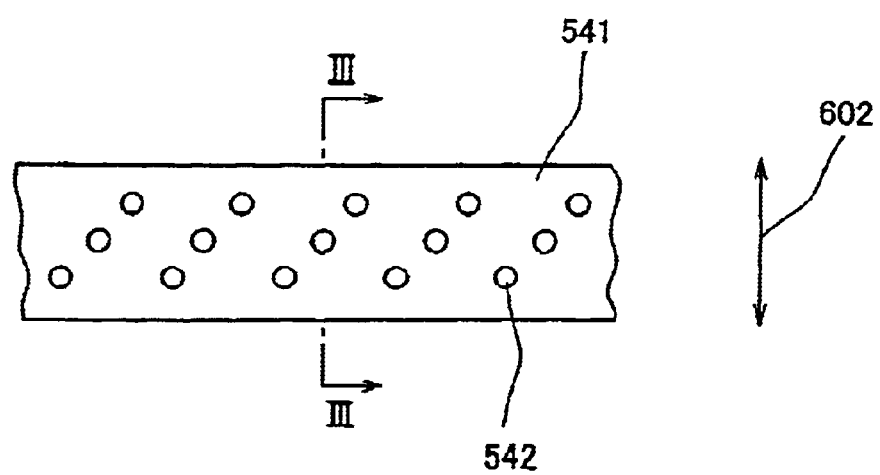
FIG. 20 is a magnification showing a portion of the nozzle head of the patterning material application device of FIG. 19.

FIG. 20 is a magnification showing a portion of the nozzle head 541 of FIG. 19 taken from the front. In FIG. 20, the arrow direction 602 matches the arrow direction 601 of FIG. 19. Micro-holes 542 are arranged on the surface of the nozzle head 541. In the example in FIG. 20, three micro-holes 542 each are arranged at predetermined intervals and at an angle of approximately 45° with respect to arrow direction 602, forming a micro-hole group. A predetermined number of micro-hole groups is arranged at predetermined intervals in the nozzle head. Projected onto a plane that is perpendicular to arrow direction 601, the micro-holes 542 are arranged at constant intervals.

Figure 21:
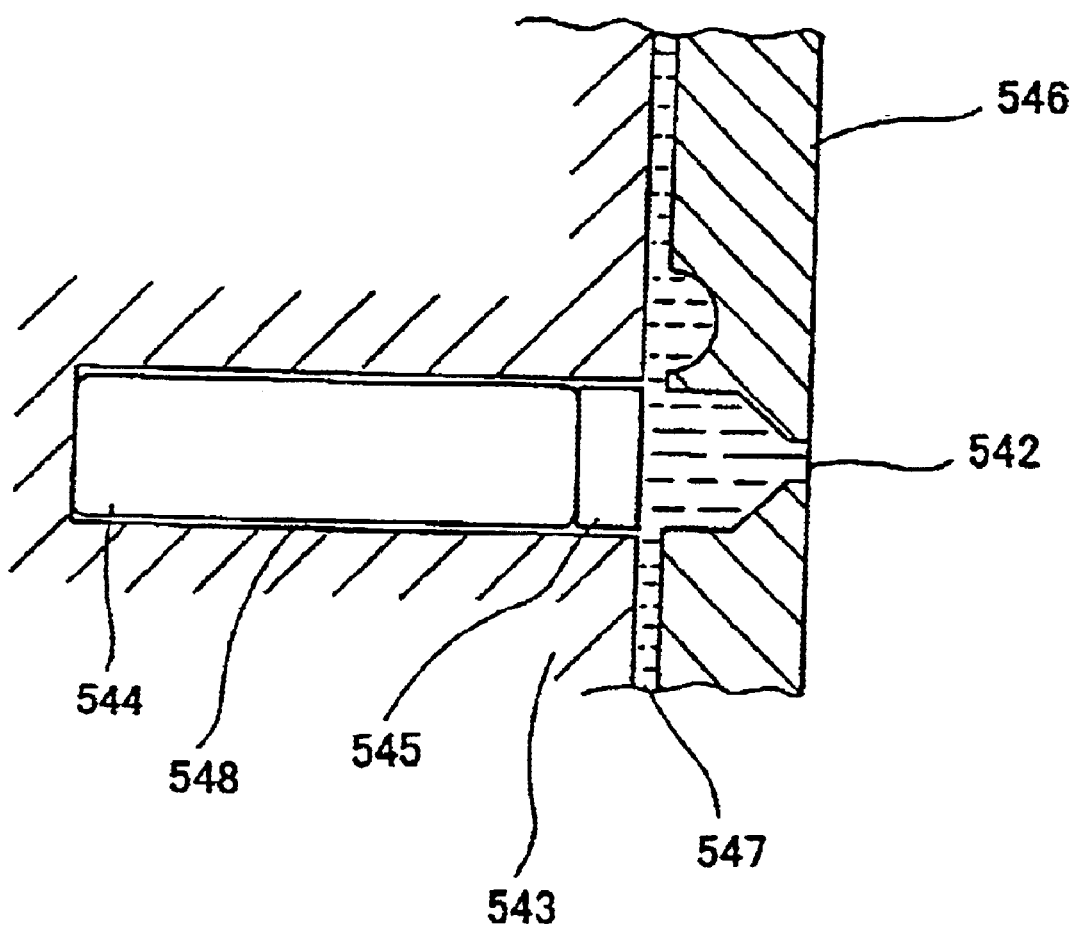
FIG. 21 is a partial cross-sectional view of a micro-hole, taken in the arrow direction along line III—III in FIG. 20.
Figure 22:
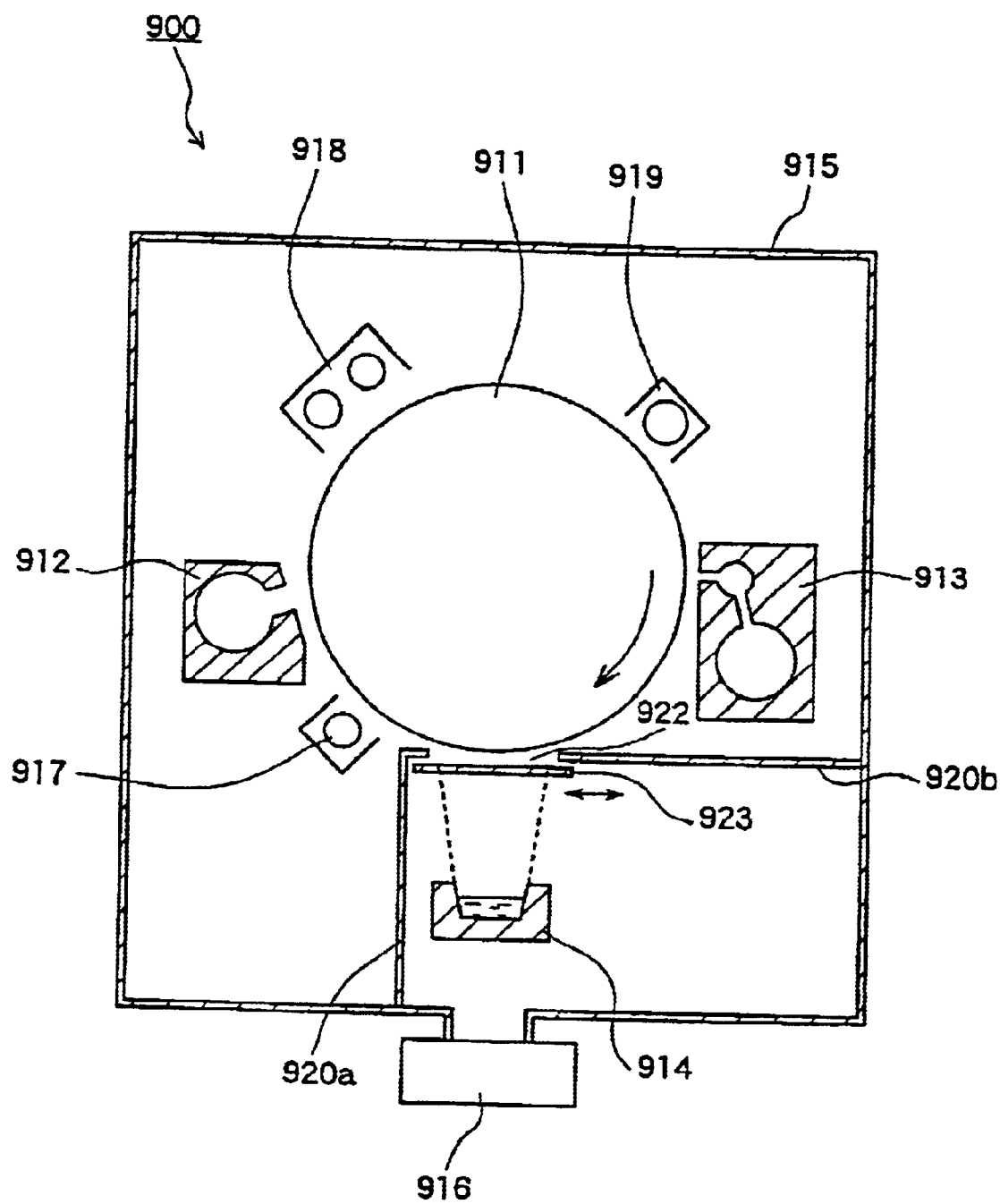
FIG. 22 is cross-sectional view schematically illustrating an example of manufacturing apparatus for practicing a conventional method for manufacturing a layered product.
Figure 23:
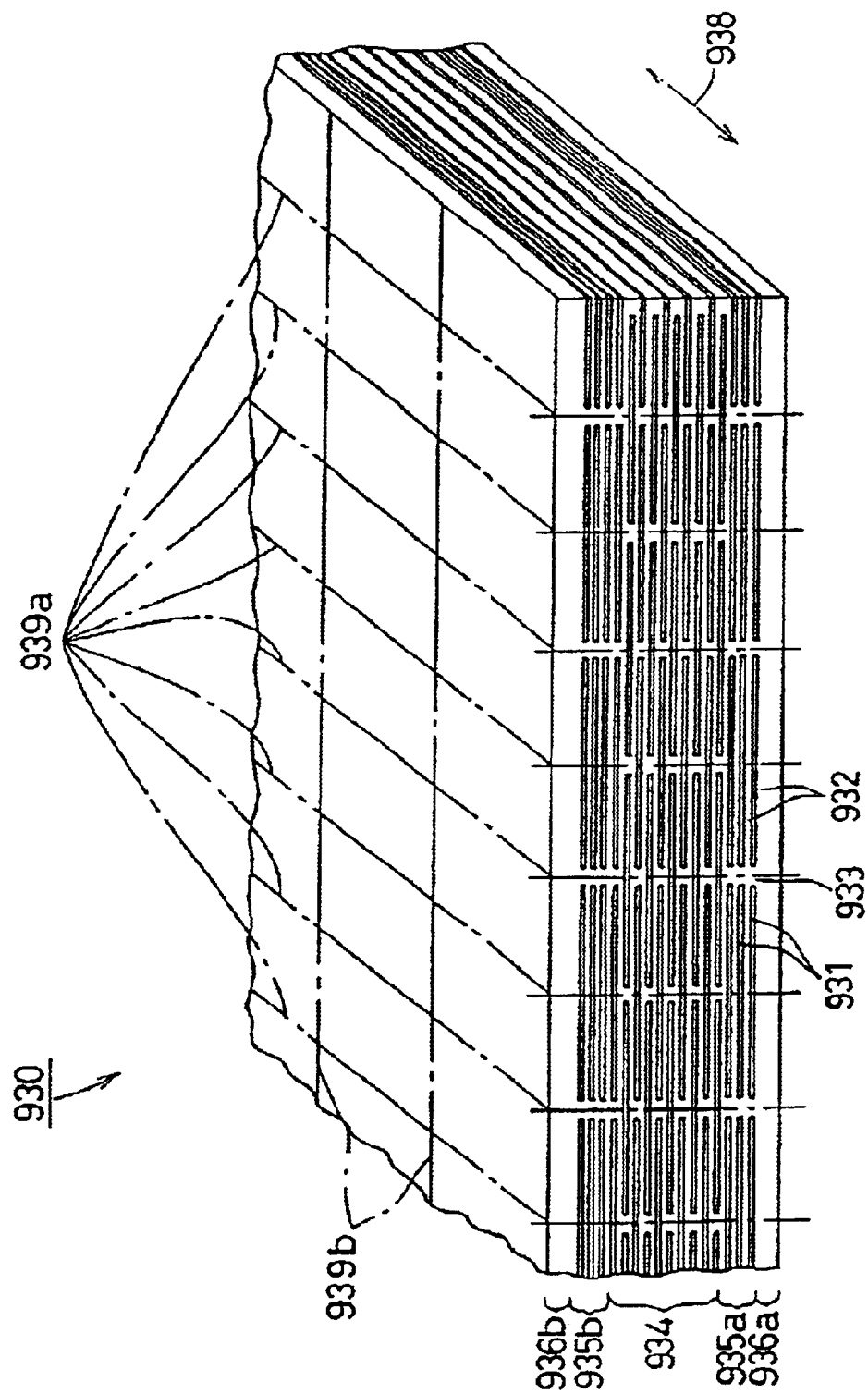
FIG. 23 is a perspective view showing the general configuration of a laminate base element obtained with the manufacturing apparatus of FIG. 22.

FIG. 21 is a partial cross-sectional view showing a micro-hole 542, taken in the arrow direction along line III—III in FIG. 20.

A cylinder 548 is cut into a base plate 543, at a portion that corresponds to the position of the micro-hole 542. A piezoelectric element 544 and a piston head 545 are inserted in that order into the cylinder 548. An orifice plate 546 is arranged at the front face of the base plate 543, and liquid patterning material 547 is filled between the orifice plate 546 and the base plate 543. The diameter of the micro-hole 542 can be designed as appropriate, and for example can be about 70 µm.

The spouting of the liquid patterning material from the micro-hole 542 is performed as follows. Using the piezoelectric effect, the piezoelectric element 544 is contracted, and the piston head 545 is retracted to the left in FIG. 21. Thus, a negative pressure develops at the front face of the piston head 545, and patterning material 547 is sucked into the cylinder 548 in the base plate. Then, by restoring the piezoelectric element to its original position, the patterning material that has accumulated in the cylinder 548 is ejected through the micro-hole 542. With this method, the patterning material is ejected dropwise, that is, discontinuously. Consequently, the patterning material that is ejected in a single ejection adheres as one dot on the deposition surface (that is, on the surface of the resin layer). By adjusting the ejection amount (that is, the drop size) and the ejection intervals of the patterning material per ejection, the patterning material can be applied as a continuous liquid film.

With this patterning material application device 540, it is easy to control the multitude of micro-holes independently from one another. Consequently, it is not only possible to apply the patterning material in band-shapes as with the patterning material application device 513 of Embodiment C-1, but also in a lattice shape (that is, grid-shaped).

Consequently, with this embodiment, the patterning material application device 540 applies patterning material that is band-shaped in the travel direction of the outer peripheral surface of the can roller 511, and also, at predetermined intervals, band-shaped patterning material that is perpendicular thereto. Subsequently forming a metal thin film with the metal thin film formation device 514, the patterning material portions applied in a lattice shape serve as non-metallic bands, and partition the metal thin films into a substantially rectangular shape. As a result, the laser light irradiation device 530 of Embodiment C-1 is not necessary in this embodiment.

As in Embodiment C-1, it is preferable that the positions in the layering direction of the second non-metallic bands substantially coincide with one another throughout the entire layered product, which can be achieved by synchronizing the rotation of the can roller 511 with the positions where the band-shaped patterning material is adhered in the travel direction of the outer peripheral surface of the can roller 511 and the direction substantially perpendicular thereto.

Moreover, by changing the micro-holes ejecting patterning material in this patterning material application device 540, it is possible to modify the positions of the first non-metallic bands without shifting the patterning material application device 540 back and forth in the direction of the rotation axis of the can roller 511, as done for the layering of the element layer 602 in Embodiment C-1.

Furthermore, the directionality of the emitted patterning material is sharper, and it is easier to apply the patterning material precisely in the intended manner than in Embodiment C-1, in which gasified patterning material is emitted and liquefied on the deposition surface. Furthermore, the distance between the micro-holes and the deposition surface can be larger (for example, ca. 500 µm), which increases the design freedom for the apparatus.

The patterning material preferable for this embodiment should be selected as appropriate in consideration of the viscosity under the usage conditions, for example, and basically the same patterning materials as described in Embodiment C-1 can be used.

As with Embodiment C-1, it is also possible to manufacture the chip capacitor shown in FIG. 17 with this embodiment.

The formation of the first and second non-metallic bands is not limited to the methods described in the Embodiments C-1 and C-2. For example, it is also possible to form the first and second non-metallic bands by irradiating laser light after the formation of continuous metal thin films. Alternatively, it is also possible to set up a patterning material application device having a slit-shaped aperture whose longitudinal direction is substantially perpendicular to the travel direction of the outer peripheral surface of the can roller and a shutter for opening and closing the slit-shaped aperture, ejecting gasified patterning material from the slit-shaped aperture to apply the patterning material for the second non-metallic film on the surface of the resin thin film.

In the Embodiments B-1 to B-7, C-1 and C-2, a cylindrical can roller was given as an example of a carrier, but the present invention is not limited to this. For example, the carrier also can be a belt-shaped carrier going around two or more rolls, or it can be a disk-shaped carrier.

Furthermore, it is preferable to apply a releasing agent to the surface of the carrier before the layering begins, because this way, the layering product can be retrieved more easily after the layering is finished. For the releasing agent, a fluorine-based releasing agent ("DAIFREE" by Daikin Industries, Ltd.) can be used for example. Suitable methods for applying the releasing agent include spraying, sputtering, and vapor deposition, and can be chosen as appropriate in accordance with the releasing agent material and the process parameters.

WORKING EXAMPLES

Working Example II-1

Using the manufacturing apparatus shown in FIG. 15, a chip capacitor with the configuration shown in FIG. 17 was manufactured.

The vacuum container 515 was set to 0.027 Pa ($2 \times 10^{-4}$ Torr) with the vacuum pump 516, and the outer peripheral surface of the can roller 511 was cooled to 5° C. The diameter of the can roller 511 was 500 mm, and the traveling speed of its outer peripheral surface was set to 50 m/min.

Before the layering, a fluorine-based releasing agent ("DAIFREE" by Daikin Industries, Ltd.) was sprayed on the outer peripheral surface of the can roller 511, and wiped thin to at thin layer with a non-woven fabric.

First of all, a protective layer 604a was formed by continuously layering resin thin films only. Dicyclopentadiene dimethanoldiacrylate was used for the protective layer 604a, and gasified and deposited on the outer peripheral surface of the can roller 511 with the resin thin film formation device 512. The deposition thickness per layer was 0.6 $\mu$m. Then, using a UV light curing device as the resin curing device 518, the deposited resin thin film material was polymerized, and cured to a curing degree of 70%. This operation was repeated while rotating the can roller 511 until a protective layer 604a of 15 $\mu$m thickness was formed on the outer peripheral surface of the can roller 511. During that time, the aperture 521 was kept shut with the shielding plate 523.

Then, a reinforcement layer 603a was deposited by layering resin thin films and metal thin films in alternation. For the resin thin film material of the reinforcement layer 603a, the same material as for the protective layer 604a was used. The deposition thickness per layer of the resin thin film was 0.6 $\mu$m. Then, the deposited resin thin film material was cured to a curing degree of 70% with the resin curing device 518. After that, the surface was oxygen plasma processed with the surface processing device 519. Then, gasified patterning material was sprayed from the micro-holes of the patterning material application device 513 and adhered in a band shape on the surface of the resin thin film. A fluorine-based oil was used for the patterning material. The temperature at which the vapor pressure of the patterning material becomes 0.1 Torr was 100° C. The average molecular weight of the oil was 1500. The application width of the band-shaped patterning material was set to 150 $\mu$m. Next, the aperture 521 was opened by moving the shielding plate 523. Then, aluminum was vapor deposited with the metal thin film formation device 514. The layering thickness was set to 300 Å (Angstrom). After that, with the patterning material removing device 517, heating was performed with a far-infrared heater and a plasma emission process was performed, and the remaining patterning material was removed. Then, laser light was irradiated from the laser light irradiation device 530 to form the second non-metallic bands. For the laser light, a YAG laser with 20 W output power was used. The laser light was scanned such that its scanning track defines an approximately right angle with the first non-metallic bands that have been formed by the patterning material application device 513. By repeating this process about 500 times while rotating the can roller 511, a layer 603a with a total thickness of 315 $\mu$m was formed.

Then, the element layer 602 serving as the capacitance generation portion of the capacitor was layered. For the resin thin film material, the same material as above was used, and its layering thickness per layer was set to 0.4 $\mu$m. Then, the deposited resin thin film was cured to a curing degree of 70% with the resin curing device 518. After that, its surface was oxygen plasma processed with the surface processing device 519. Then, the same patterning material as above was deposited in the same width as above with the patterning material application device 513. Then, aluminum was vapor deposited with the metal thin film formation device 514. The layering thickness was set to 300 Å (Angstrom). After that, the remaining patterning material was removed with the patterning material removing device 517. Then, the second non-metallic bands were formed by irradiation of laser light with the laser light irradiation device 530. As during the layering of the reinforcement layer 603a, the laser light was scanned such that its scanning track defines an approximately right angle with the first non-metallic bands that have been formed by the patterning material application device 513. Repeating this process about 2000 times while rotating the can roller 511, a layer 602 with a total thickness of 860 $\mu$m was formed. During that time, the patterning material application device 513 was shifted back and forth for 1000 $\mu$m in the direction of the rotation axis at each rotation, in synchronization with the rotation of the can roller 511.

Then, the shifting of the patterning material application device 513 was stopped, and a reinforcement layer 603b of 315 $\mu$m thickness was formed. The formation method was exactly the same as for the layer 603a described above.

Finally, a protective layer 604b of 15 $\mu$m thickness was formed. To do so, the aperture 521 was closed by shifting the shielding plate 523. The formation method for the layer 604b was exactly the same as for the layer 604a described above.

Thus, in the layering portions of the reinforcement layers 603a, 603b and the element layer 602, the positions of the second non-metallic bands in the layering direction substantially coincided with one another throughout the entire layered product, which could be achieved by synchronizing the scanning of the laser light from the laser light irradiation device 530 with the rotation of the can roller 511.

Then, the cylindrical layered product formed on the outer peripheral surface of the can roller 511 was cut along the second non-metallic bands into eight pieces, which were retrieved, and pressed while applying heat, thus obtaining flat laminate base elements 600 as shown in FIGS. 16A to 16D. None of the metal thin films was exposed at the cutting planes 605. The laminate base elements 600 were cut along the cutting planes 609a, and brass was thermally sprayed on the cutting planes to form external electrodes. Furthermore, a conductive paste of a thermosetting phenol resin with, for example, an alloy of copper, Ni, and silver dispersed in it was applied to the sprayed metal surface, and thermally cured, and solder was plated on the resulting resin surface. Then, it was cut at locations corresponding to the cutting planes 609b. Again, none of the metal thin films was exposed at the cutting planes 609b. Then, its outer surface was coated by immersion in a solution of a silane coupling agent, thus obtaining the chip capacitor shown in FIG. 17.

The resulting chip capacitor was about 1.5 mm thick in the layering direction, about 1.6 mm deep and about 3.2 mm wide (in the direction between the external electrodes), and thus very small at a capacitance of 0.33 $\mu$F. Its withstand voltage was 50V. Furthermore, applying a dc voltage of 16V, its insulation resistance was $2 \times 10^{12} \Omega$, and no short circuits or damage in the metal thin films could be observed.

The curing degrees of the resin thin films in the element layer 602, the reinforcement layers 603a and 603b, and the protective layers 604a and 604b were 95%, 95% and 90%, respectively.

The thickness of the metal thin films in the element layer 602 and b the reinforcement layers 603a and 603b was 300 Å (Angstrom), and their film resistance was 6Ω/□.

Also, taking the laminate base element 600 apart, it was found that the widths of the first and second non-metallic bands in the metal thin films of the element layer 602 were 150 μm and 50 μm, respectively, and the widths of the first and second non-metallic bands in the metal thin films of the reinforcement layers 603a and 603b were 150 μm and 50 μm, respectively.

Comparative Example II-1

A chip capacitor as shown in FIG. 10 was obtained in the same manner as in the Working Example II-1, except that the irradiation of laser light with the laser light irradiation device 530 was not carried out.

The resulting chip capacitor was about 1.5 mm thick in the layering direction, about 1.6 mm deep and about 3.2 mm wide (in the direction between the external electrodes), and its capacitance was 0.33 μF. Its withstand voltage was 50V. Furthermore, applying a dc voltage of 16V, its insulation resistance was $5 \times 10^{11} \Omega$.

The curing degrees of the resin thin films in the element layer 602, the reinforcement layers 603a and 603b, and the protective layers 604a and 604b were 95%, 95% and 90%, respectively.

The thickness of the metal thin films in the element layer 602 and the reinforcement layers 603a and 603b was 300 Å (Angstrom), and its film resistance was 6Ω/□.

Also, taking the laminate base element apart, it was found that the widths of the non-metallic bands in the metal thin films of the element layer 602 were 150 μm, and the widths of the non-metallic bands in the metal thin films of the reinforcement layers 603a and 603b were 150 μm.

It seems that the insulation resistance of Working Example II-1 was better than that of Comparative Example II-1, because sufficient non-metallic bands were formed at the cutting planes.

In the second aspect of the present invention, the above-described working examples are merely examples, and the present invention is in no way limited by these examples. For example, the number of layers of the layered product can be chosen as appropriate depending on the application for the layered product and its desired specifications (for example, the desired capacitance when used as a capacitor), and the number of layers calculated from the thickness of one layer and the entire thickness in the above-described working examples is merely an example. However, it should be noted that with regard to handling of the resulting layered product, extremely thin layered products tend to break easily. As the inventors found out, layered products with a thickness of at least 100 μm do not tend to break easily, but the handling of layered products with a thickness of not more than 20 μm required special care. Consequently, when 1 μm is taken as an upper limit for the total thickness of one resin thin film and one metal thin film, then a layering number of at least 20 layers of resin thin films results as a practical lower limit for the number of layers of the layered product. It is more preferable that the number of layers of resin thin films is at least 100. Regarding the upper limit of the number of layers, on the other hand, there are less limiting factors than for the lower limit. However, since in high-density mounted circuit boards there are only few electronic components with a thickness of more than 1 mm, which is a component height that is higher than that of semiconductor chips, taking 0.1 μm as a lower limit for the total thickness of one resin thin film and one metal thin film, a layering number of at most 10000 layers of resin thin films results as a rough upper limit for the number of layers of the layered product.

The invention may be embodied in other specific forms without departing from the spirit or essential characteristics thereof The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A layered product of a plurality of resin thin films and a plurality of metal thin films,
   wherein edges of the metal thin films are not exposed on the outside of the layered product;
   wherein at least one layer of the resin thin films is provided with a via hole in the layering direction;
   wherein the via hole electrically connects upper and lower metal thin films; and
   wherein the via hole can provide an electrical lead to the outside for at least one layer of the metal thin films.

2. The layered product according to claim 1, wherein a conductive material is filled into the via hole, the conductive material electrically connecting the upper and lower metal thin films.

3. The layered product according to claim 1, wherein the upper and lower metal thin films are directly connected through the via hole.

4. A layered product of a plurality of resin thin films and a plurality of metal thin films,
   wherein at least one layer of the resin thin films is provided with a cutout portion in a portion of its periphery;
   wherein the cutout portion electrically connects upper and lower metal thin films; and
   wherein the cutout portion can provide an electrical lead to the outside for at least one layer of the metal thin films.

5. The layered product according to claim 4, wherein a conductive material is filled into the cutout portion, the conductive material electrically connecting the upper and lower metal thin films.

6. The layered product according to claim 4, wherein the upper and lower metal thin films are directly connected through the cutout portion.

7. The layered product according to claim 4, wherein the resin thin films are substantially rectangular, and the metal thin films are set back from all sides of the resin thin films except the sides where the cutout portions of the resin thin films are formed.

8. A capacitor comprising a layered product of a plurality of resin thin films and a plurality of metal thin films,
   wherein edges of the metal thin films are not exposed on the outside of the layered product;
   wherein at least one layer of the resin thin films is provided with a via hole in the layering direction;
   wherein the via hole electrically connects the metal thin films such that every other of the metal thin films is on the same potential; and
   wherein the via hole can provide an electrical lead to the outside for the metal thin films put on the same potential.

9. The capacitor according to claim 8, wherein a conductive material is filled into the via hole, the conductive material electrically connecting the metal thin films.

10. The capacitor according to claim 8, wherein the metal thin films are directly connected through the via hole.

11. The capacitor according to claim 8, wherein the metal thin films are partitioned into a plurality of metal thin films arranged on the same plane, forming a plurality of capacitance formation regions in that same plane.

12. The capacitor according to claim 11, further comprising via electrodes that are insulated from the metal thin films.

13. A semiconductor integrated circuit, incorporating a capacitor in accordance with any of claims 8 to 12 inside a package.

14. A multi-layer circuit board, wherein a capacitor in accordance with any of claims 8 to 12 is secured to a surface or the inside of the multi-layer circuit board.

15. A capacitor comprising a layered product of a plurality of resin thin films and a plurality of metal thin films,
wherein at least one layer of the resin thin films is provided with a cutout portion in a portion of its periphery;
wherein the cutout portion electrically connects the metal thin films such that every other of the metal thin films is on the same potential; and
wherein the cutout portion can provide an electrical lead to the outside for the metal thin films put on the same potential.

16. The capacitor according to claim 15, wherein a conductive material is filled into the cutout portion, the conductive material electrically connecting the metal thin films.

17. The capacitor according to claim 15, wherein the metal thin films are directly connected through the cutout portion.

18. The layered product according to claim 15, wherein the resin thin films are substantially rectangular, and the metal thin films are set back from all sides of the resin thin films except the sides where the cutout portions of the resin thin films are formed.

19. A method for manufacturing a layered product comprising resin thin films and metal thin films layered in alternation, the method comprising:
a step of forming the resin thin films and the metal thin films in alternation by forming the metal thin films within a formation region of the resin thin films, such that the formation area of the metal thin films is smaller than the formation area of the resin thin films, and modifying the formation position of the metal thin films for each metal thin film layer;
a step of forming a via hole penetrating the resin thin films and the metal thin films; and
a step of filling conductive material into the via hole to electrically connect at least some of the metal thin films with the conductive material.

20. The method for manufacturing a layered product according to claim 19, further comprising:
a step of forming a second via hole that penetrates the resin thin films, but does not penetrate the metal thin films; and
a step of filling conductive material into the second via hole.

21. A method for manufacturing a layered product comprising resin thin films and metal thin films layered in alternation by, taking as one unit a step of forming a resin thin film, a step of forming a metal thin film, and a step of forming a via hole penetrating the resin thin film and the metal thin film at a predetermined position, and repeating this unit of steps with respect to a carrier;
wherein the metal thin films are formed within a formation region of the resin thin films, such that the formation area of the metal thin films is smaller than the formation area of the resin thin films, and the formation position of the metal thin films is modified for each metal thin film layer; and
wherein the via hole is formed continuously in a layering direction, and this continuous via hole is filled with conductive material, electrically connecting at least some of the metal thin films with the conductive material.

22. The method for manufacturing a layered product according to claim 21, further comprising;
a step of forming a second via hole that penetrates the resin thin film, but does not penetrate the metal thin film; and
wherein the second via hole is formed continuously in the layering direction, and this continuous second via hole is filled with conductive material.

23. A method for manufacturing a layered product comprising resin thin films and metal thin films layered in alternation by, taking as one unit a step of forming a resin thin film, a step of forming a via hole in that resin thin film, and a step of forming a metal thin film on top of the resin thin film, and repeating this unit of steps with respect to a carrier;
wherein the metal thin films are formed within a formation region of the resin thin films, such that the formation area of the metal thin films is smaller than the formation area of the resin thin films, and the formation position of the metal thin films is modified for each metal thin film layer; and
wherein the via hole is formed in the formation region of the metal thin films, so that a plurality of metal thin films are electrically connected in the layering direction by the via hole.

24. The method for manufacturing a layered product according to claim 23, wherein, after forming a resin thin film and before forming the next metal thin film, a second via hole is formed in a region of the resin thin film where no metal thin film is formed, wherein the second via hole is formed continuously in the layering direction, and wherein conductive material is filled into the continuous second via hole.

25. The method for manufacturing a layered product according to any of claims 19, 21, and 23, wherein, after forming a metal thin film, laser light is scanned in a substantially grid-shaped pattern, limiting a formation region of the metal thin film.

26. The method for manufacturing a layered product according to any of claims, 19, 21, and 23, wherein, after forming a resin thin film, a metal thin film is formed after applying oil on a surface of the resin thin film in a substantially grid-shaped pattern, limiting a formation region of the metal thin film.

27. The method for manufacturing a layered product according to claim 26,
wherein the layered product is formed on the carrier, which travels in a certain direction; and
wherein said application of oil is carried out using at least one pair of nozzles provided with micro-holes arranged in opposition to the surface of the resin thin film, and shifting the nozzles back and forth in a direction that is substantially perpendicular to the travel direction of the carrier, such that a track described by the micro-holes of the nozzles on the resin thin film forms an angle of approximately 45° with the travel direction of the carrier.

28. A method for manufacturing a capacitor, comprising:
a step of forming resin thin films and metal thin films in alternation by forming the metal thin films within a formation region of the resin thin films, such that the formation area of the metal thin films is smaller than the formation area of the resin thin films, and modifying the formation position of the metal thin films for each metal thin film layer;
a step of forming a via hole penetrating the resin thin films and the metal thin films; and
a step of filling conductive material into the via hole to electrically connect every other of the metal thin films.

29. The method for manufacturing a capacitor according to claim 28, wherein, after the via hole formation and before the filling of the conductive material, an inner wall of the via hole is plasma processed.

30. A method for manufacturing a capacitor by taking as one unit a step of forming a resin thin film, a step of forming a metal thin film, and a step of forming a via hole penetrating the resin thin film and the metal thin film at a predetermined position, and repeating this unit of steps with respect to a carrier;
wherein the metal thin films are formed within a formation region of the resin thin films, such that the formation area of the metal thin films is smaller than the formation area of the resin thin films, and the formation position of the metal thin films is modified for each metal thin film layer; and
wherein the via hole is formed continuously in a layering direction, and this continuous via hole is filled with conductive material, electrically connecting every other of the metal thin films.

31. The method for manufacturing a capacitor according to claim 30, wherein an inner wall of the via hole is plasma processed.

32. A method for manufacturing a capacitor by taking as one unit a step of forming a resin thin film, a step of forming a via hole in that resin thin film, and a step of forming a metal thin film on top of the resin thin films, and repeating this unit of steps with respect to a carrier;
wherein the metal thin films are formed within a formation region of the resin thin films, such that the formation area of the metal thin films is smaller than the formation area of the resin thin films, and the formation position of the metal thin films is modified for each metal thin film layer; and
wherein the via hole is formed in the region where the metal thin films are formed, so that the via hole electrically connects every other of the metal thin films.

33. The method for manufacturing a capacitor according to claim 32, wherein, after forming the via hole in the resin thin film and before forming the metal thin film, the via hole is plasma processed.

34. An apparatus for manufacturing a layered product, comprising:
a rotating carrier;
a metal thin film formation device and a resin thin film formation device arranged in opposition to the carrier;
a vacuum container accommodating the rotating carrier, the metal thin film formation device and the resin thin film formation device; and
a laser patterning device for machining metal thin films, arranged downstream from the metal thin film formation device and upstream from the resin thin film formation device.

35. The apparatus for manufacturing a layered product according to claim 34, further comprising a laser machining device for forming holes in a layering direction.

36. The apparatus for manufacturing a layered product according to claim 35, further comprising a plasma irradiation device arranged downstream from the laser machining device and upstream from the metal thin film formation device.

37. An apparatus for manufacturing a layered product, comprising:
a rotating carrier;
a metal thin film formation device and a resin thin film formation device arranged in opposition to the carrier;
a vacuum container accommodating the rotating carrier, the metal thin film formation device and the resin thin film formation device;
a laser machining device for forming holes in a layering direction; and
an oil application device for applying oil on a resin thin film, arranged downstream from the resin thin film formation device and upstream from the metal thin film formation device.

38. The apparatus for manufacturing a layered product according to claim 37, further comprising a plasma irradiation device arranged downstream from the laser machining device and upstream from the metal thin film formation device.

39. The apparatus for manufacturing a layered product according to claim 37, wherein the oil application device comprises at least one pair of nozzles having a certain arrangement of micro-holes.

40. An apparatus for manufacturing a layered product, comprising:
a rotating carrier;
a metal thin film formation device and a resin thin film formation device arranged in opposition to the carrier;
a vacuum container accommodating the rotating carrier, the metal thin film formation device and the resin thin film formation device; and
an oil application device for applying oil on a resin thin film, arranged downstream from the resin thin film formation device and upstream from the metal thin film formation device;
wherein the oil application device comprises at least one pair of nozzles having a certain arrangement of micro-holes.

41. The apparatus for manufacturing a layered product according to claim 39 or 40, wherein the tracks described by the micro-holes of the pair of nozzles on the resin thin film intersect with one another.

42. The apparatus for manufacturing a layered product according to claim 39 or 40, wherein the pair of nozzles are shifted back and forth in a direction that is substantially perpendicular to the travel direction of the carrier at substantially the same speed as the traveling speed of the carrier.

43. The apparatus for manufacturing a layered product according to claim 39 or 40, wherein the tracks described by the micro-holes of the pair of nozzles on the resin thin film define an angle of approximately 45° with the travel direction of the carrier, and the tracks described by the micro-holes of the nozzles intersect with one another.

44. An apparatus for manufacturing a layered product, comprising:
a rotating carrier;
a metal thin film formation device and a resin thin film formation device arranged in opposition to the carrier;
a vacuum container accommodating the rotating carrier, the metal thin film formation device and the resin thin film formation device;

a laser machining device for forming holes in a layering direction;

an oil application device for applying oil on a resin thin film arranged downstream from the resin thin film formation device and upstream from the metal thin film formation device; and a laser patterning device for machining metal thin films, arranged downstream from the metal thin film formation device and upstream from the resin thin film formation device.

45. The apparatus for manufacturing a layered product according to claim 44, further comprising a plasma irradiation device arranged downstream from the laser machining device and upstream from the metal thin film formation device.

46. A method for manufacturing a layered product including resin thin films and metal thin films on a rotating carrier, the method comprising a step of forming a resin thin film and a step of forming a metal thin film by deposition of metal material in a vacuum process, the steps being performed on the rotating carrier, wherein the metal thin films are partitioned into a substantially rectangular shape by first non-metallic bands formed in a travel direction of the carrier, and second non-metallic bands formed in a direction substantially perpendicular to the travel direction of the carrier.

47. The method for manufacturing a layered product according to claim 46, wherein the first non-metallic bands and/or the second non-metallic bands are formed by adhering patterning material on a surface of the resin thin film before the formation of the metal thin film.

48. The method for manufacturing a layered product according to claim 47, wherein the patterning material is adhered contactlessly to the surface of the resin thin film.

49. The method for manufacturing a layered product according to claim 47, wherein the patterning material is adhered to the surface of the resin thin film by emitting gasified patterning material from micro-holes of a patterning material application device arranged in opposition to the surface of the resin thin film.

50. The method for manufacturing a layered product according to claim 47, wherein the patterning material is adhered to the surface of the resin thin film by emitting liquid patterning material from micro-holes of a patterning material application device arranged in opposition to the surface of the resin thin film.

51. The method for manufacturing a layered product according to claim 47, wherein remaining patterning material is removed after formation of the metal thin film and before formation of the resin thin film.

52. The method for manufacturing a layered product according to claim 47, wherein the patterning material comprises at least one oil of the group consisting of ester oils, glycol oils, fluorocarbon oils, and hydrocarbon oils.

53. The method for manufacturing a layered product according to claim 46, wherein the first non-metallic bands and/or the second non-metallic bands are formed by removing metal thin film material after formation of the metal thin film.

54. The method for manufacturing a layered product according to claim 53, wherein the removal of metal thin film material is carried out by irradiating laser light.

55. The method for manufacturing a layered product according to claim 46, wherein the positions of the second non-metallic bands in the layering direction substantially coincide with one another.

56. The method for manufacturing a layered product according to claim 46, wherein, after obtaining the layered product on the carrier, the layered product is cut in the layering direction along at least a portion of the first non-metallic bands and/or the second non-metallic bands.

57. The method for manufacturing a layered product according to claim 46, wherein, after obtaining the layered product on the carrier, the layered product is cut in the layering direction along a cutting plane such that the metal thin films are not exposed at the cutting plane.

58. The method for manufacturing a layered product according to claim 46, wherein, after obtaining the layered product on the carrier, the layered product is subjected to at least two different cutting processes, one cutting process being performed in the layering direction at a cutting plane such that the metal thin film is not exposed at that cutting plane, and the other cutting process being performed in the layering direction at a cutting plane in a different direction such that the metal thin films are exposed at that cutting plane.

59. The method for manufacturing a layered product according to claim 46, wherein the layering of the resin thin films is carried out by adhering vaporized resin material to a surface of the carrier.

60. The method for manufacturing a layered product according to claim 59, wherein the resin material is a reactive monomer resin.

61. The method for manufacturing a layered product according to claim 59, wherein the resin material is subjected to a curing process after it has been adhered.

62. The method for manufacturing a layered product according to claim 46, wherein the resin thin films are subjected to surface processing after they have been layered.

63. A method for manufacturing an electronic component by performing on a rotating carrier a step of forming a resin thin film and a step of forming a metal thin film by deposition of metal material in a vacuum process, to manufacture a layered product including resin thin films and metal thin films on a carrier, cutting the layered product in a layering direction, and forming an external electrode, wherein the metal thin films formed on the carrier are partitioned into a substantially rectangular shape by first non-metallic bands formed in a travel direction of the carrier, and second non-metallic bands formed in a direction substantially perpendicular to the travel direction of the carrier; and wherein at least a portion of said cutting is performed along at least a portion of the non-metallic bands.

64. The method for manufacturing an electronic component according to claim 63, wherein the positions of the second non-metallic bands in the layering direction substantially coincide with one another.

65. The method for manufacturing an electronic component according to claim 63, wherein said cutting is performed in at least two different directions, such that the metal thin films are exposed at a cutting plane corresponding to one cutting direction, but not exposed at a cutting plane corresponding to the other cutting direction.

66. The method for manufacturing an electronic component according to claim 65, wherein an external electrode is formed on the cutting plane at which the metal thin films are exposed.

67. The method for manufacturing an electronic component according to claim 63, wherein the electronic component is a capacitor.

68. The method for manufacturing an electronic component according to claim 63, wherein the electronic component is a chip capacitor.

69. An electronic component comprising:

a layered product including at least two layers each of resin thin films and metal thin films; and an electrode formed on a portion of a lateral surface of the layered product, the normal to the lateral surface being oriented in a direction that is different from the layering direction, and electrically connected to the metal thin films;

wherein the metal thin films are not exposed at lateral surfaces where the layered product is not provided with electrodes.

70. The electronic component according to claim 69, wherein the layered product is formed substantially as a rectangular solid, wherein electrodes are formed on one of the pairs of opposing surfaces of the layered product that are arranged in opposition in a direction different from the layering direction of the layered product, and wherein the metal thin films are not exposed at the other of those pairs of opposing surfaces.

71. An electronic component obtained by cutting in a layering direction a layered product including at least two layers each of resin thin films and metal thin films, and forming an electrode electrically connecting the metal thin films at a portion of the cutting plane;

wherein the metal thin films are not exposed at cutting planes not provided with electrodes.

72. The electronic component according to claim 69 or 71, wherein the electronic component is a capacitor.

* * * * *

UNITED STATES PATENT AND TRADEMARK OFFICE
CERTIFICATE OF CORRECTION

PATENT NO.   : 6,829,135 B2
DATED        : December 7, 2004
INVENTOR(S)  : Honda et al.

It is certified that error appears in the above-identified patent and that said Letters Patent is hereby corrected as shown below:

<u>Title page, Item [54] and Column 1, line 1</u>,
Title, "APPARATUS MANUFACTURING THE SAME" should read
-- APPARATUS FOR MANUFACTURING THE SAME --.

<u>Column 49</u>,
Line 38, "on top of the resin thim films," should read -- on top of the resin thin film, --.

Signed and Sealed this

Twenty-seventh Day of December, 2005

JON W. DUDAS
*Director of the United States Patent and Trademark Office*